(12) United States Patent
Nishikawa

(10) Patent No.: US 9,891,507 B2
(45) Date of Patent: Feb. 13, 2018

(54) PROJECTION TYPE IMAGE DISPLAY DEVICE AND PROJECTION OPTICAL SYSTEM

(71) Applicant: SONY CORPORATION, Tokyo (JP)

(72) Inventor: Jun Nishikawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/917,997

(22) PCT Filed: Nov. 13, 2014

(86) PCT No.: PCT/JP2014/005708
§ 371 (c)(1),
(2) Date: Mar. 10, 2016

(87) PCT Pub. No.: WO2015/097970
PCT Pub. Date: Jul. 2, 2015

(65) Prior Publication Data
US 2016/0223888 A1    Aug. 4, 2016

(30) Foreign Application Priority Data

Dec. 27, 2013  (JP) ................................ 2013-273229

(51) Int. Cl.
*G03B 21/14*  (2006.01)
*G02B 13/16*  (2006.01)
(Continued)

(52) U.S. Cl.
CPC ........... *G03B 21/142* (2013.01); *G02B 13/16* (2013.01); *G02B 15/14* (2013.01); *G02B 17/08* (2013.01);
(Continued)

(58) Field of Classification Search
CPC ........... G03B 21/14; G03B 21/53; H04N 9/31
See application file for complete search history.

(56) References Cited

U.S. PATENT DOCUMENTS 5,539,576 A   7/1996  Ito
5,701,205 A  12/1997  Hasushita et al.
(Continued)

FOREIGN PATENT DOCUMENTS

JP    2010-20036       1/2010
JP    2010-020036 A    1/2010
(Continued)

OTHER PUBLICATIONS

International Search Report dated Feb. 9, 2015, in PCT/JP2014/005708 Filed Nov. 13, 2014.
(Continued)

*Primary Examiner* — Sultan Chowdhury
*Assistant Examiner* — Danell L Owens
(74) *Attorney, Agent, or Firm* — Oblon, McClelland, Maier & Neustadt, L.L.P.

(57) ABSTRACT

A system including a light source configured to illuminate light onto an image modulation element; a projection optical system including at least a first lens system and a second lens system configured to project the image modulated by the modulation element; and circuitry configured to shift a position of the first lens system in a direction perpendicular to an optical axis of the projection optical system based on an optical zoom factor, wherein a position of the image modulation element is unchanged when the circuitry shifts the position of the first lens system.

14 Claims, 53 Drawing Sheets

(51) Int. Cl.
  *G02B 17/08*   (2006.01)
  *G03B 5/02*    (2006.01)
  *G03B 21/28*   (2006.01)
  *G02B 15/14*   (2006.01)
  *G03B 21/00*   (2006.01)

(52) U.S. Cl.
  CPC .......... *G02B 17/0852* (2013.01); *G03B 5/02* (2013.01); *G03B 21/005* (2013.01); *G03B 21/147* (2013.01); *G03B 21/28* (2013.01)

(56) References Cited

U.S. PATENT DOCUMENTS

| | | | |
|---|---|---|---|
| 2005/0140939 A1* | 6/2005 | Yamamoto | H04N 9/3105 353/102 |
| 2008/0198338 A1 | 8/2008 | Yokote et al. | |
| 2010/0128234 A1* | 5/2010 | Nishikawa | H04N 9/3105 353/98 |
| 2011/0216289 A1* | 9/2011 | Morikuni | G03B 21/28 353/70 |
| 2012/0147341 A1 | 6/2012 | Tsukagoshi | |
| 2013/0010371 A1* | 1/2013 | Otani | G02B 13/12 359/668 |

FOREIGN PATENT DOCUMENTS

| | | |
|---|---|---|
| JP | 2010-122573 | 6/2010 |
| JP | 2012-128056 | 7/2012 |

OTHER PUBLICATIONS

Office Action dated Nov. 22, 2016 in Japanese Patent Application No. 2013-273229.
Chinese Office Action dated May 31, 2017 for Chinese Application No. 201480068954.4, with English translation.
European Office Action dated Oct. 25, 2017 in European Application No. 14 802 956.4 (5 pages).

* cited by examiner

[Fig. 1]
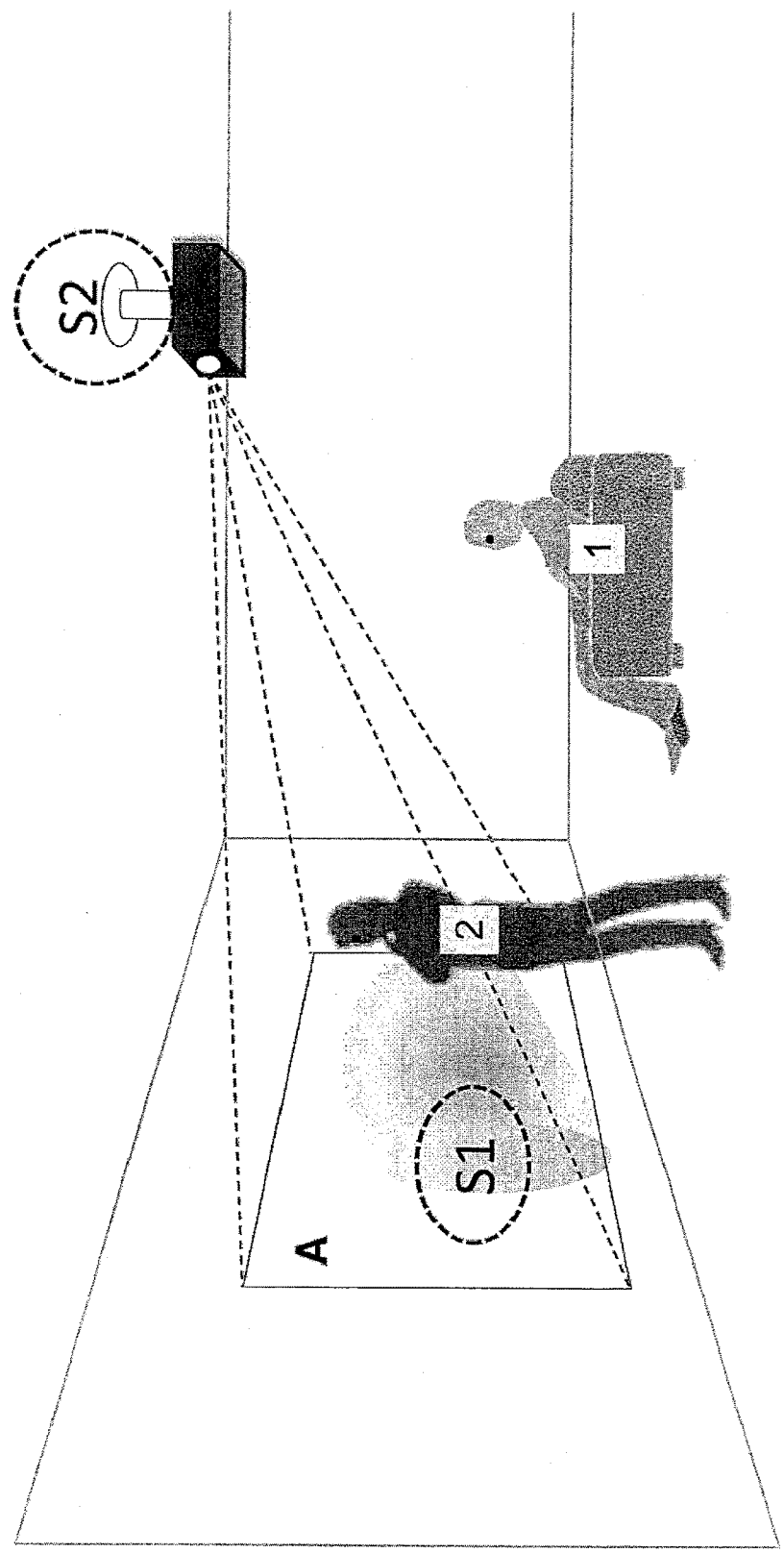

[Fig. 2]
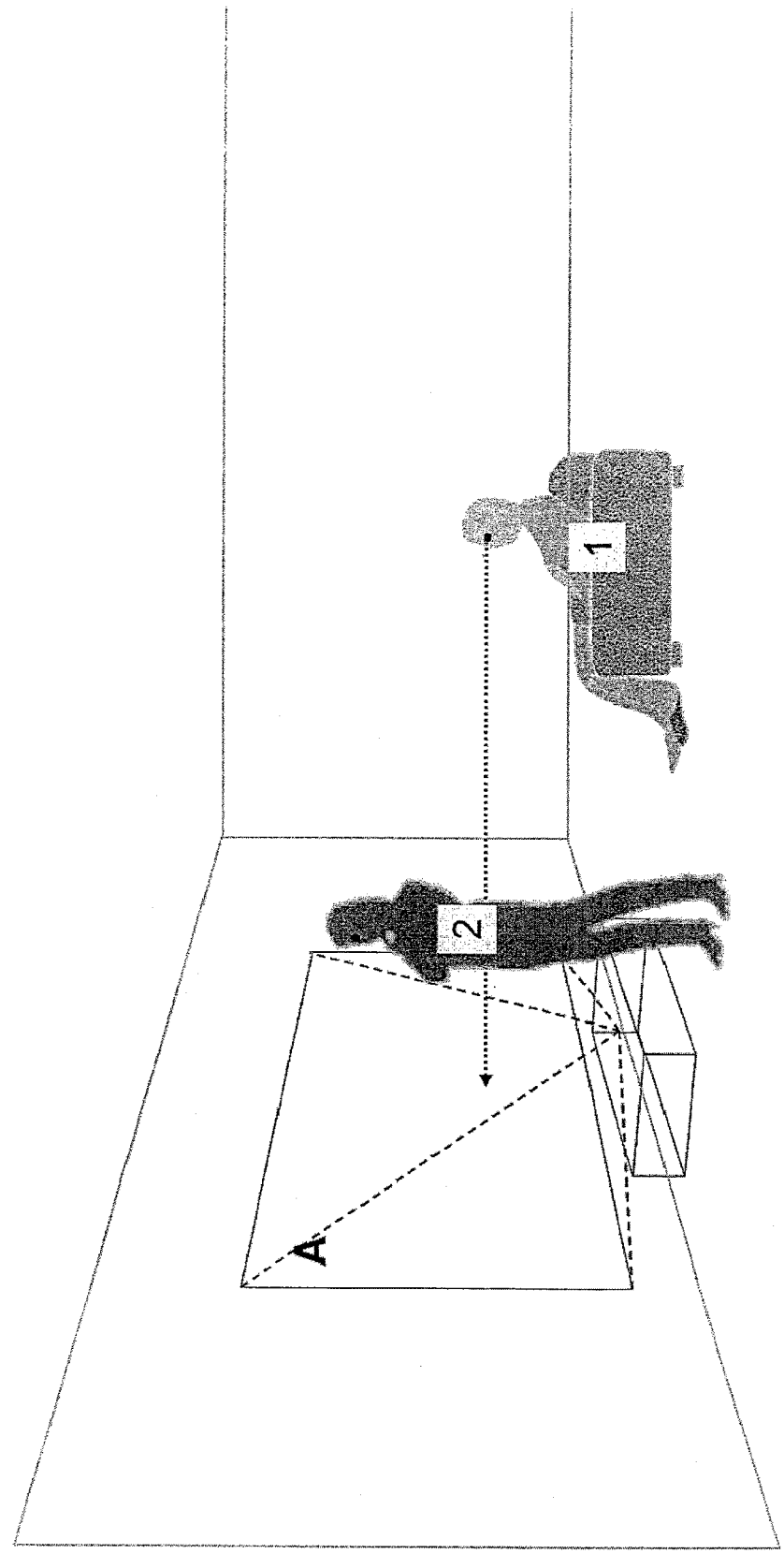

[Fig. 3]
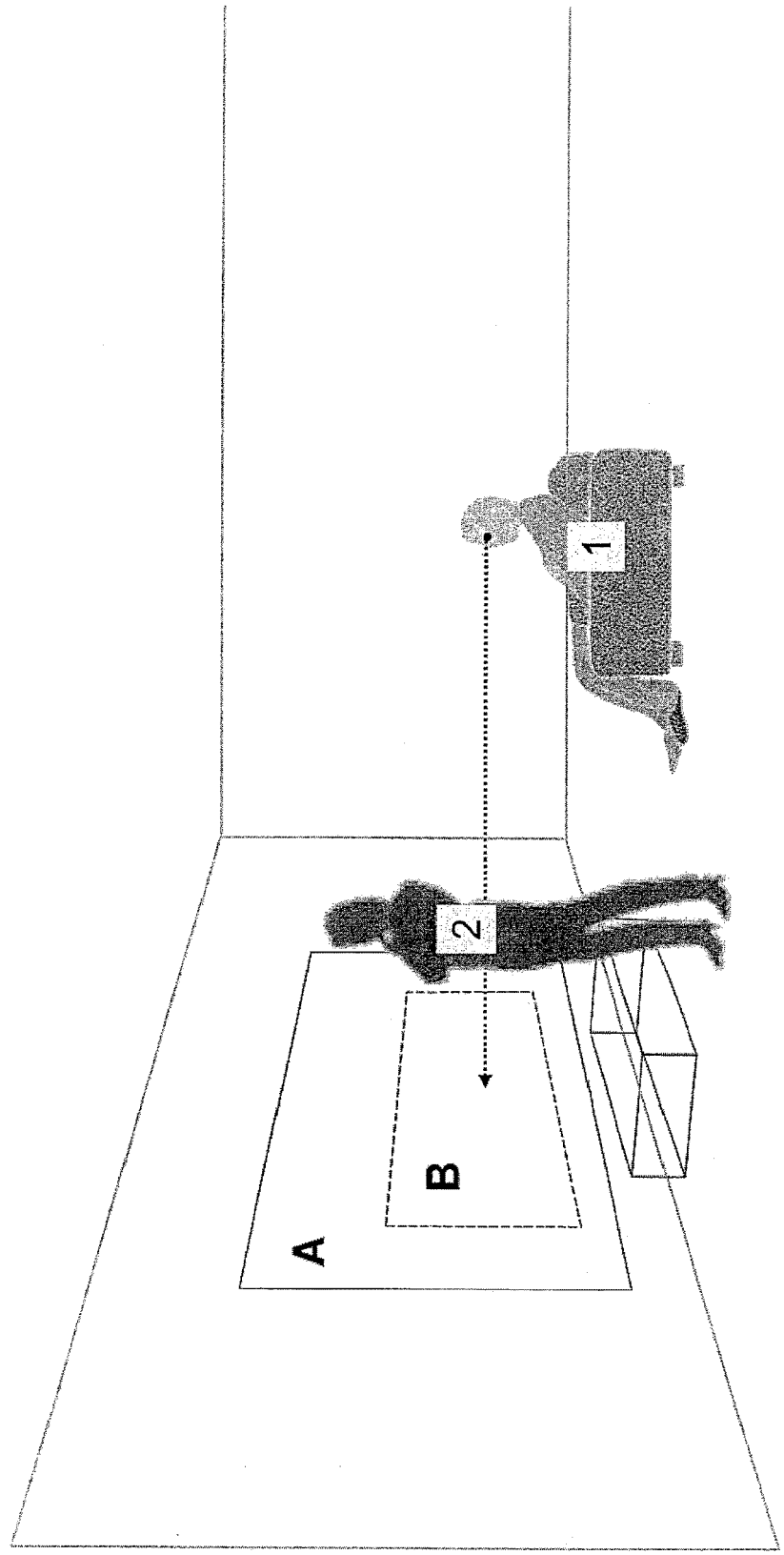

[Fig. 4A]
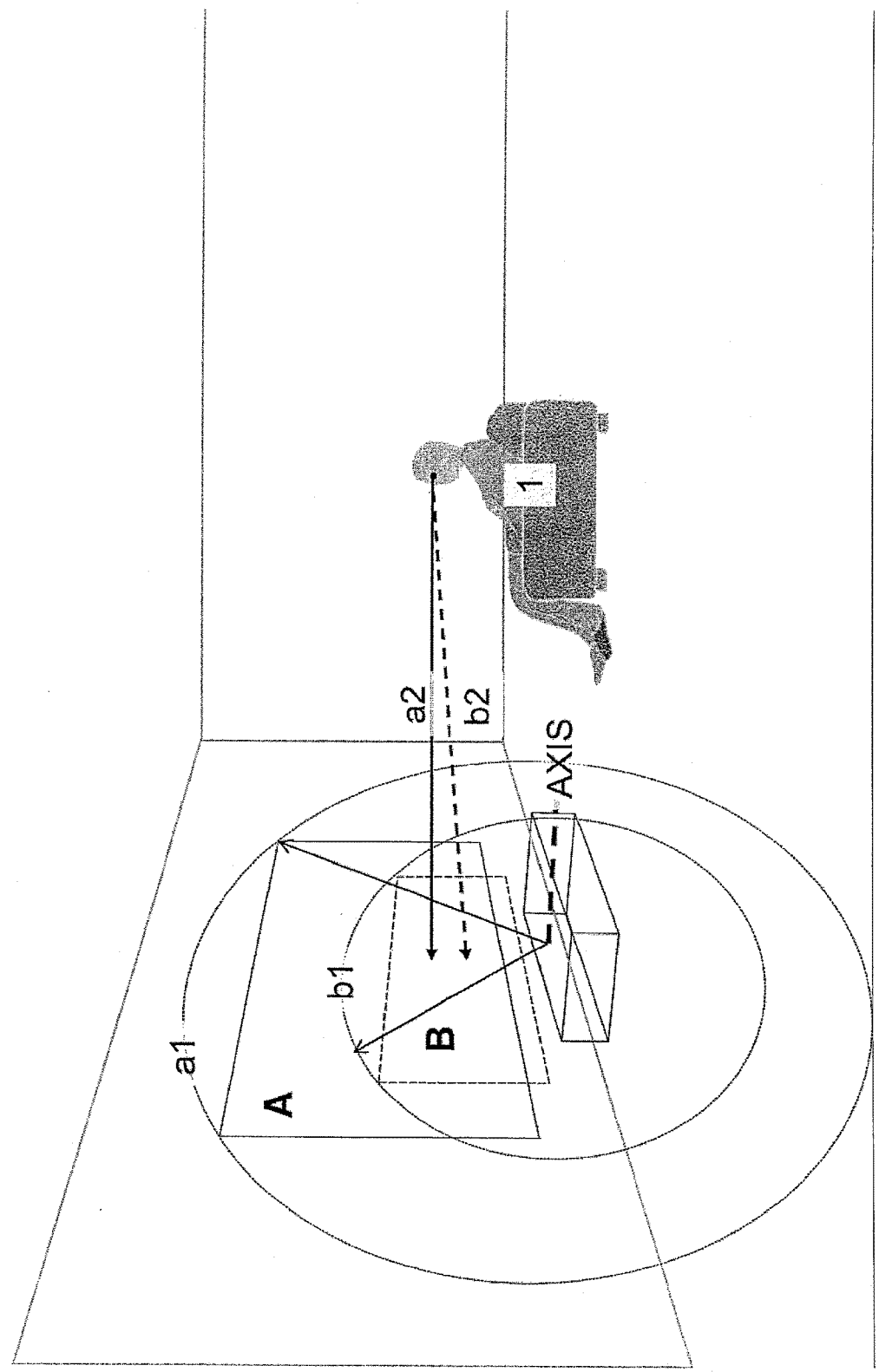

[Fig. 4B]
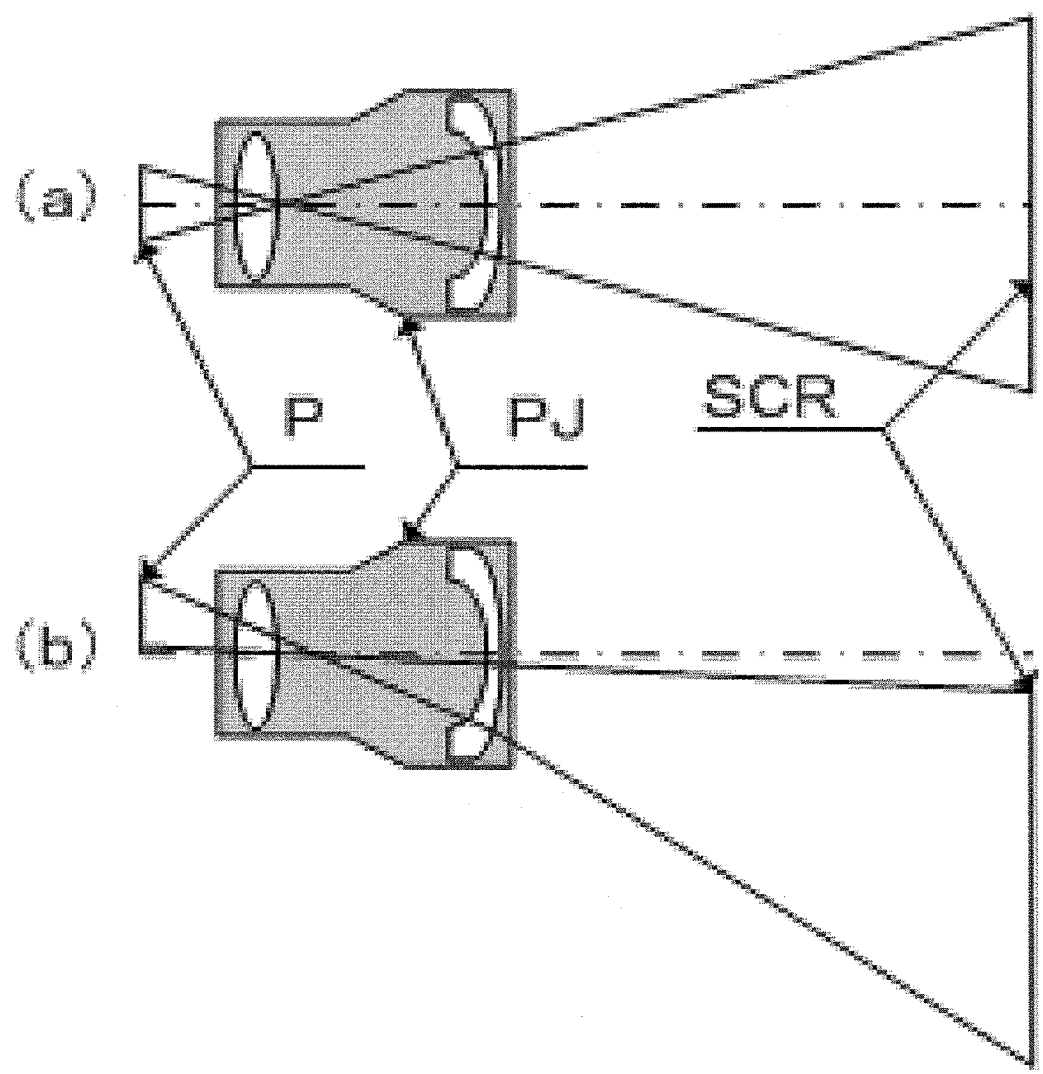

[Fig. 5]
(a)
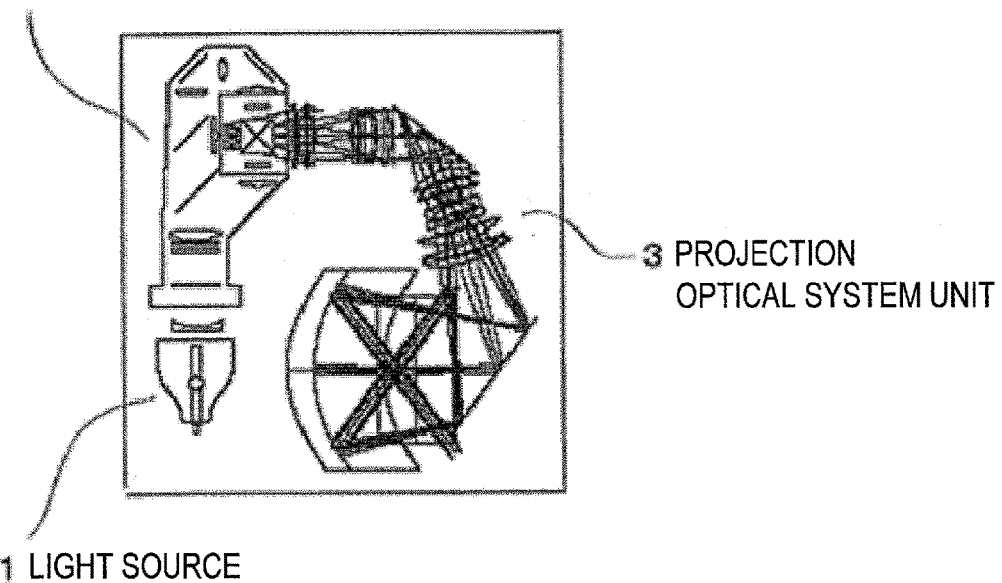
2 ILLUMINATION OPTICAL SYSTEM UNIT
3 PROJECTION OPTICAL SYSTEM UNIT
1 LIGHT SOURCE
(b)
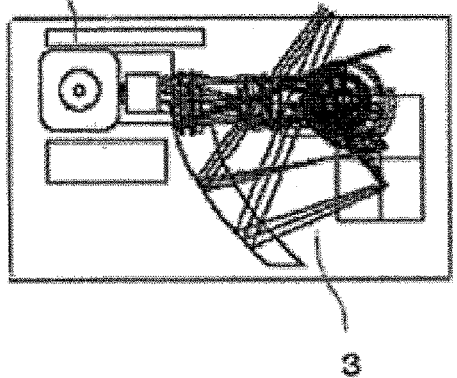

[Fig. 6]
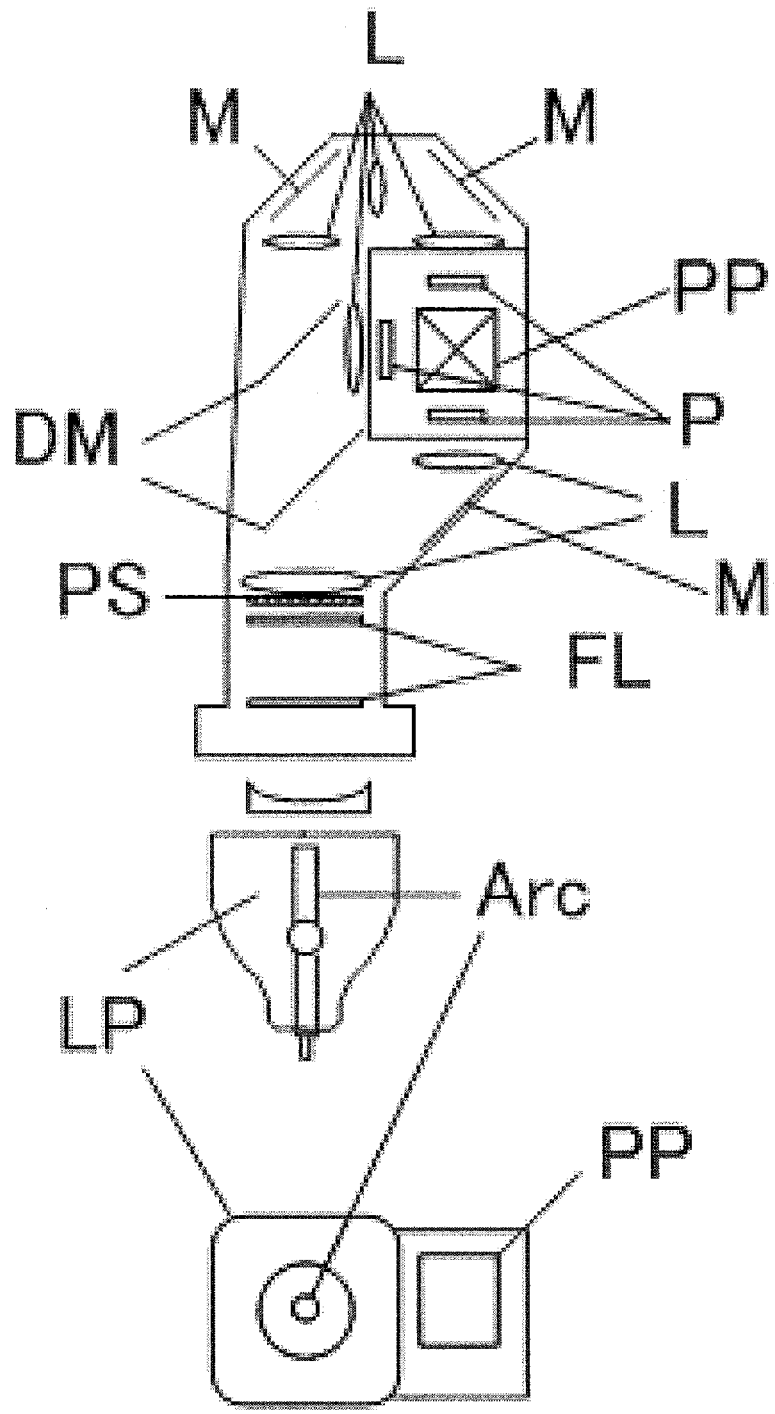

[Fig. 7]
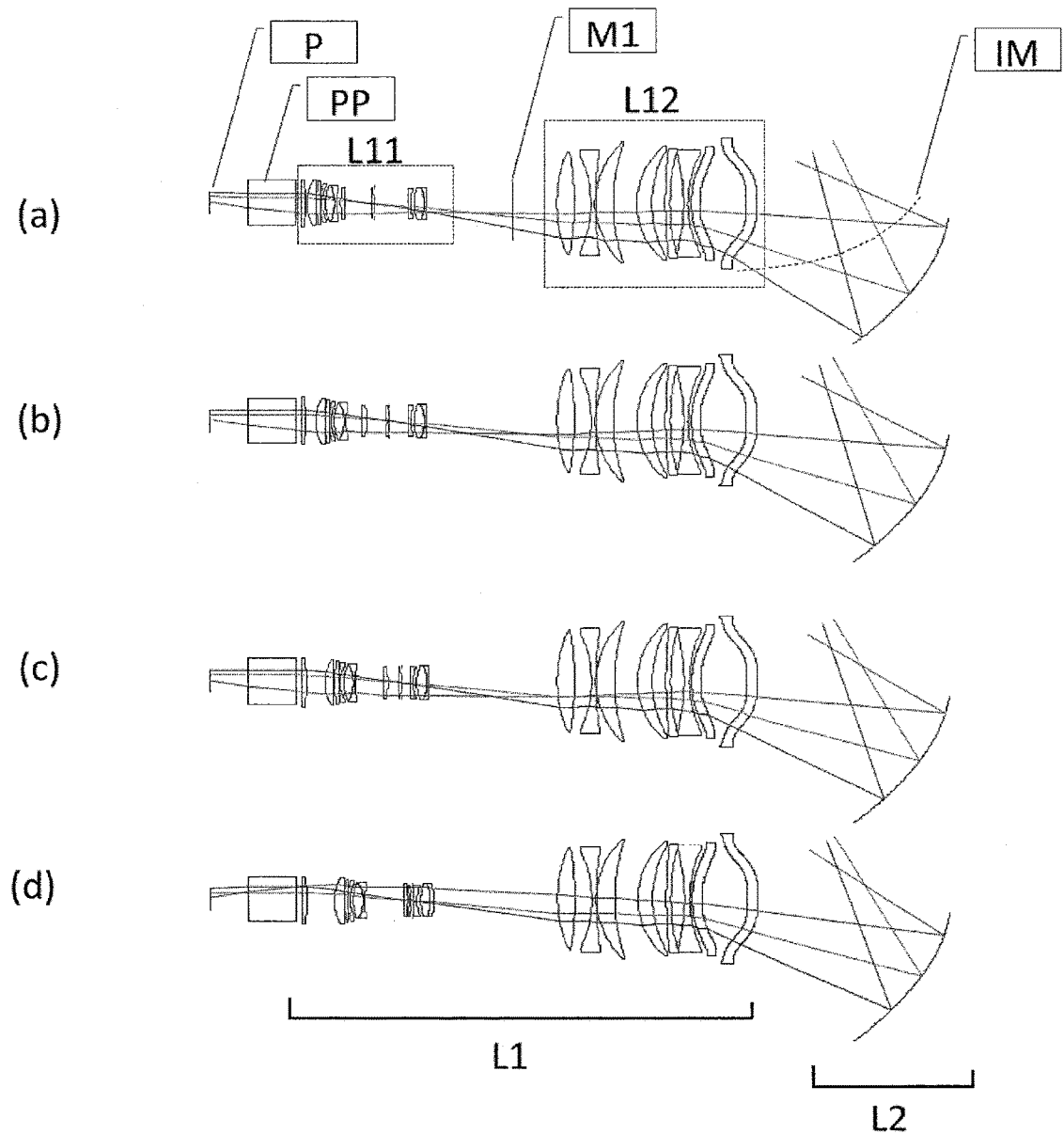

[Fig. 8A]
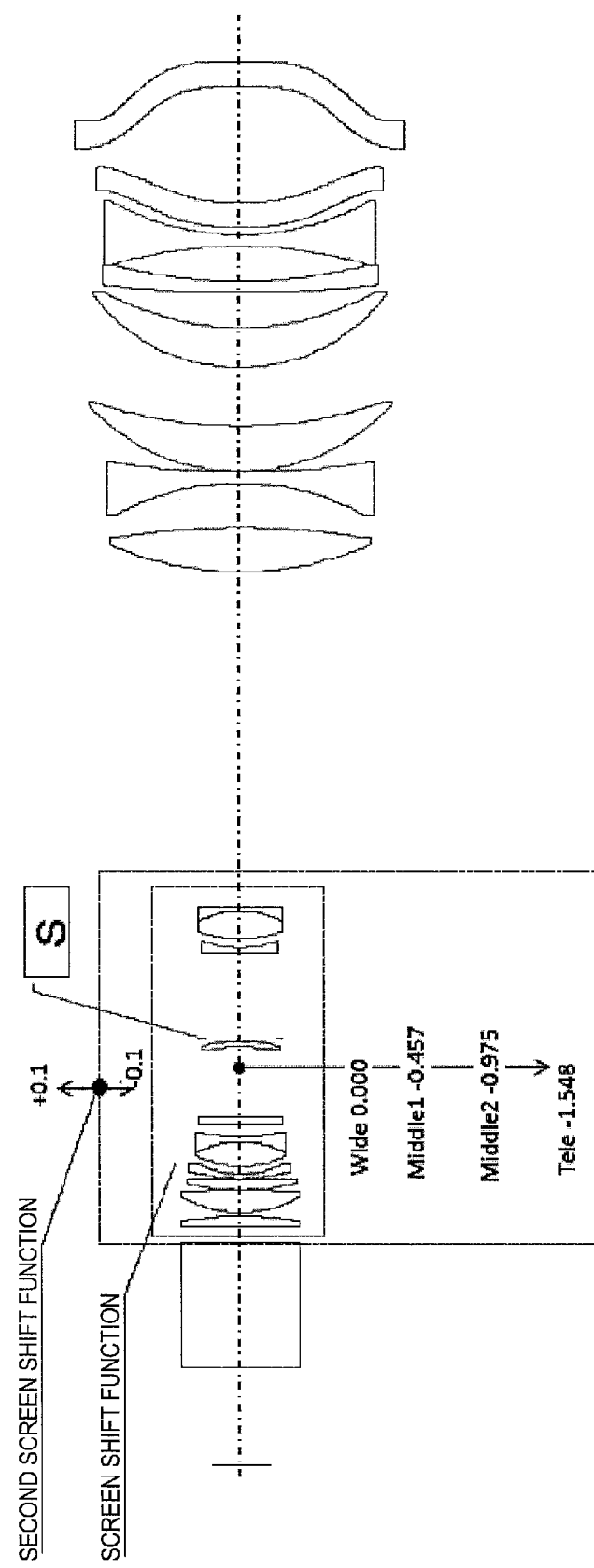

[Fig. 8B]
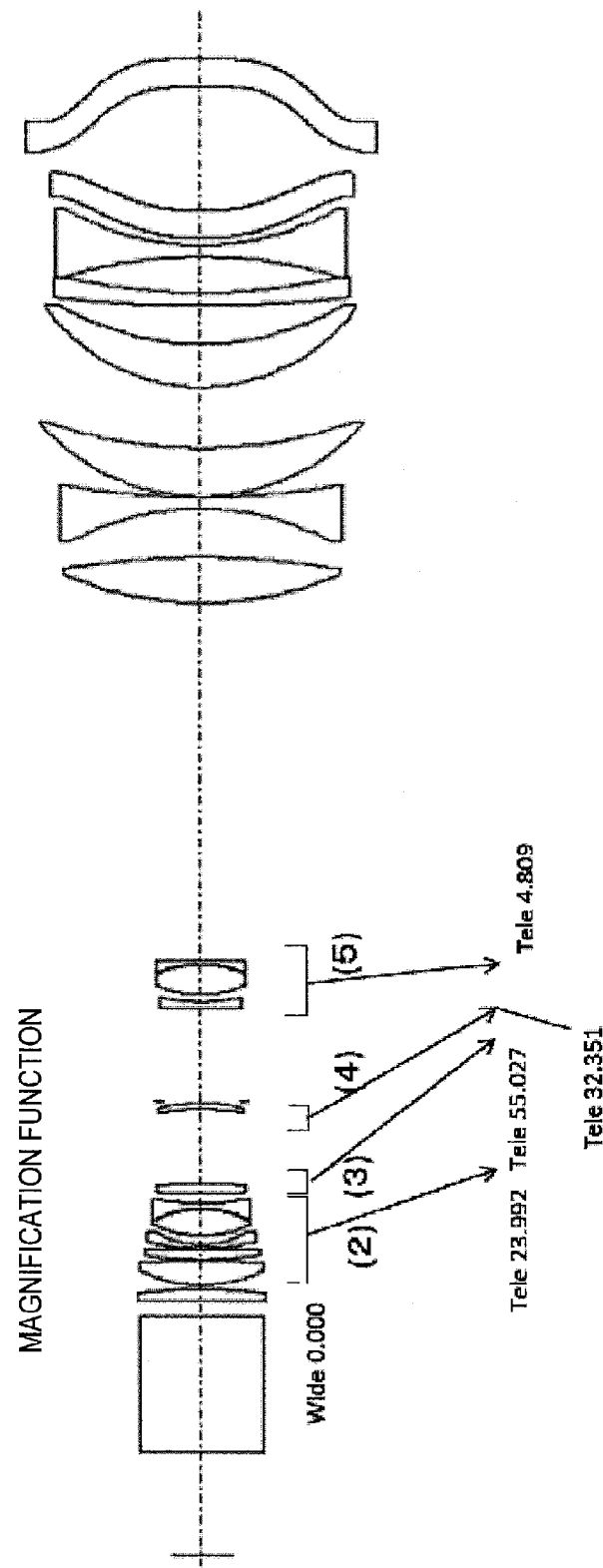

[Fig. 8C]

|  | Wide | Middle1 | Middle2 | Tele |
|---|---|---|---|---|
| MOVEMENT AMOUNT (2) | 0.000 | 7.965 | 15.772 | 23.992 |
| MOVEMENT AMOUNT (3) | 0.000 | 19.432 | 37.816 | 55.027 |
| MOVEMENT AMOUNT (4) | 0.000 | 13.457 | 24.002 | 32.351 |
| MOVEMENT AMOUNT (5) | 0.000 | 0.012 | 2.032 | 4.809 |

[Fig. 9A]
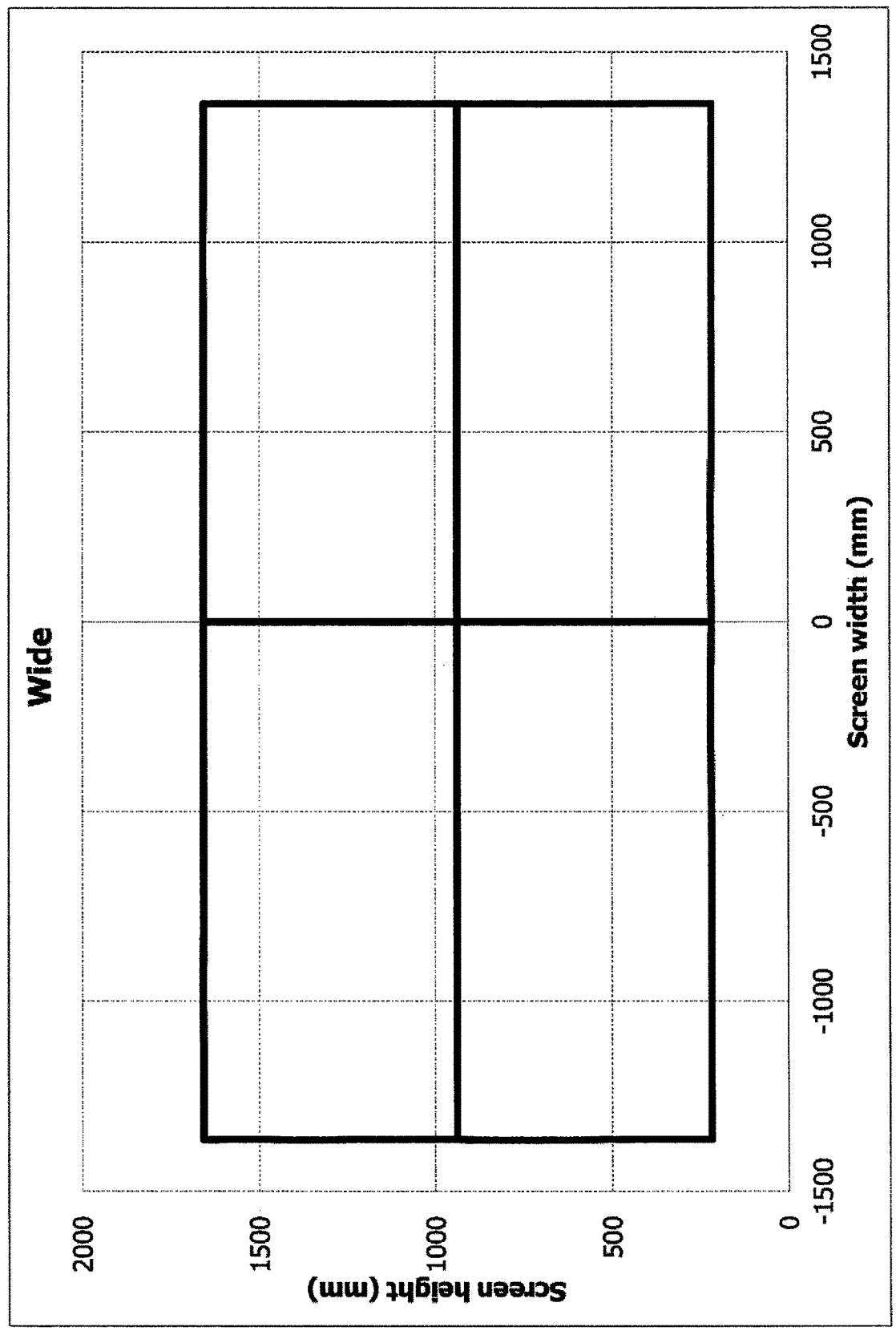

[Fig. 9B]
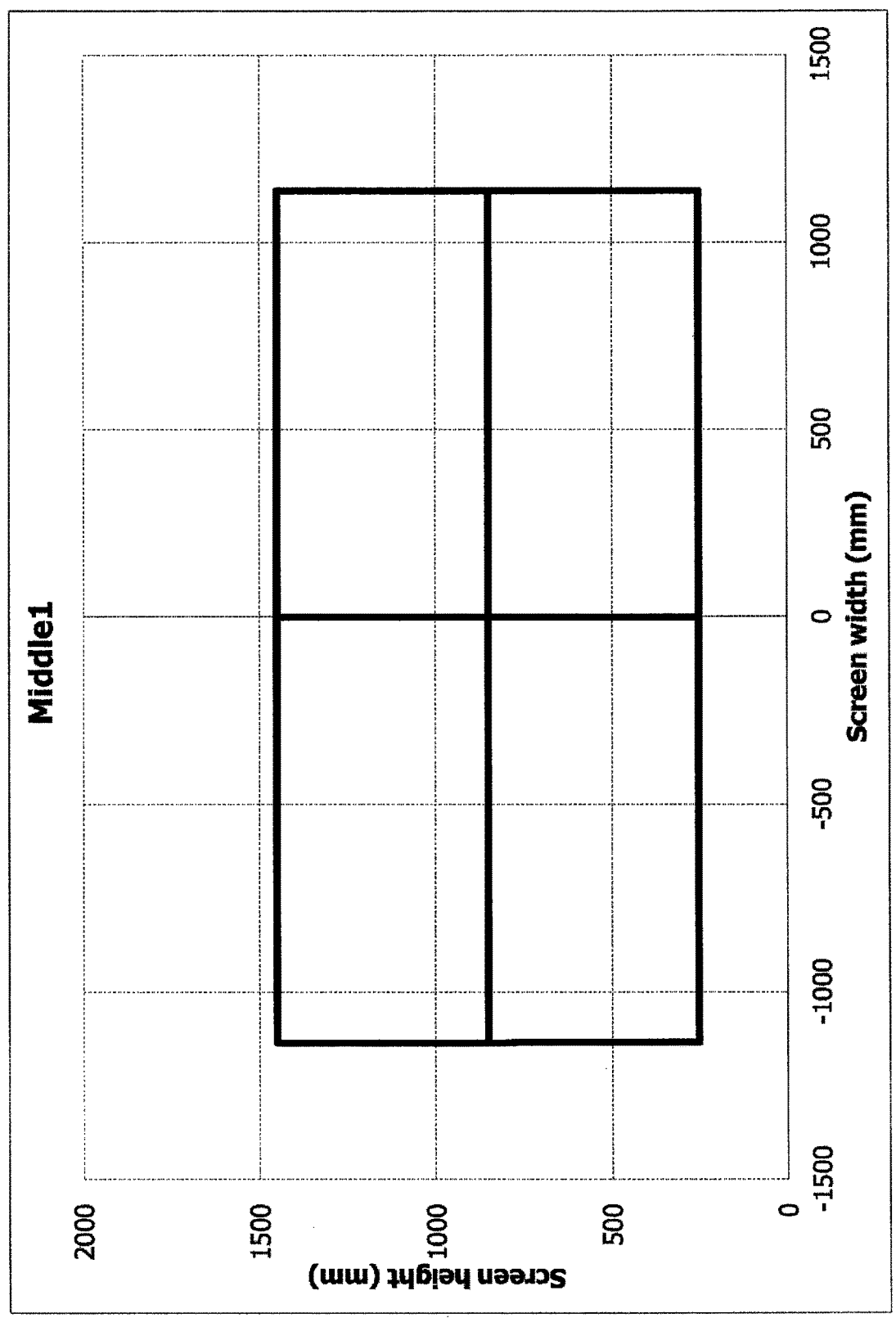

[Fig. 9C]
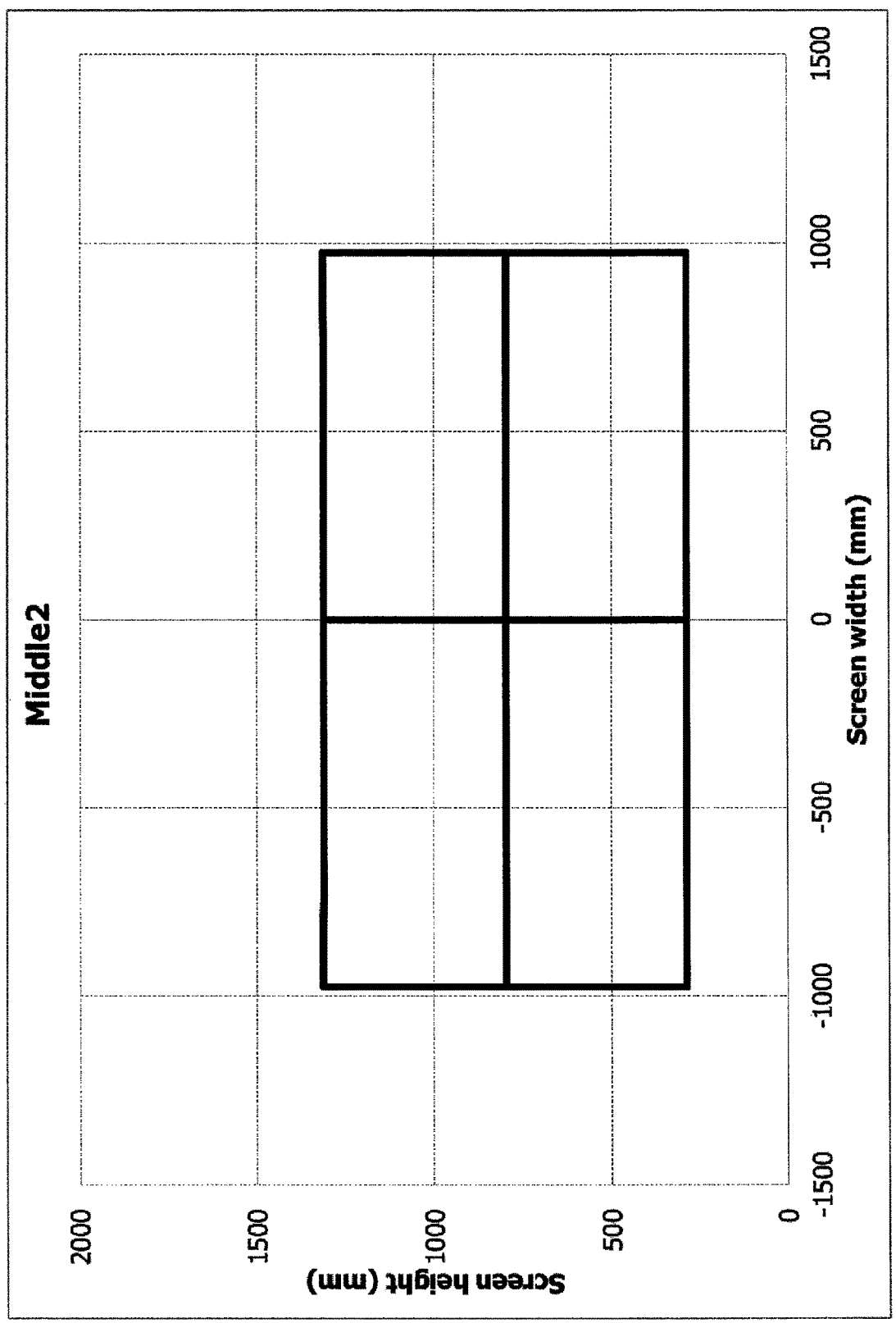

[Fig. 9D]
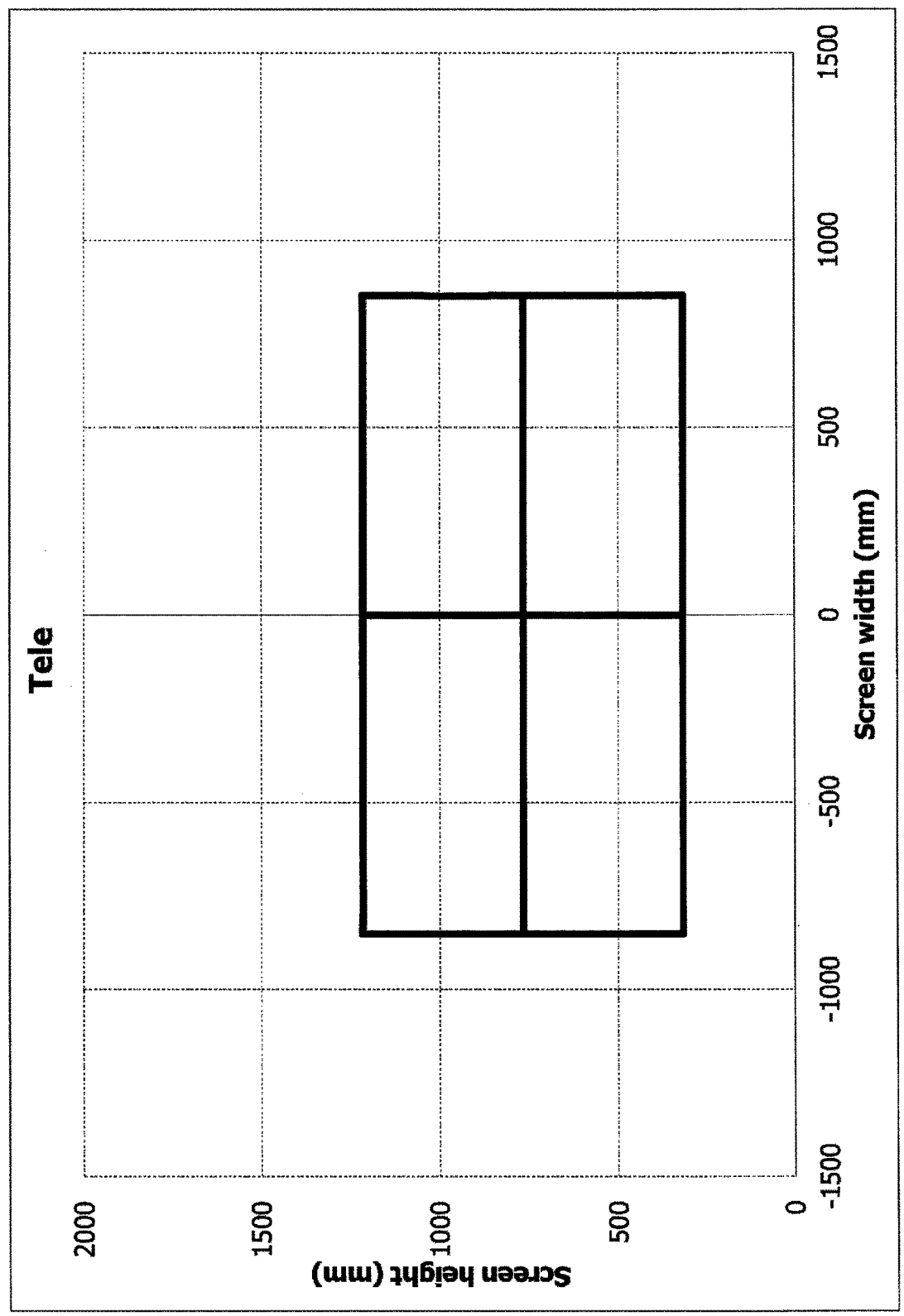

[Fig. 10]
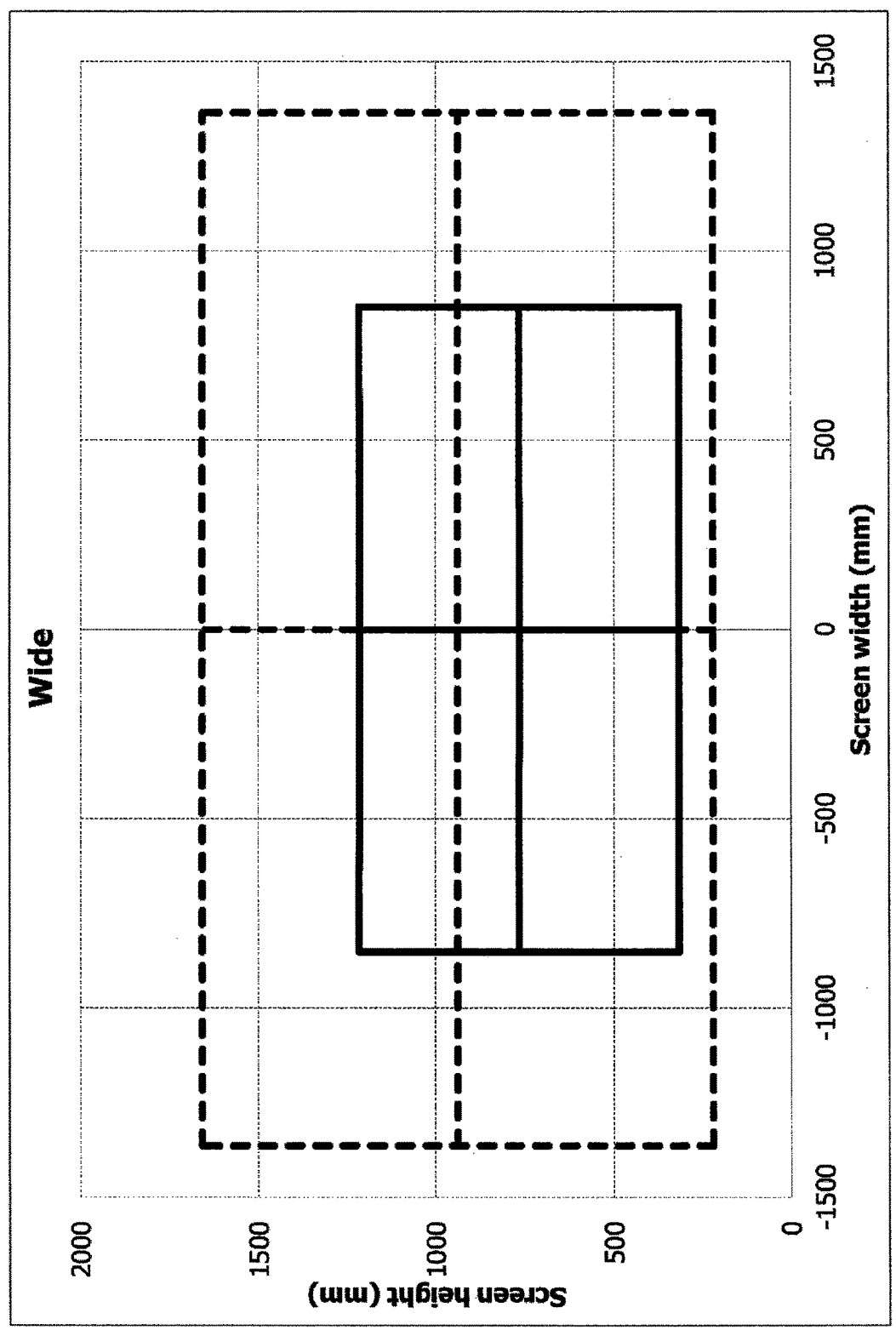

[Fig. 11A]
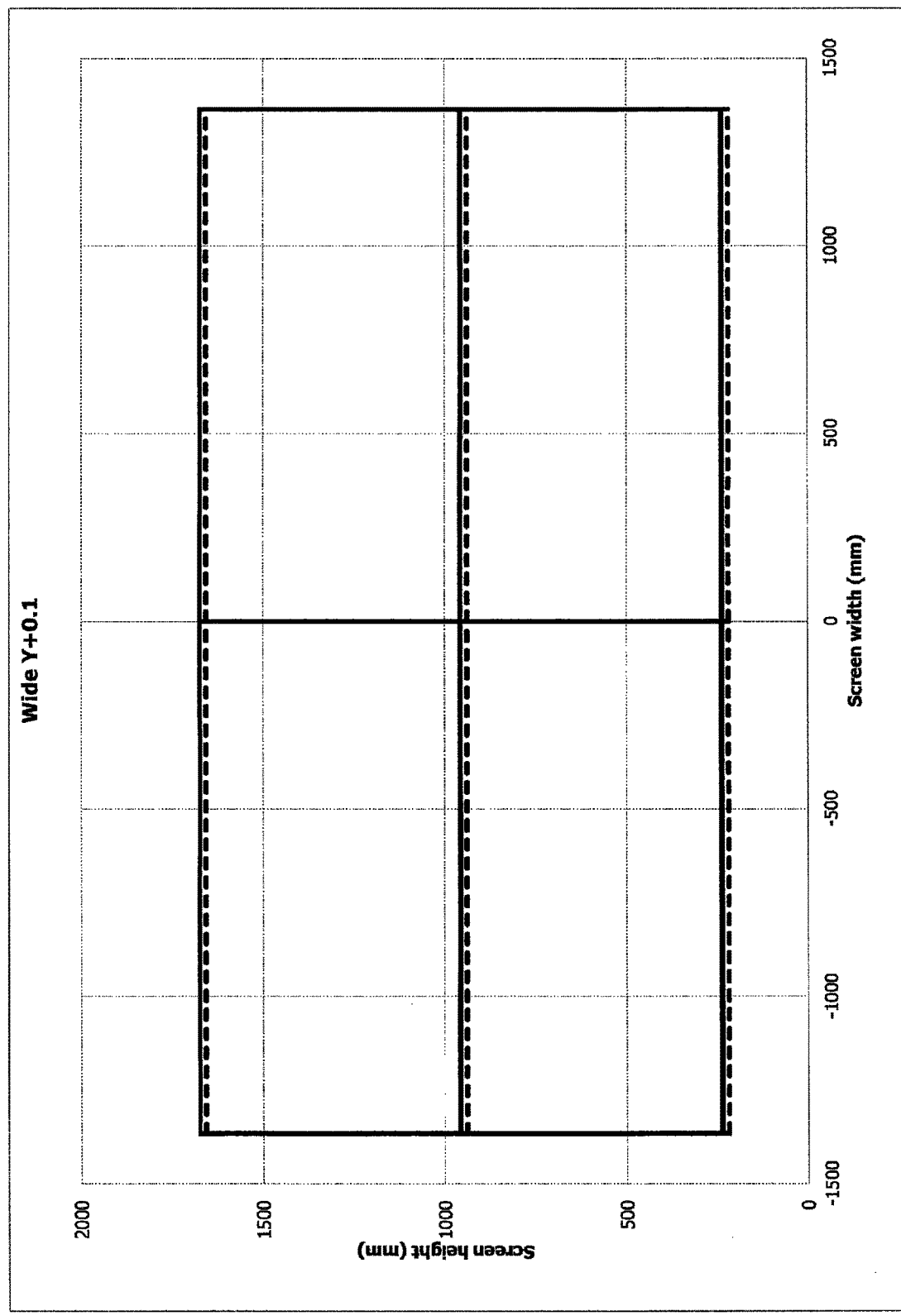

[Fig. 11B]
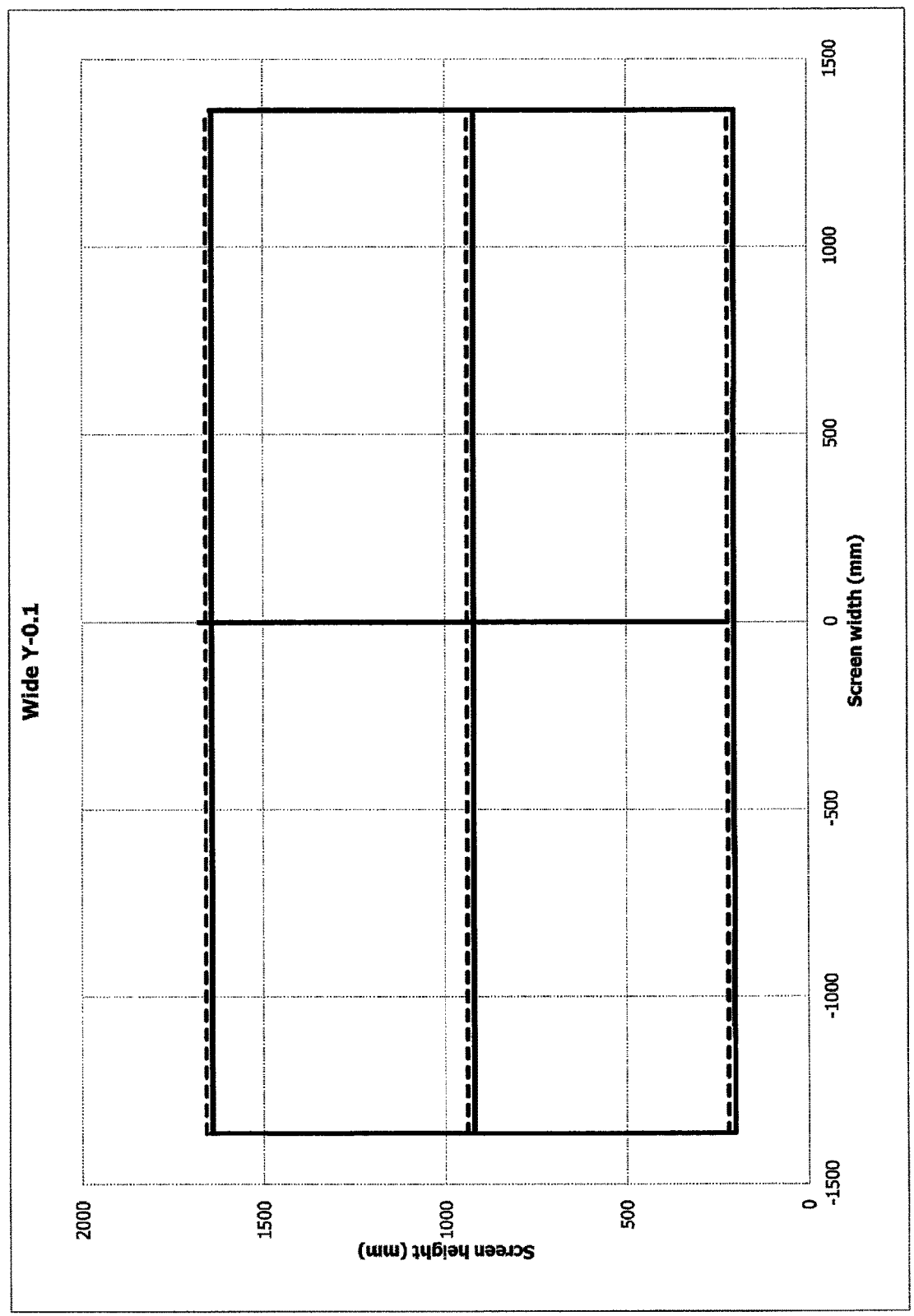

[Fig. 11C]
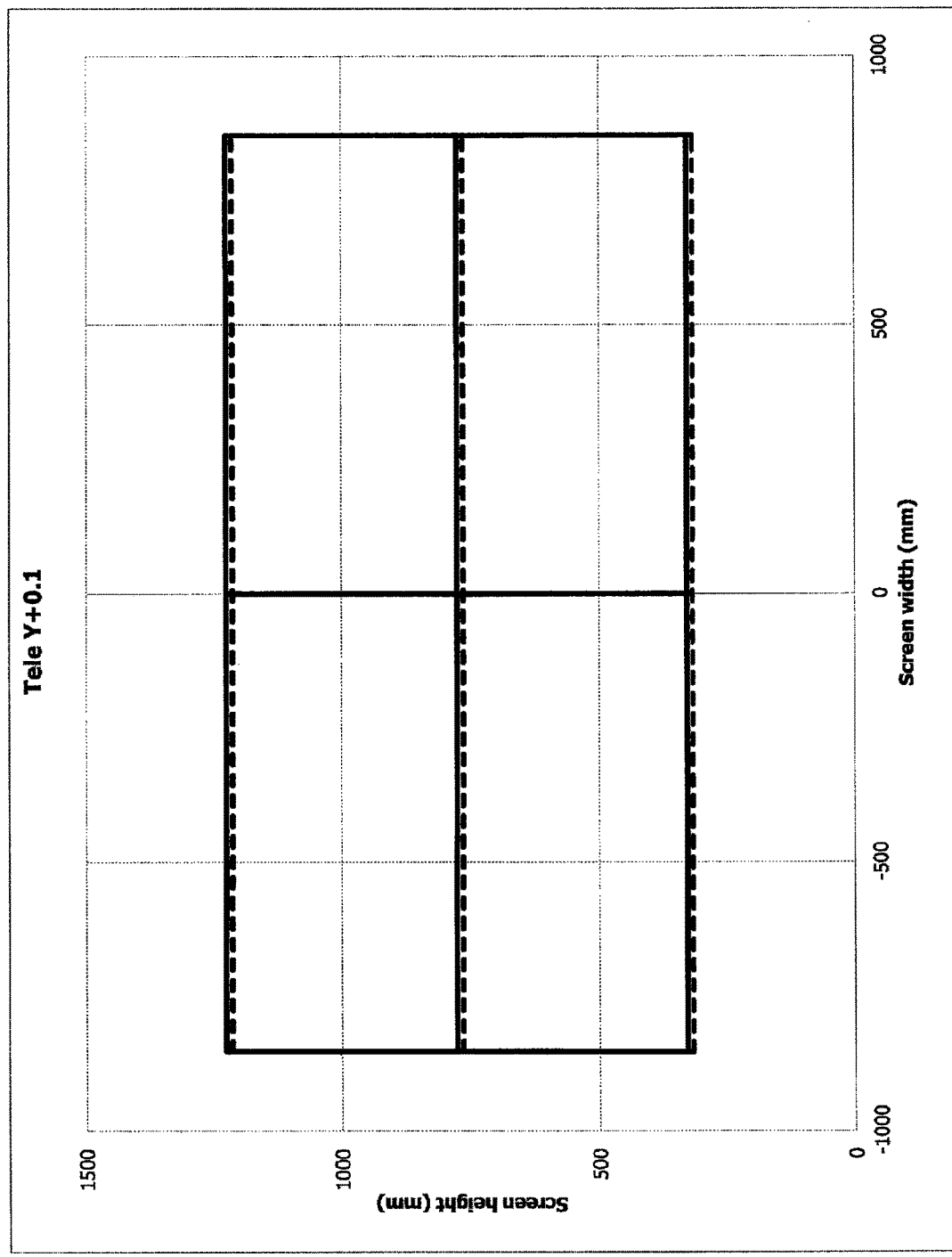

[Fig. 11D]
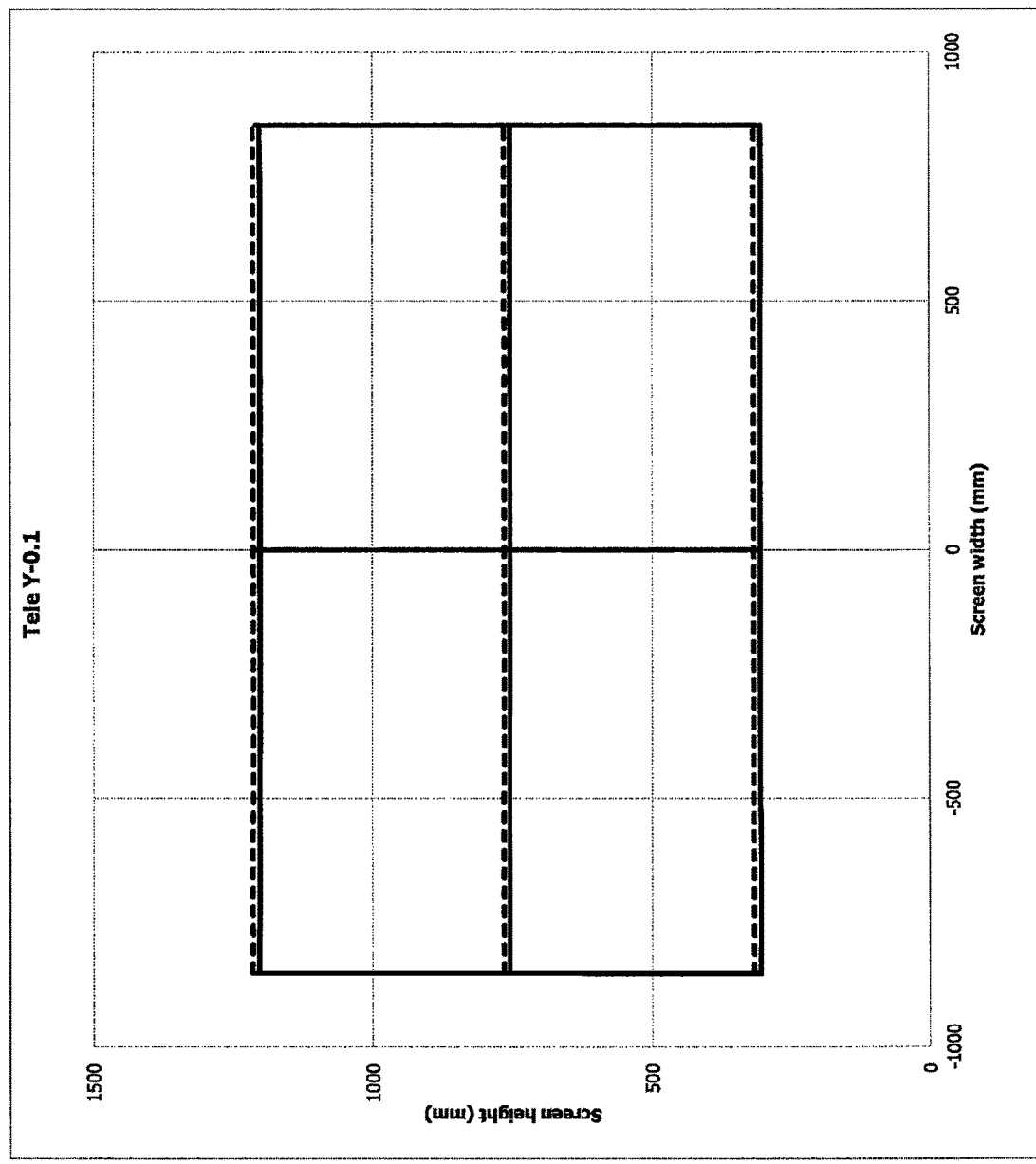

[Fig. 12]
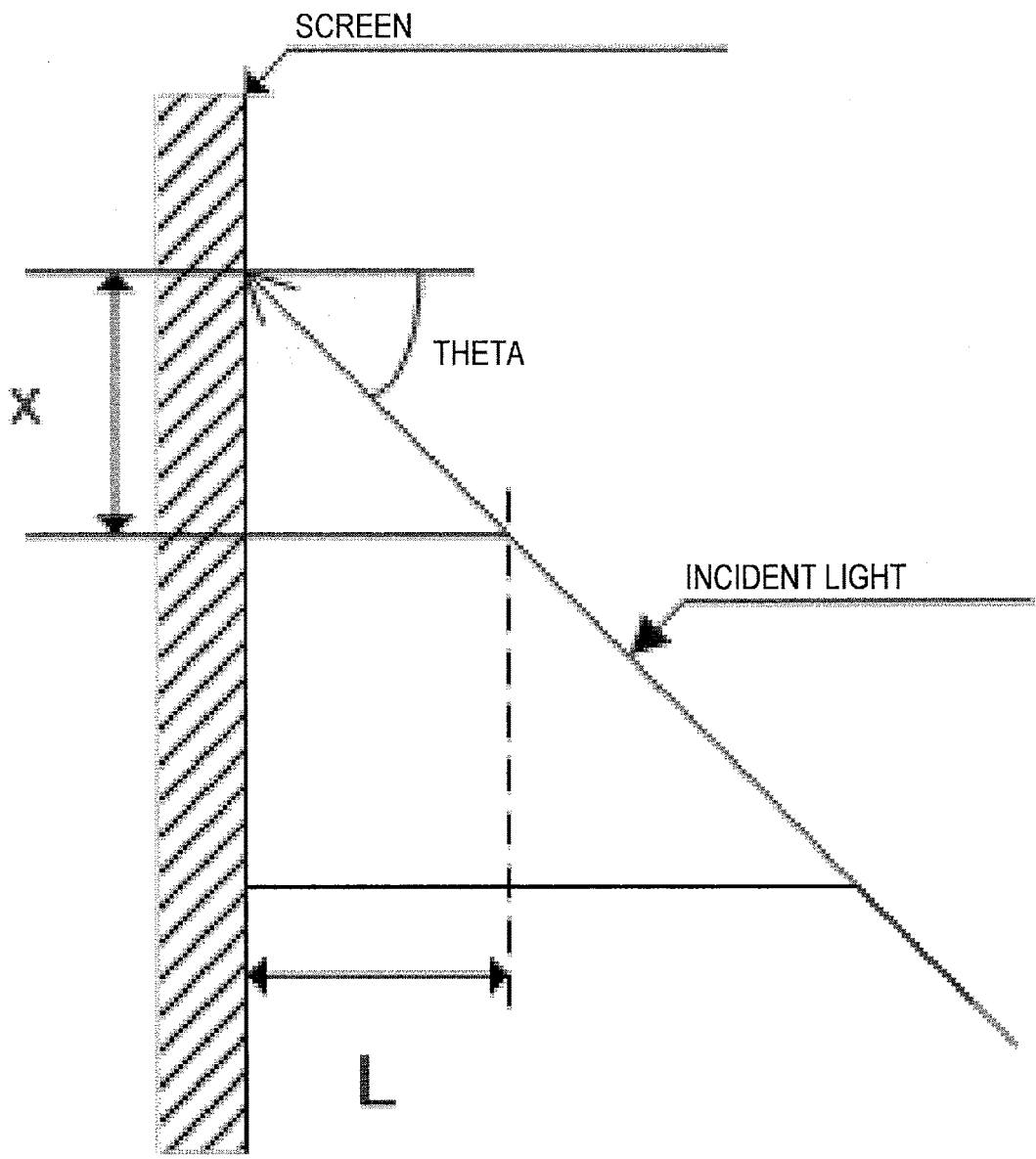

[Fig. 13]
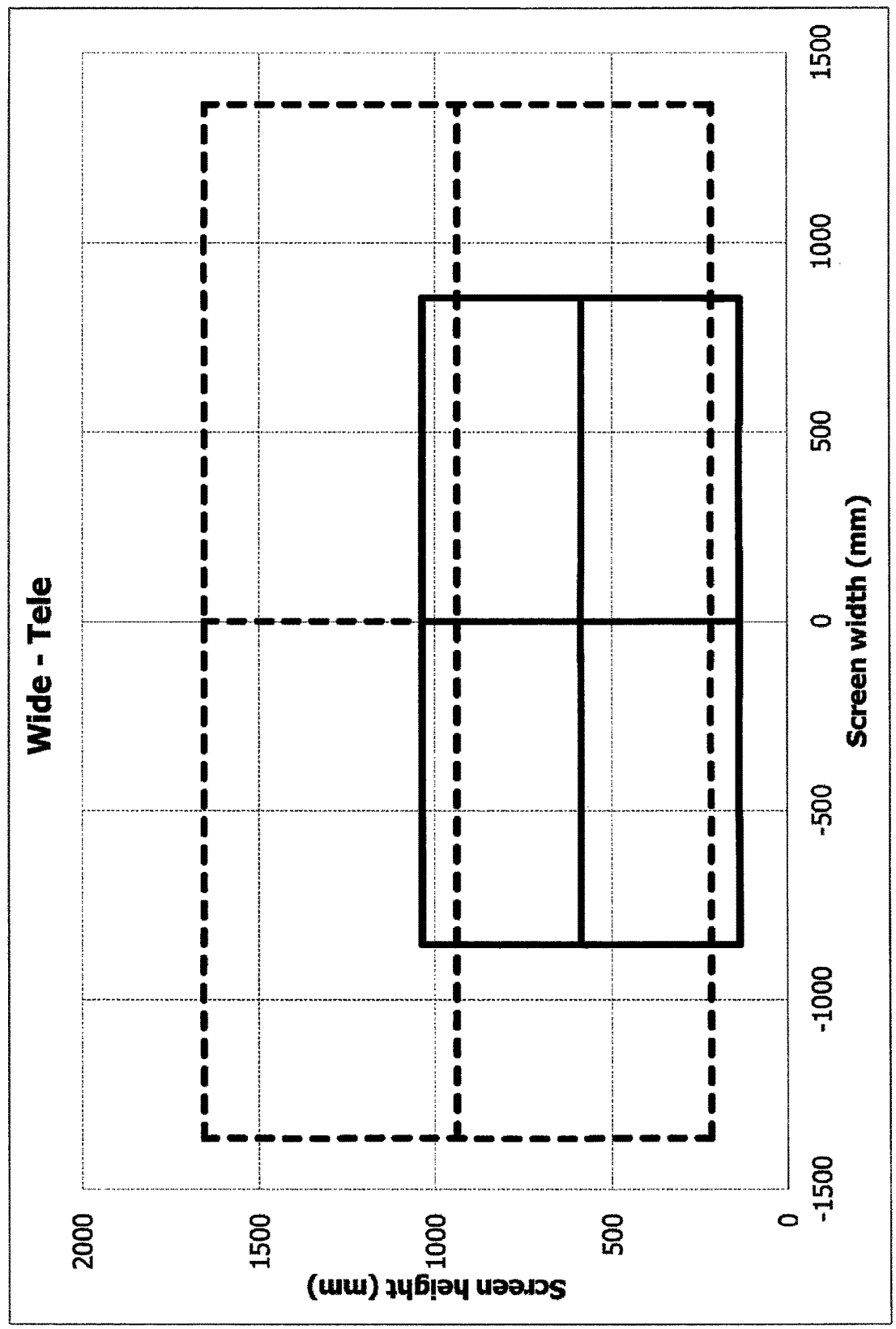

[Fig. 14]
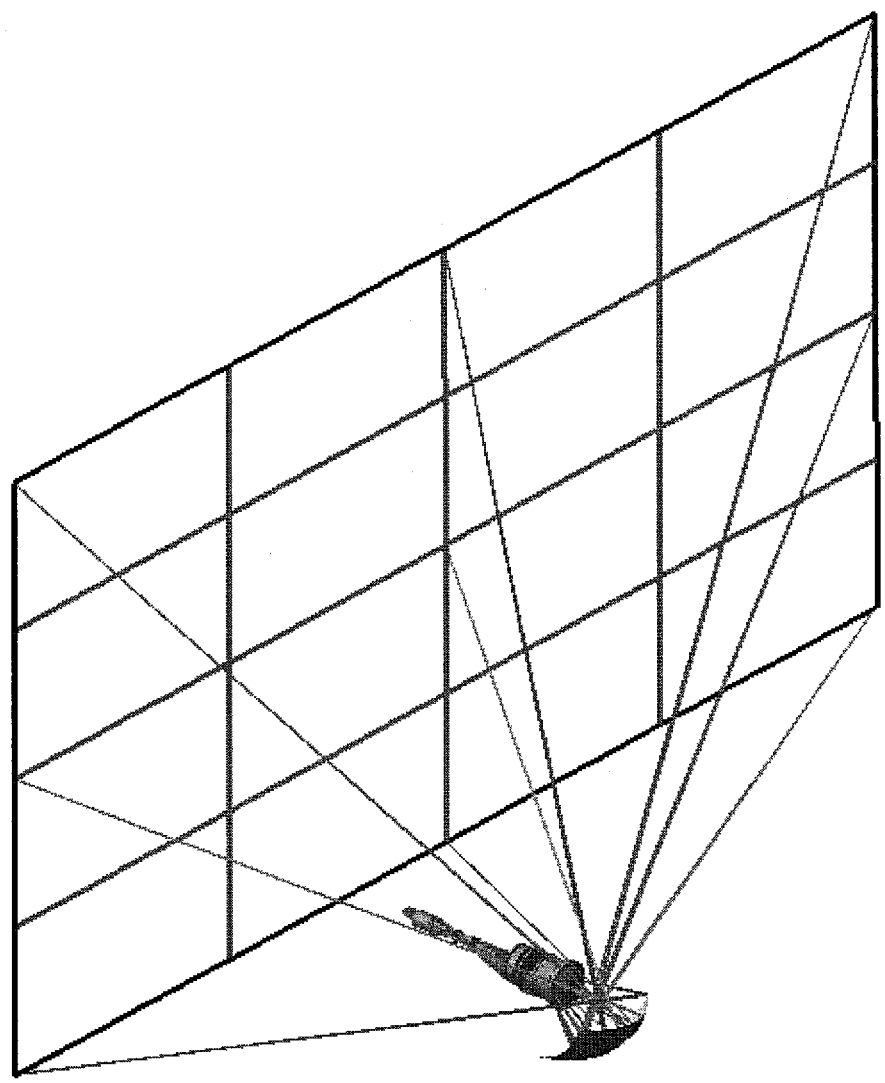

[Fig. 15]
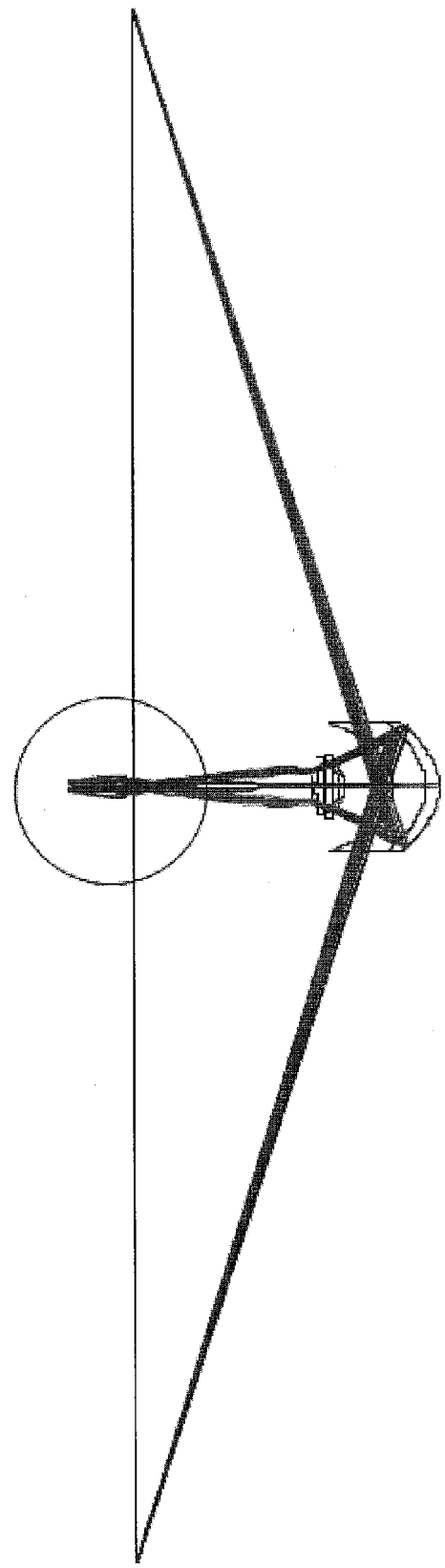

[Fig. 16]
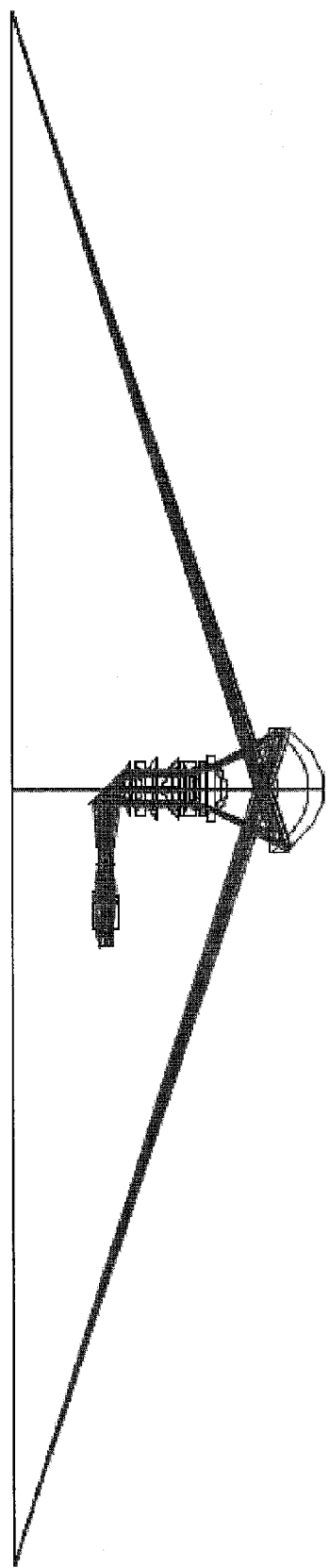

[Fig. 17A]
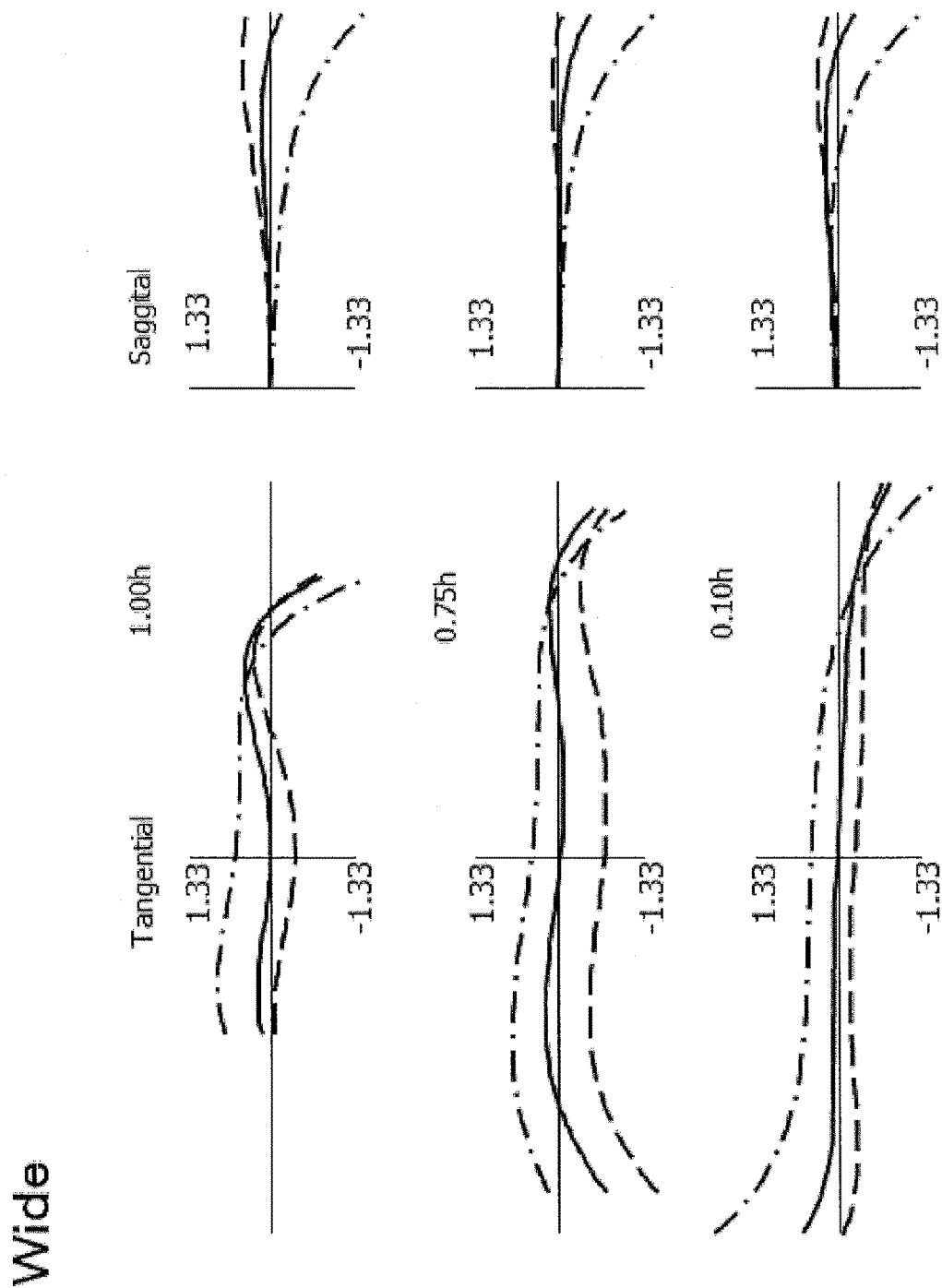

[Fig. 17B]
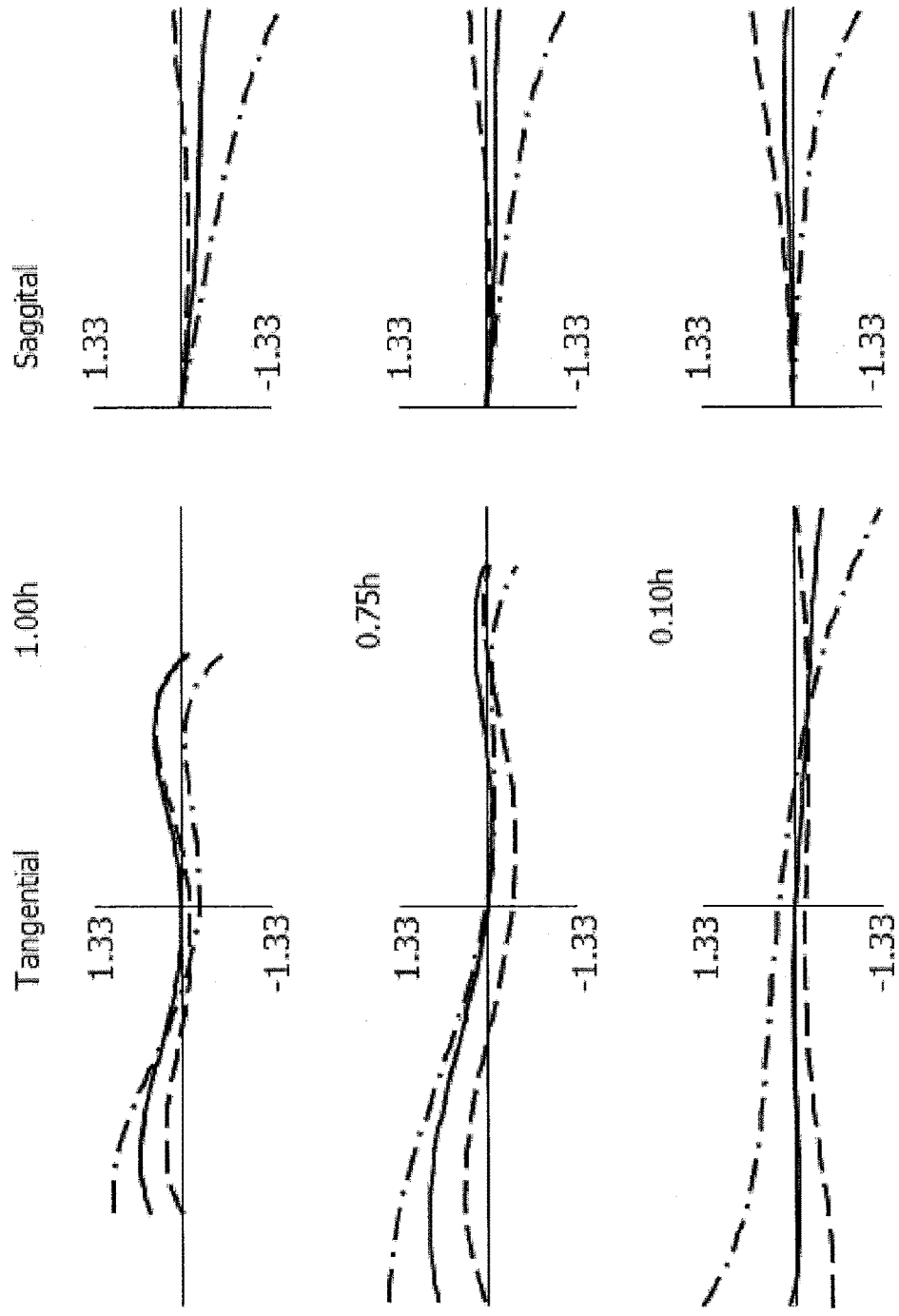

[Fig. 17C]
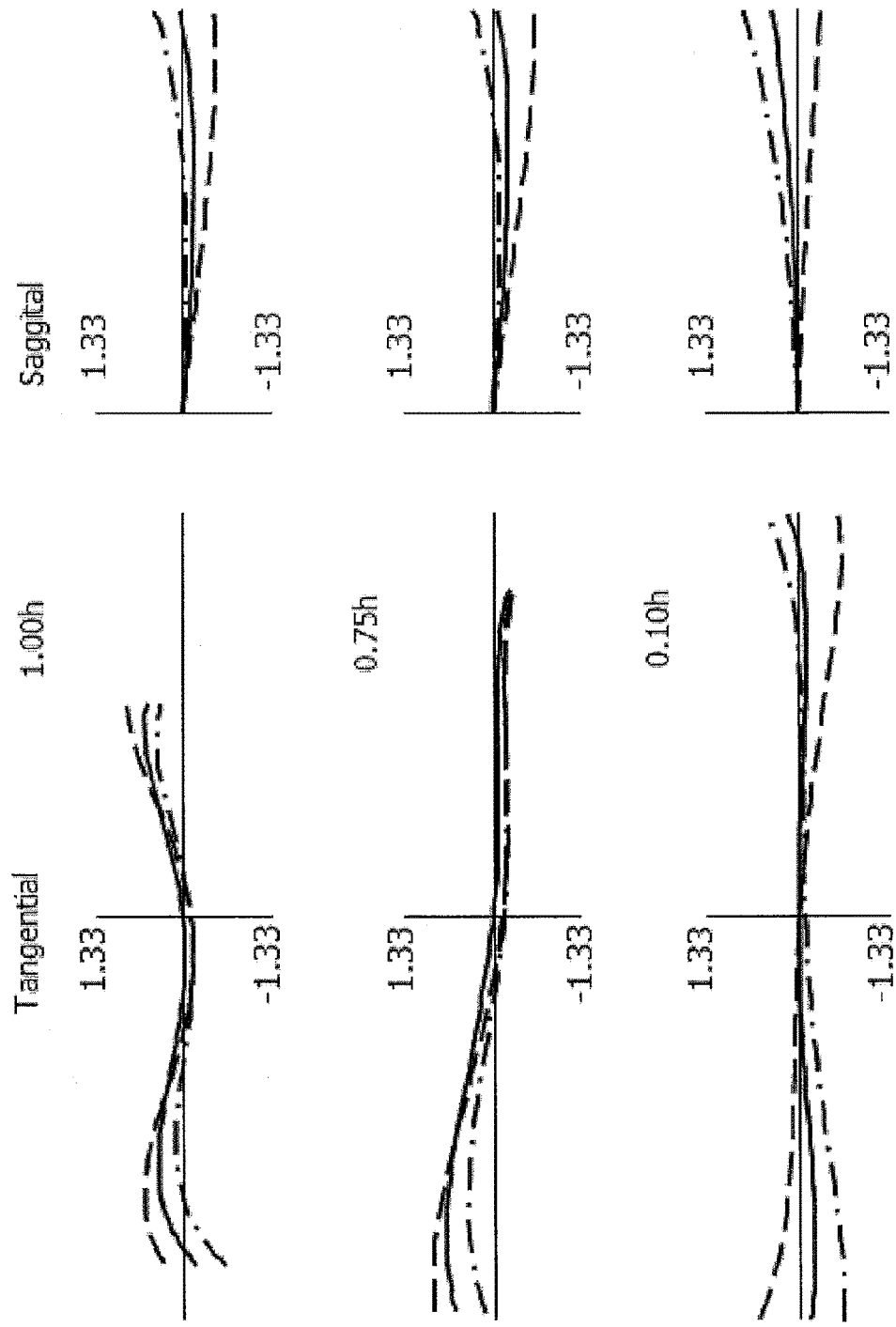

[Fig. 17D]
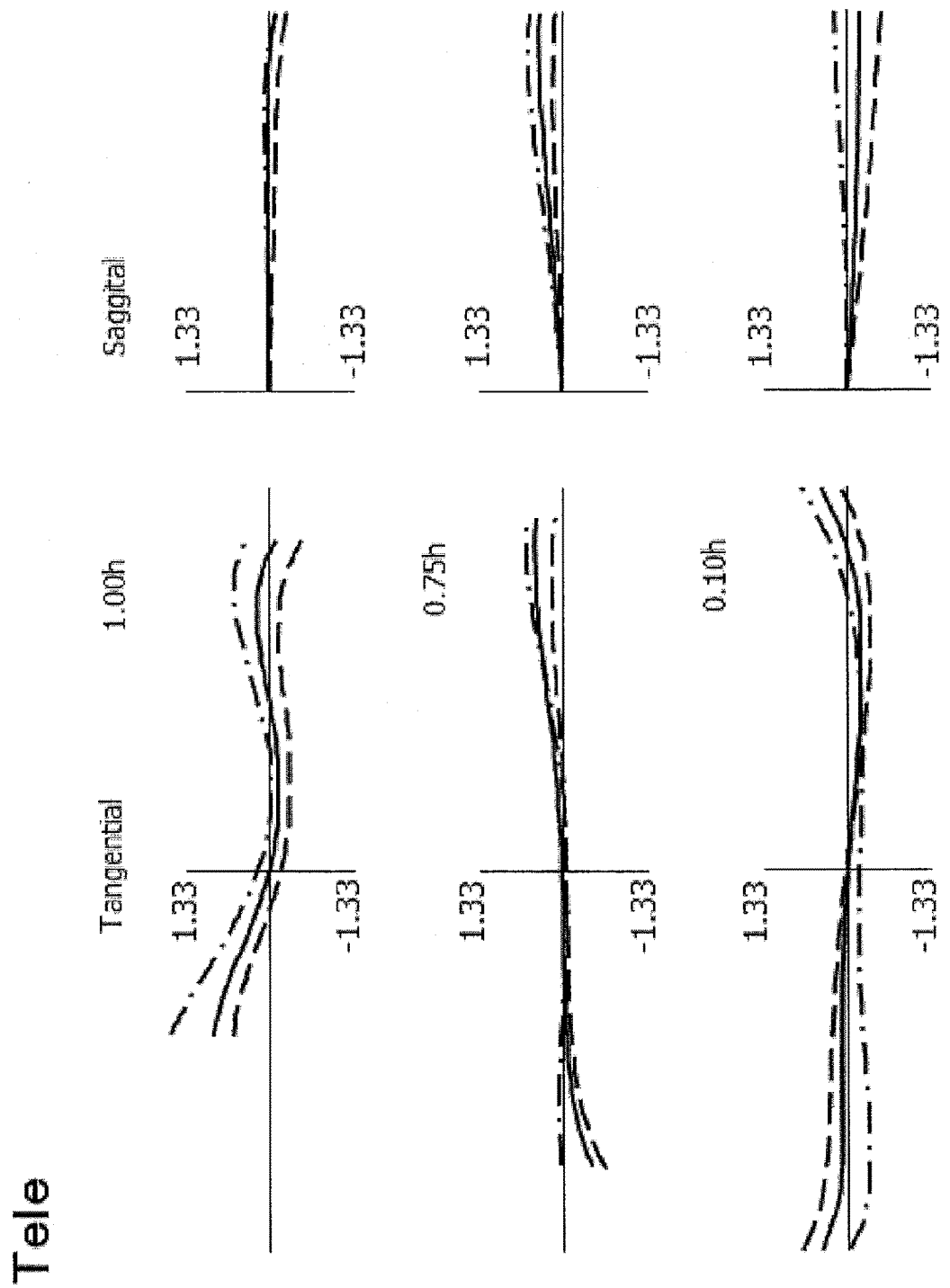

[Fig. 18A]
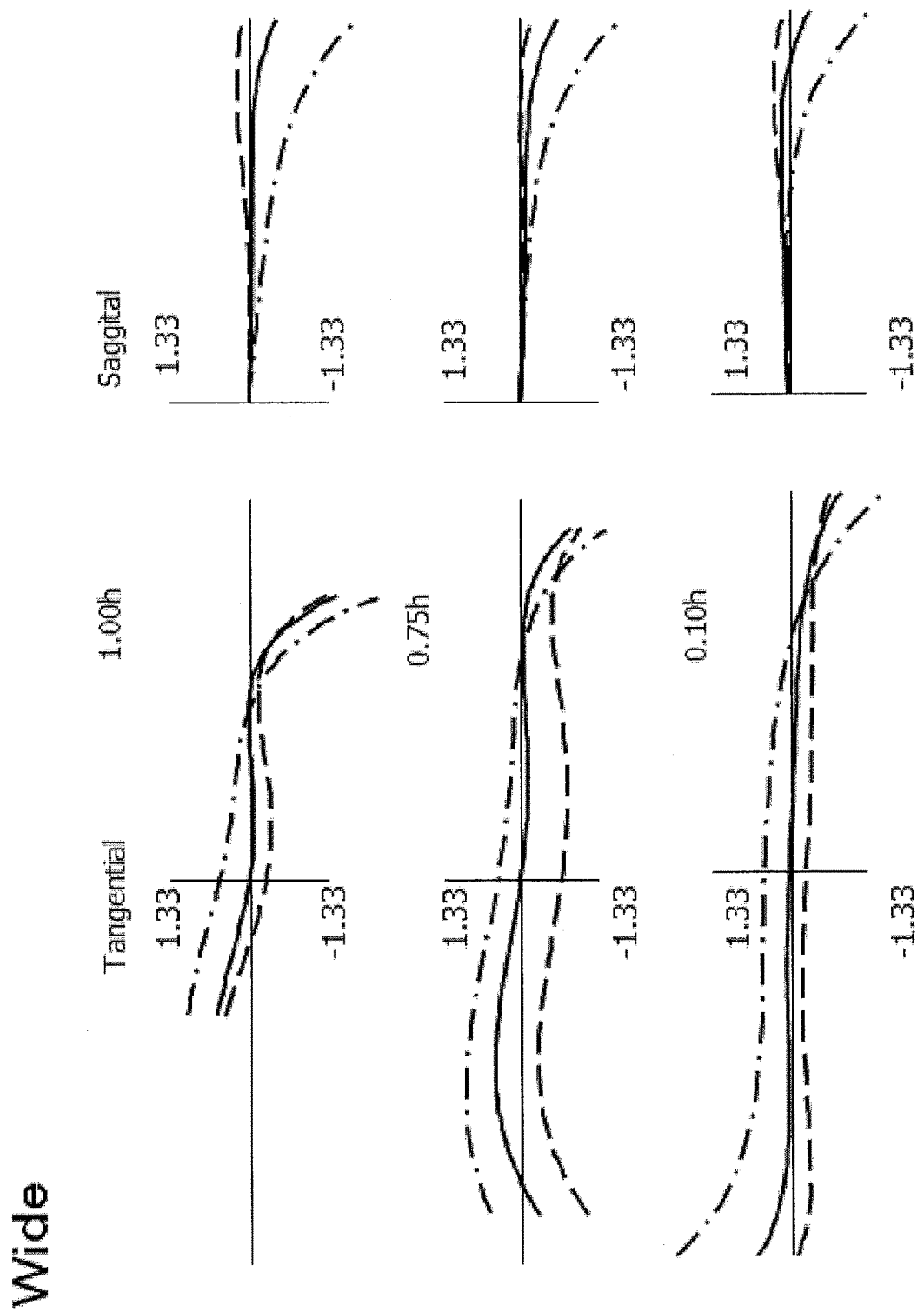

[Fig. 18B]
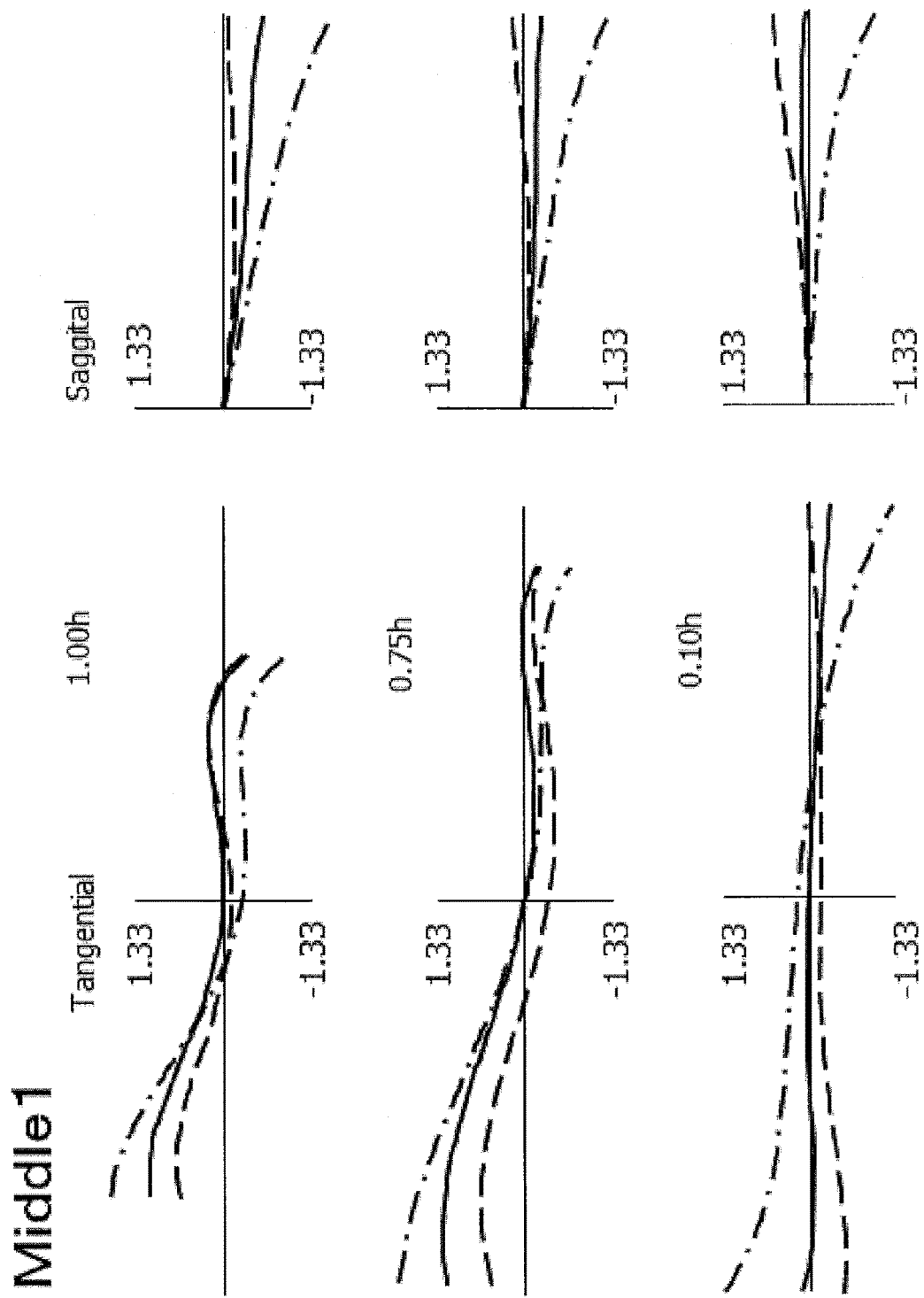

[Fig. 18C]
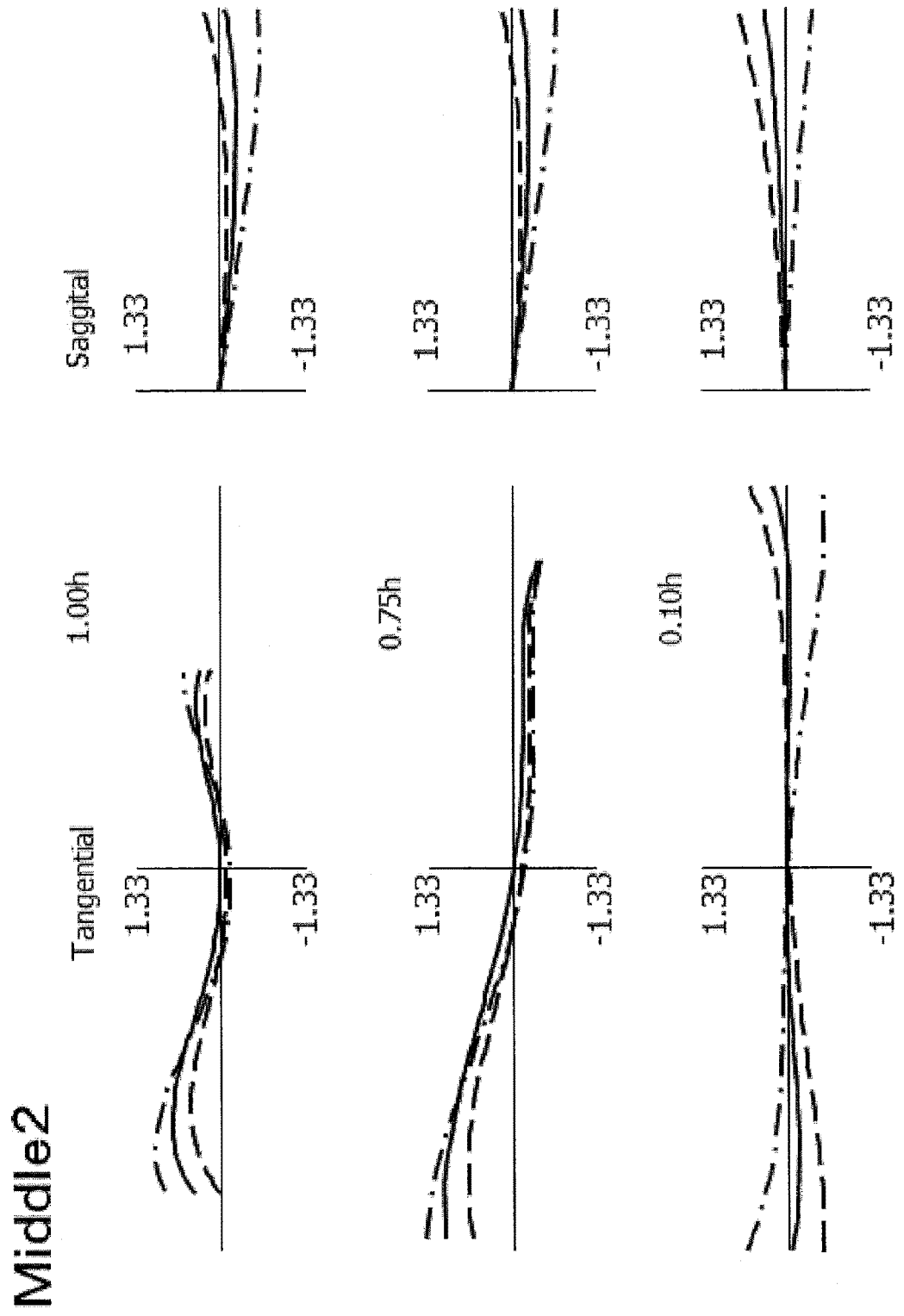

[Fig. 18D]
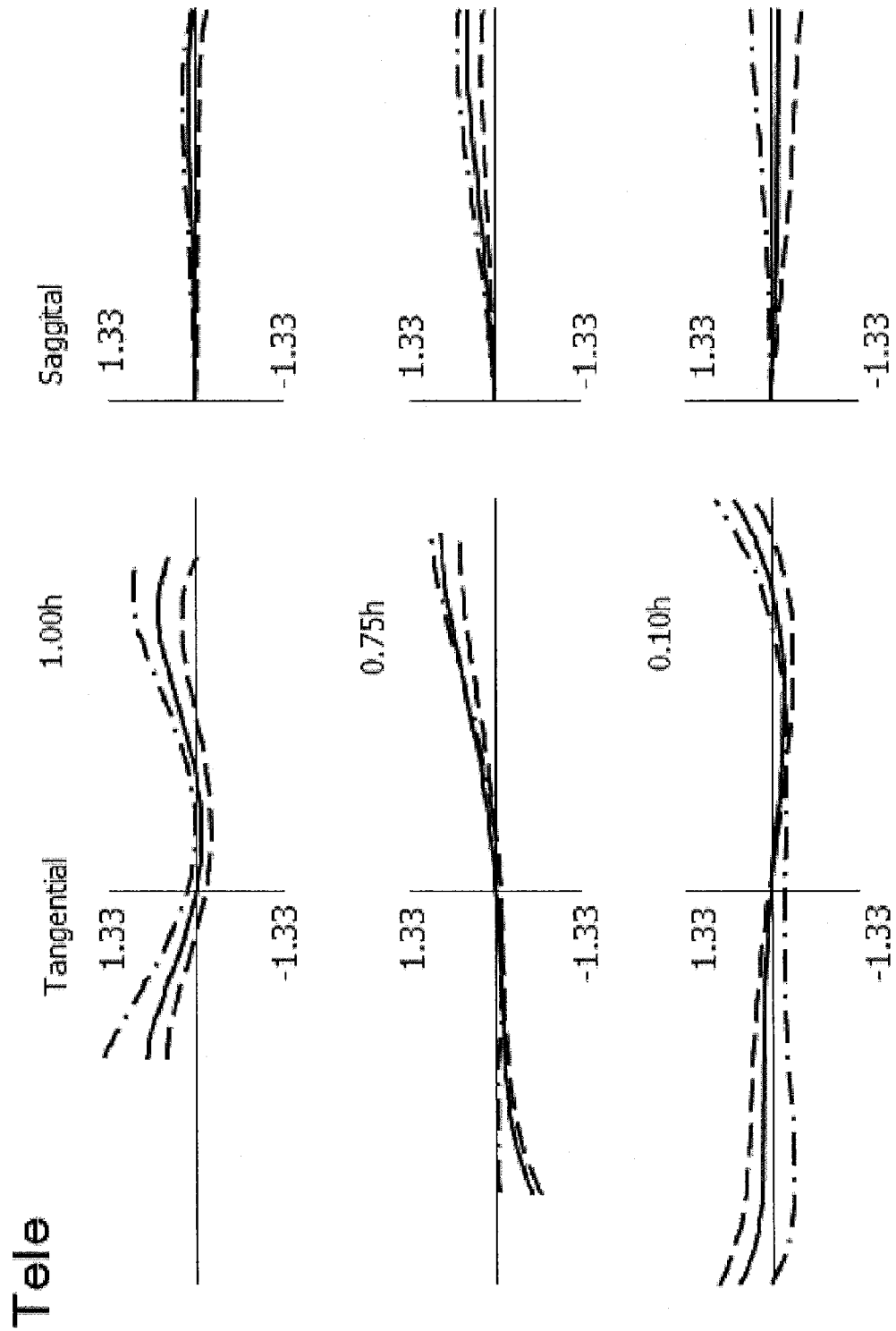

[Fig. 19A]
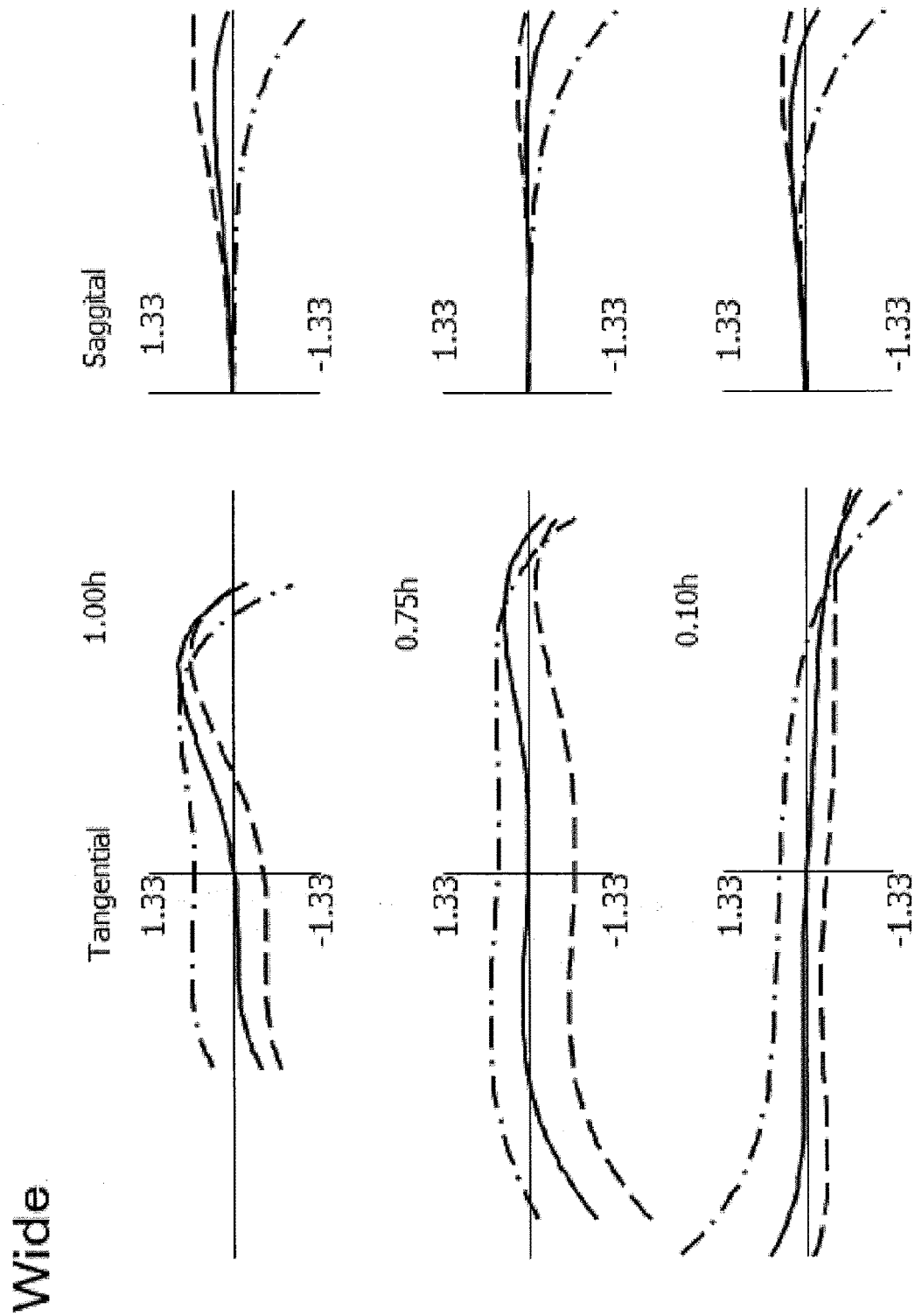

[Fig. 19B]
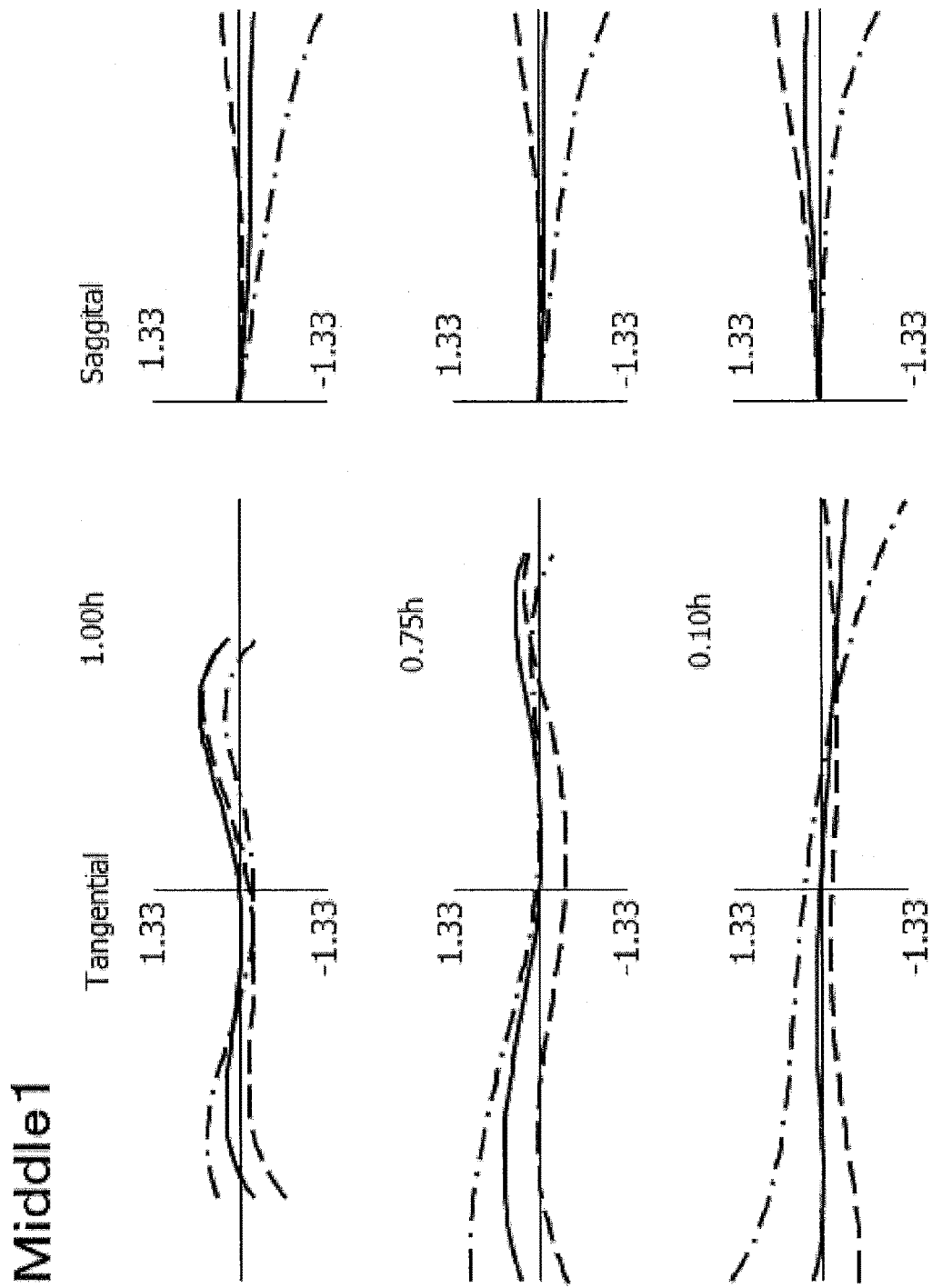

[Fig. 19C]
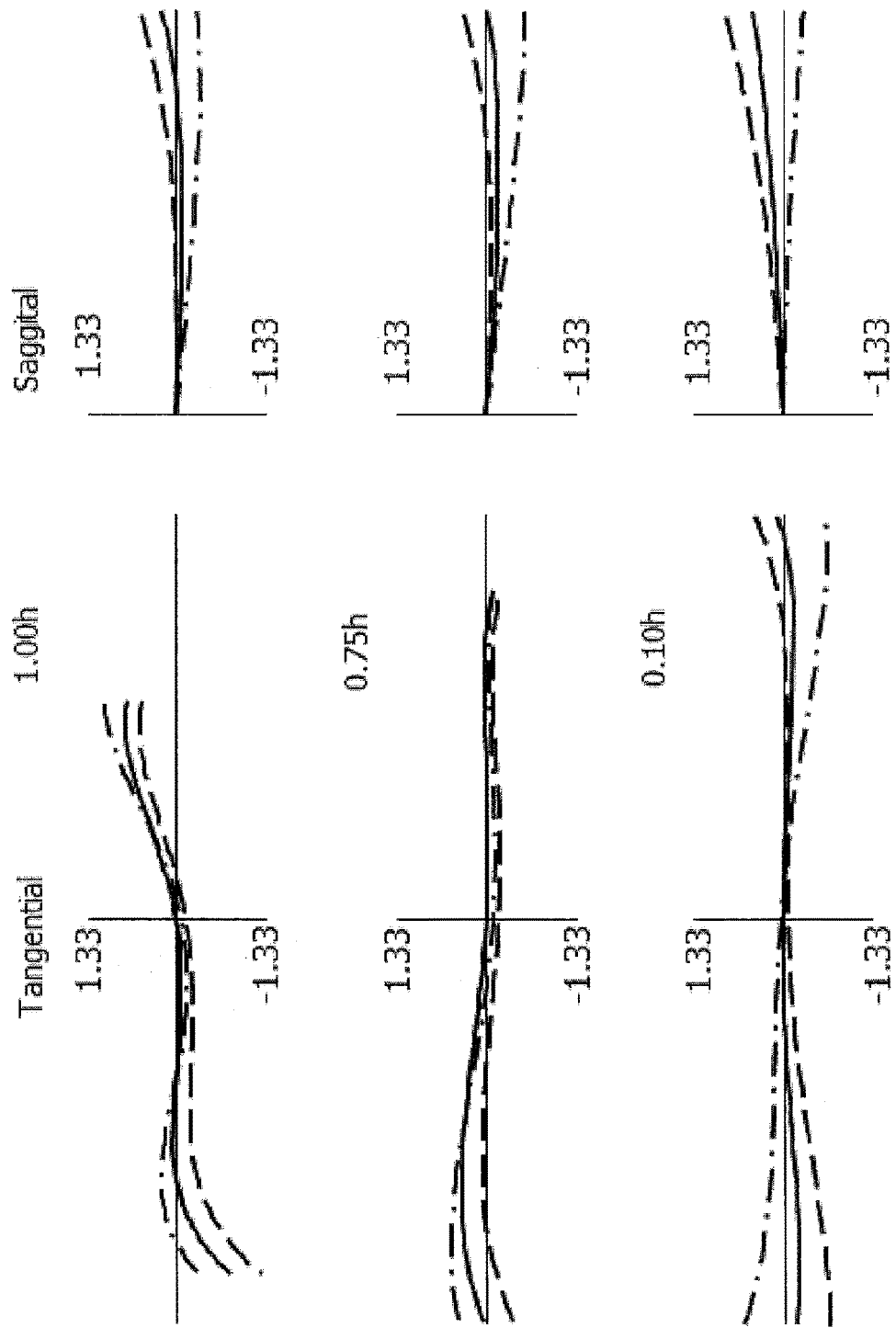

[Fig. 19D]
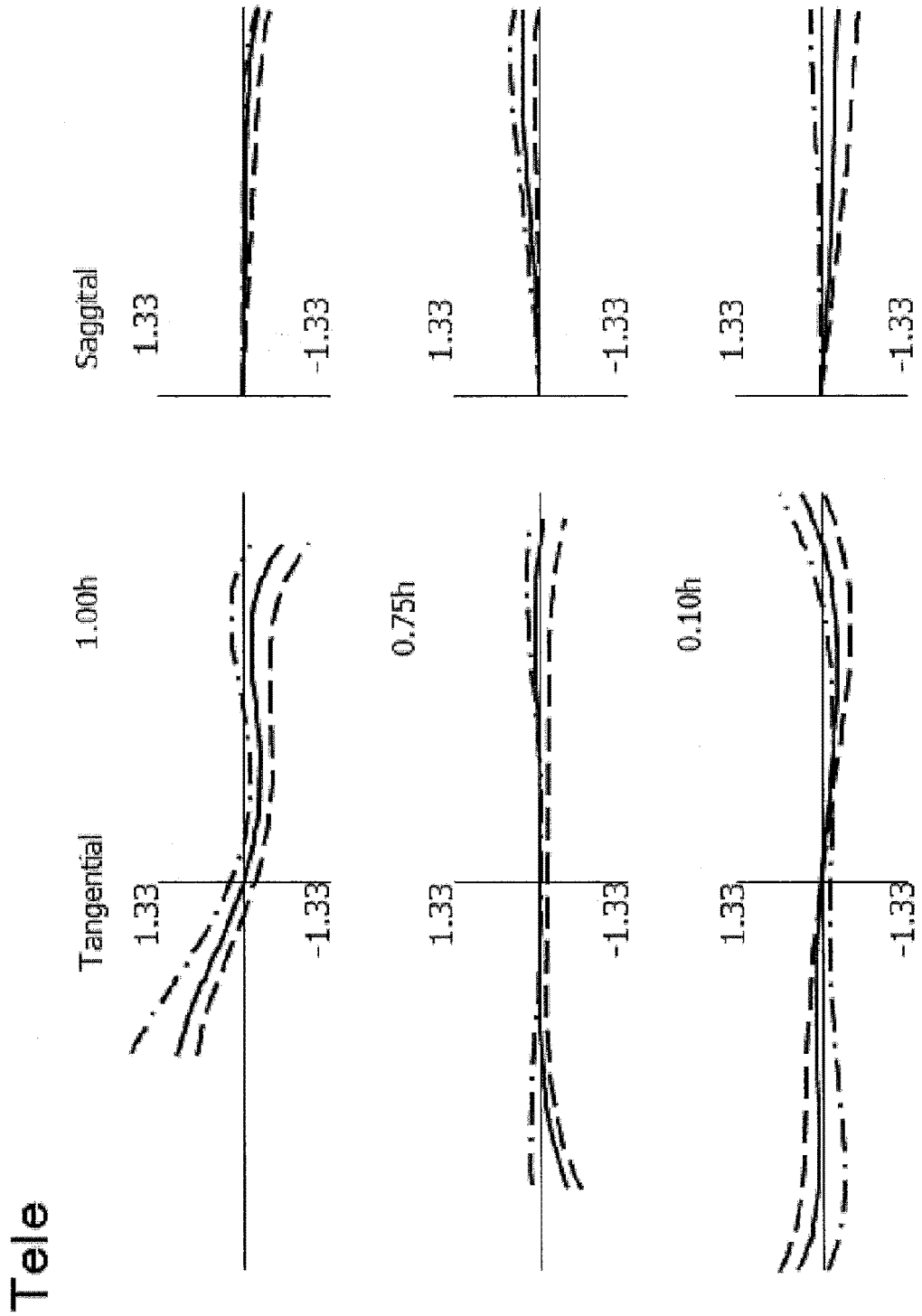

[Fig. 20]

| | MF | SF | r | d | nd | Nd | REMARKS |
|---|---|---|---|---|---|---|---|
| PRIMARY IMAGE PLANE | | | inf | 34.186 | | | |
| s1 | | | inf | 43.500 | 1.51852 | 64.2 | COLOR SYNTHESIS PRISM ETC. |
| s2 | | | inf | 5.000 | | | |
| s3 | | | 509.930 | 4.000 | 1.80809 | 22.8 | |
| s4 | | | −122.262 | (d4) | | | |
| s5 | | | 39.993 | 7.800 | 1.43875 | 95.0 | |
| s6 | | | −901.618 | 0.400 | | | |
| s7 | | | 90.926 | 3.600 | 1.48749 | 70.4 | |
| s8 | | | 941.580 | 0.220 | | | |
| s9 | (2) | | 70.004 | 1.500 | 1.90366 | 31.3 | |
| s10 | | | 29.908 | 3.000 | | | |
| s11 | | | 37.973 | 8.600 | 1.60300 | 65.5 | |
| s12 | | | −39.704 | 2.000 | 1.80610 | 40.7 | |
| s13 | | | 81.575 | (d13) | | | |
| s14 | (3) | | 176.637 | 3.600 | 1.48749 | 70.4 | |
| s15 | | | −133.905 | (d15) | | | |
| s16 | (4) | | −80.872 | 2.300 | 1.59270 | 35.3 | |
| s17 | | | −45.911 | 0.200 | | | |
| s18 | | | inf | (d18) | | | APERTURE |
| s19 | | | −1041.978 | 2.500 | 1.74400 | 44.8 | |
| s20 | | | 45.056 | 2.800 | | | |
| s21 | (5) | | 43.811 | 9.500 | 1.58114 | 40.9 | |
| s22 | | | −32.614 | 1.500 | 1.74400 | 44.8 | |
| s23 | | | −415.768 | (d23) | | | |
| s24 | | | inf | 75.800 | | | |
| s25 | ○ | | inf | 30.000 | | | FOLDING MIRROR ARRANGEMENT |
| s26 | | | inf | 0.000 | | | |
| s27 | | | inf | 1.928 | | | |
| s28 | | | 113.988 | 15.300 | 1.62004 | 36.3 | |
| s29 | | | −280.909 | 15.700 | | | |
| s30 | | | −91.876 | 3.700 | 1.67790 | 55.5 | |
| s31 | | | 283.285 | 0.200 | | | |
| s32 | | | 72.297 | 16.000 | 1.51852 | 64.2 | |
| s33 | | | 160.504 | 20.200 | | | |
| s34 | | | 64.102 | 14.000 | 1.51852 | 64.2 | |
| s35 | | | 95.948 | 12.300 | | | |
| s36 | | | 449.805 | 4.000 | 1.84666 | 23.8 | |
| s37 | | | 189.965 | 12.000 | | | |
| s38 | | | −162.795 | 4.000 | 1.71700 | 47.9 | |
| s39 | | | 94.711 | 2.600 | | | |
| s40 | * | | −14.208 | 8.500 | 1.53315 | 56.0 | |
| s41 | * | | −5.847 | 16.967 | | | |
| s42 | | | inf | 23.400 | | | |
| s43 | * | | −10.384 | 9.000 | 1.53315 | 56.0 | |
| s44 | * | | 11.445 | 1.000 | | | |
| s45 | | | inf | 172.059 | | | |
| s46 | * | | −88.461 | −546.270 | | | CURVED REFLECTIVE SURFACE |
| s47 SECONDARY IMAGE PLANE | | | inf | | | | |

\* ··· ASPHERICAL SURFACE
○ ··· DUMMY SURFACE

[Fig. 21]

| NUMERICAL APERTURE NA ON PRIMARY IMAGE PLANE SIDE | 0.15379 |
|---|---|
| MAXIMUM HALF-VIEWING ANGLE W | 79.4deg. |
| MAXIMUM OBJECT HEIGHT y | 13.050 |

[Fig. 22]

| DOT SIZE (mu m) | 4.0500 |
|---|---|
| LATERAL LENGTH | 16.589 |
| LONGITUDINAL LENGTH | 8.7480 |
| DISTANCE BETWEEN OPTICAL AXIS AND ELEMENT CENTER | 5.7010 |

[Fig. 23]

| S40 | |
|---|---|
| C | -7.03807E-02 |
| K | -2.23876E+00 |
| A( 1) | |
| A( 2) | 3.68730E-02 |
| A( 3) | -1.55159E-04 |
| A( 4) | -1.65113E-05 |
| A( 5) | 4.33153E-07 |
| A( 6) | -2.02410E-09 |
| A( 7) | -5.87292E-11 |
| A( 8) | 1.49059E-12 |
| A( 9) | |
| A(10) | -1.62906E-15 |
| A(11) | |
| A(12) | 9.99793E-19 |
| A(13) | |
| A(14) | -2.59903E-22 |
| A(15) | |
| A(16) | 2.35616E-26 |

| S41 | |
|---|---|
| C | -1.71031E-01 |
| K | -1.11698E+00 |
| A( 1) | |
| A( 2) | 8.72827E-02 |
| A( 3) | -9.75622E-05 |
| A( 4) | -4.36824E-05 |
| A( 5) | 5.18327E-07 |
| A( 6) | 1.13449E-08 |
| A( 7) | -7.49725E-12 |
| A( 8) | -7.72306E-12 |
| A( 9) | |
| A(10) | 1.99516E-15 |
| A(11) | |
| A(12) | -2.76972E-20 |
| A(13) | |
| A(14) | -8.87134E-23 |
| A(15) | |
| A(16) | 1.20840E-26 |

| S43 | |
|---|---|
| C | -9.62985E-02 |
| K | -9.92449E-01 |
| A( 1) | |
| A( 2) | 4.92678E-02 |
| A( 3) | -3.79240E-07 |
| A( 4) | -3.44079E-05 |
| A( 5) | 1.38145E-06 |
| A( 6) | -1.24260E-08 |
| A( 7) | -3.26072E-10 |
| A( 8) | -1.26030E-12 |
| A( 9) | 8.04754E-14 |
| A(10) | 6.20400E-15 |
| A(11) | |
| A(12) | -3.59439E-18 |
| A(13) | |
| A(14) | 7.76561E-22 |
| A(15) | |
| A(16) | -6.26624E-26 |

| S44 | |
|---|---|
| C | 8.73773E-02 |
| K | -1.31300E+00 |
| A( 1) | |
| A( 2) | -4.11356E-02 |
| A( 3) | -5.03375E-05 |
| A( 4) | 3.21911E-06 |
| A( 5) | 3.52305E-07 |
| A( 6) | -9.30027E-09 |
| A( 7) | -8.57127E-11 |
| A( 8) | 7.32934E-13 |
| A( 9) | 7.25786E-14 |
| A(10) | -1.79670E-16 |
| A(11) | |
| A(12) | -1.70083E-19 |
| A(13) | |
| A(14) | -1.63768E-23 |
| A(15) | |
| A(16) | 6.16308E-27 |

| S46 | |
|---|---|
| C | -2.60003E-02 |
| K | -9.97934E-01 |
| A( 1) | -3.62707E-03 |
| A( 2) | 7.46368E-03 |
| A( 3) | -3.19654E-06 |
| A( 4) | 5.53044E-08 |
| A( 5) | 6.65844E-10 |
| A( 6) | -6.69379E-12 |
| A( 7) | -2.12006E-14 |
| A( 8) | 2.66332E-16 |
| A( 9) | |
| A(10) | -7.78995E-21 |
| A(11) | |
| A(12) | 2.92186E-25 |
| A(13) | |
| A(14) | -6.95233E-30 |
| A(15) | |
| A(16) | |

[Fig. 24]

|  |  | Wide | Middle1 | Middle2 | Tele |
|---|---|---|---|---|---|
| COMPOSITE FOCAL LENGTH | FL (550nm) | 3.152 | 3.780 | 4.408 | 5.034 |
| SCREEN SHIFT FUNCTION 1 | s3-s24 | 0.000 | -0.457 | -0.975 | -1.548 |
| MAGNIFICATION FUNCTION MF | d4 | 1.048 | 9.014 | 16.820 | 25.041 |
|  | d13 | 3.068 | 14.534 | 25.112 | 34.102 |
|  | d15 | 24.271 | 18.297 | 10.457 | 1.596 |
|  | d18 | 29.925 | 16.479 | 7.954 | 2.383 |
|  | d23 | 8.809 | 8.797 | 6.778 | 4.000 |
| SCREEN SHIFT FUNCTION 2 | s3-s24 | +/-0.1 | | | |

[Fig. 25]

|  |  | Wide | Middle1 | Middle2 | Tele |
|---|---|---|---|---|---|
| REFRACTIVE POWER P(1) | s3-s4 | 0.00812 | 0.00812 | 0.00812 | 0.00812 |
| REFRACTIVE POWER P(2) | s5-s13 | 0.00263 | 0.00263 | 0.00263 | 0.00263 |
| REFRACTIVE POWER P(3) | s14-s15 | 0.00636 | 0.00636 | 0.00636 | 0.00636 |
| REFRACTIVE POWER P(4) | s16-s17 | 0.00569 | 0.00569 | 0.00569 | 0.00569 |
| REFRACTIVE POWER P(5) | s18-s23 | -0.00671 | -0.00671 | -0.00671 | -0.00671 |
| REFRACTIVE POWER P(1-s) | s3-s18 | 0.01667 | 0.01492 | 0.01340 | 0.01207 |
| REFRACTIVE POWER P11 | s3-s23 | 0.01913 | 0.01613 | 0.01397 | 0.01234 |
| REFRACTIVE POWER P12 | s28-s44 | -0.00336 | -0.00336 | -0.00336 | -0.00336 |
| REFRACTIVE POWER P1 | s3-s44 | 0.06348 | 0.05311 | 0.04568 | 0.04009 |
| REFRACTIVE POWER P2 | s46 | -0.02215 | -0.02215 | -0.02215 | -0.02215 |
| REFRACTIVE POWER P all | s3-s46 | 0.31726 | 0.26455 | 0.22687 | 0.19864 |

|  | Wide | Middle1 | Middle2 | Tele |
|---|---|---|---|---|
| MOVEMENT AMOUNT (2) | 0.000 | 7.965 | 15.772 | 23.992 |
| MOVEMENT AMOUNT (3) | 0.000 | 19.432 | 37.816 | 55.027 |
| MOVEMENT AMOUNT (4) | 0.000 | 13.457 | 24.002 | 32.351 |
| MOVEMENT AMOUNT (5) | 0.000 | 0.012 | 2.032 | 4.809 |

[Fig. 26]

|  | Wide | Middle1 | Middle2 | Tele |
|---|---|---|---|---|
| Ps x FL | 0.06029 | 0.06097 | 0.06160 | 0.06210 |
| Ps / P1 | 0.30128 | 0.30373 | 0.30593 | 0.30773 |
| Pm / P1 | 0.10022 | 0.11979 | 0.13928 | 0.15869 |
| \|SF\| / FL | 0.00000 | 0.12083 | 0.22127 | 0.30754 |
| Pw / Pt | 1.597 | | | |

[Fig. 27]
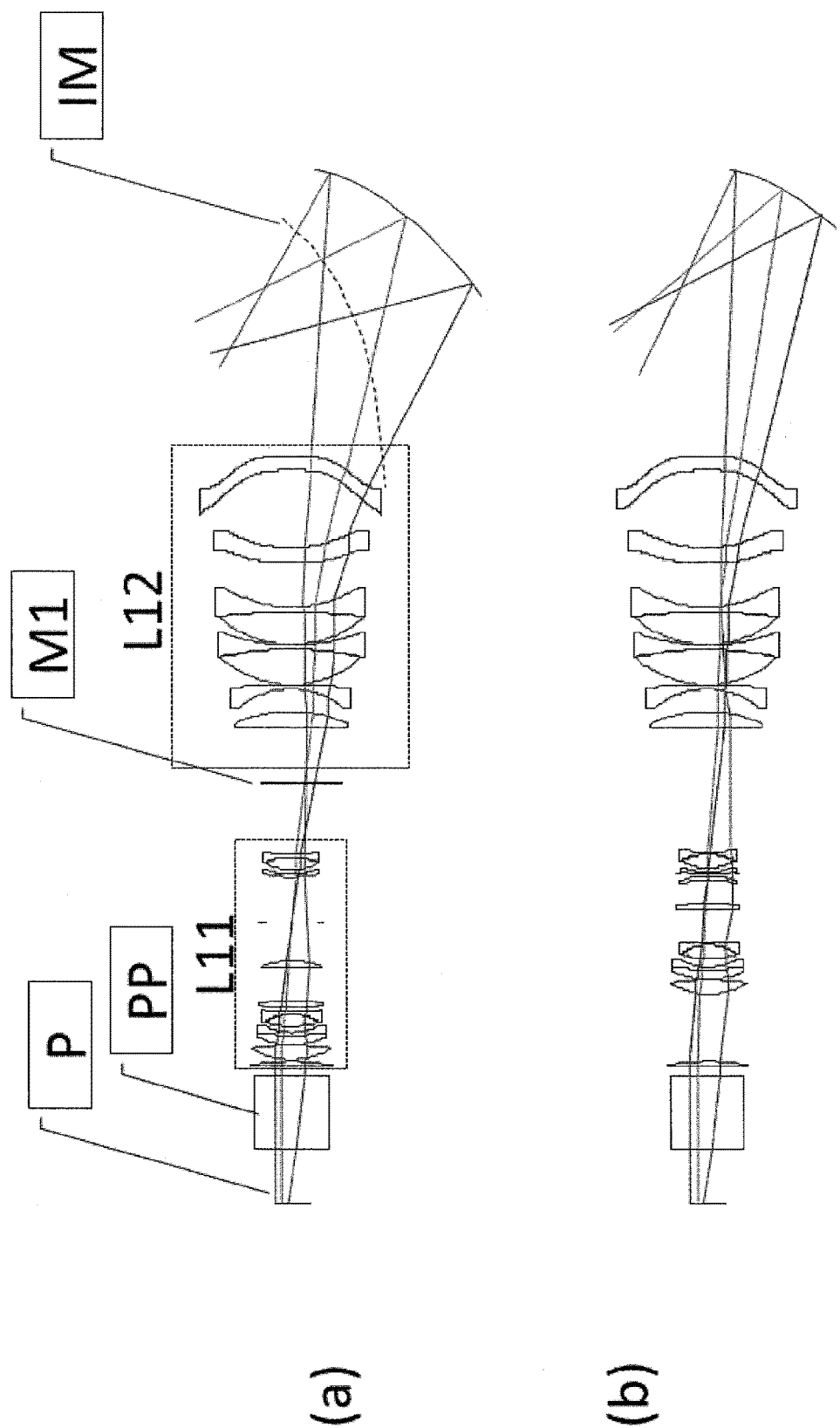

[Fig. 28A]
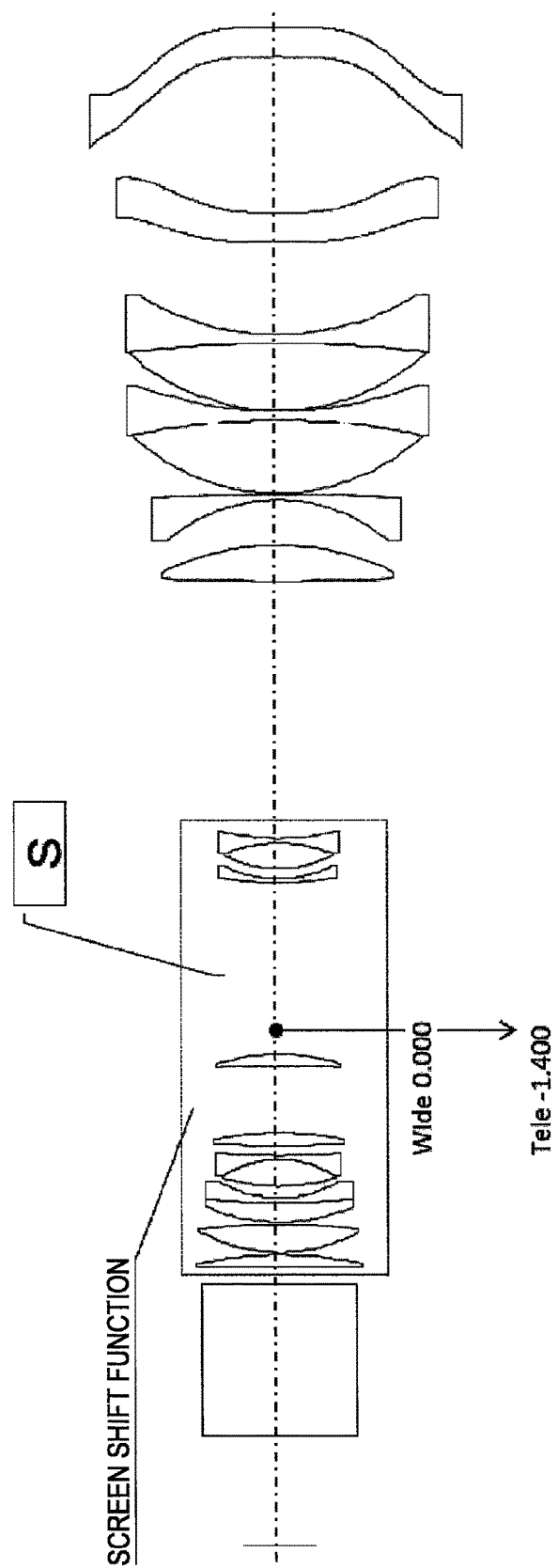

[Fig. 28B]
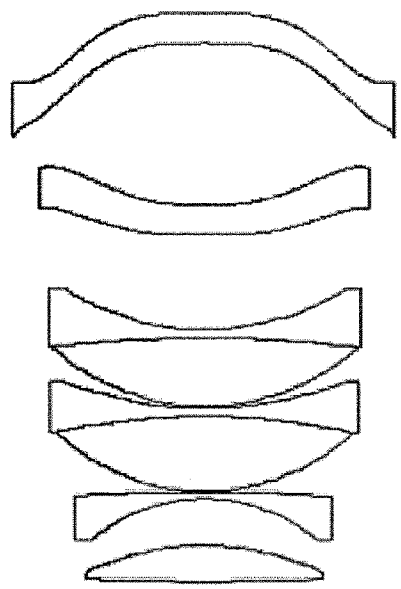
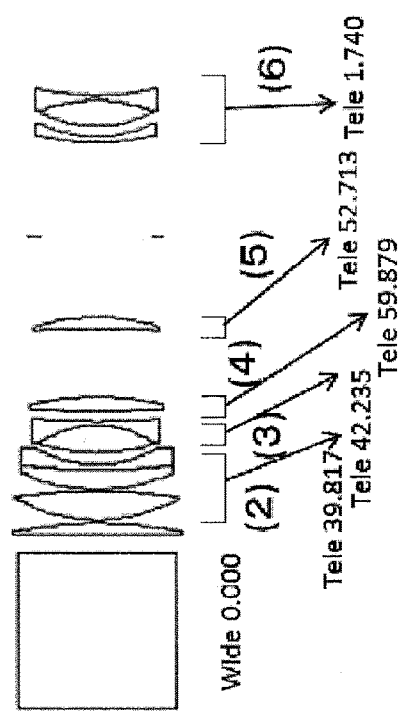

[Fig. 28C]

|  | Wide | Tele |
|---|---|---|
| MOVEMENT AMOUNT (2) | 0.000 | 39.817 |
| MOVEMENT AMOUNT (3) | 0.000 | 42.235 |
| MOVEMENT AMOUNT (4) | 0.000 | 59.879 |
| MOVEMENT AMOUNT (5) | 0.000 | 52.713 |
| MOVEMENT AMOUNT (6) | 0.000 | 1.740 |

[Fig. 29A]
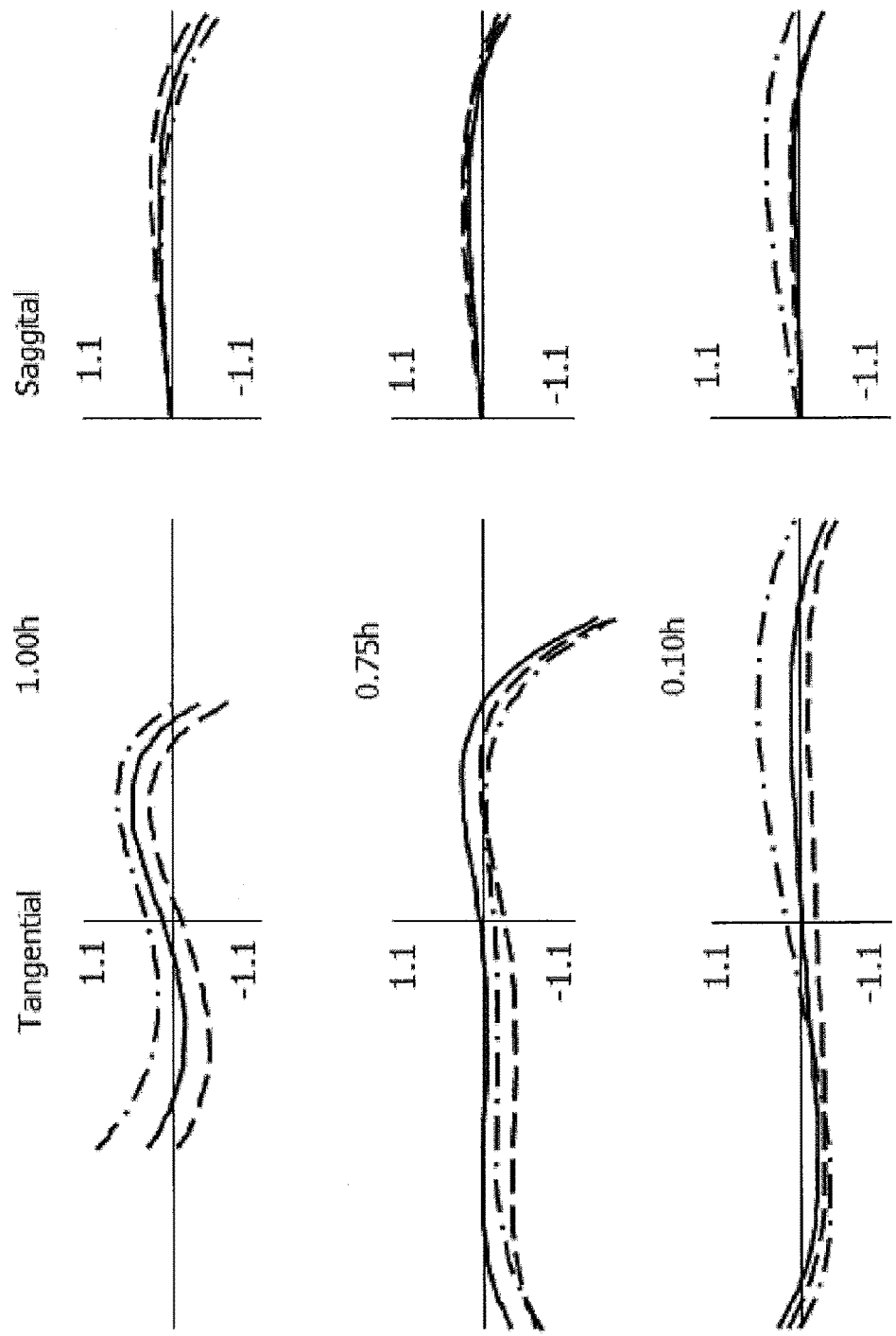

[Fig. 29B]
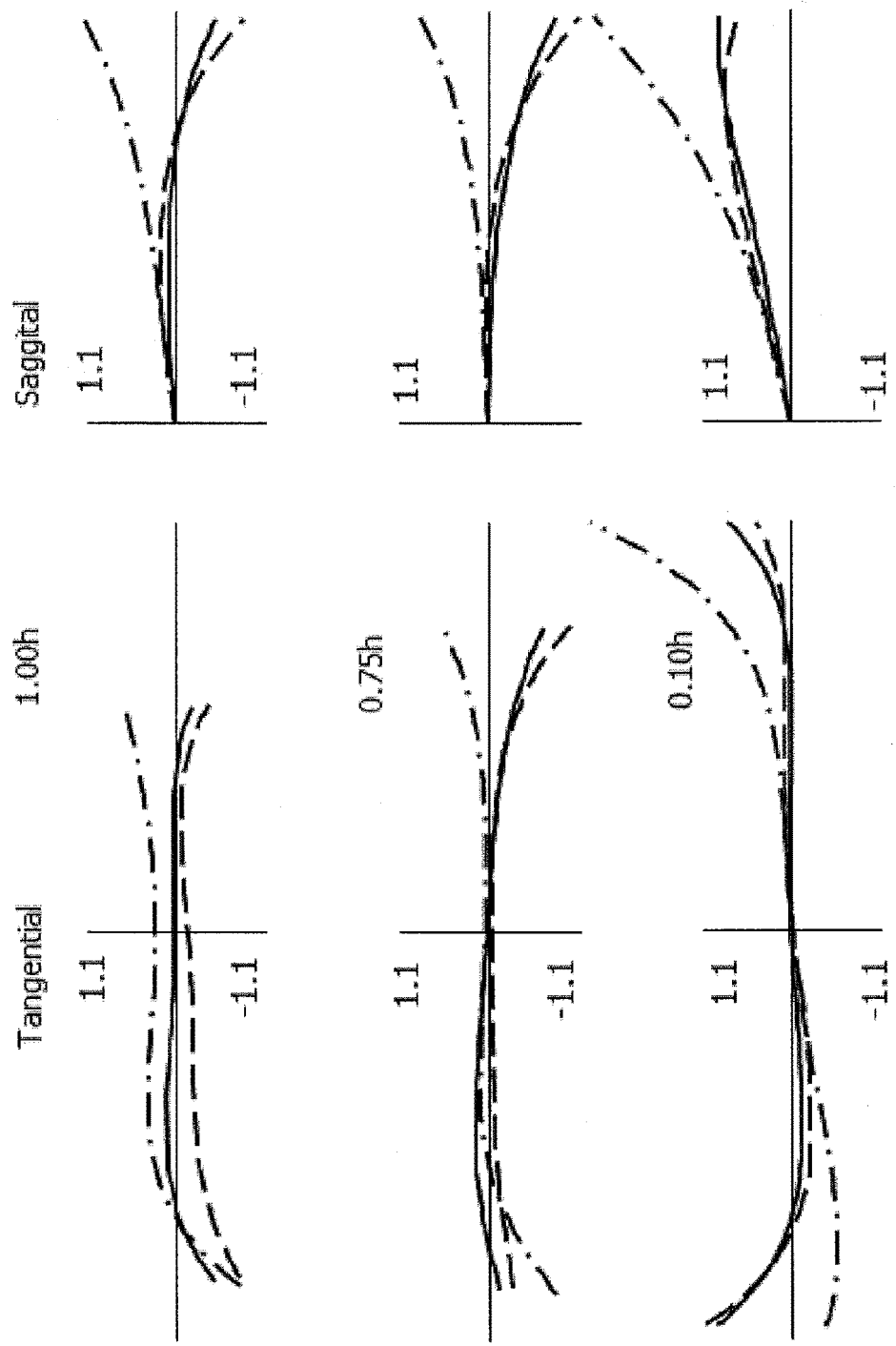

[Fig. 30]

| | MF | SF | r | d | nd | Nd | REMARKS |
|---|---|---|---|---|---|---|---|
| PRIMARY IMAGE PLANE | | | inf | 33.010 | | | |
| s1 | | | inf | 43.500 | 1.51852 | 64.2 | COLOR SYNTHESIS PRISM ETC. |
| s2 | | | inf | 5.000 | | | |
| s3 | | | 6534.442 | 3.627 | 1.80809 | 22.8 | |
| s4 | | | -126.726 | (d4) | | | |
| s5 | | | 50.099 | 8.560 | 1.49700 | 81.6 | |
| s6 | (2) | | -149.705 | 0.437 | | | |
| s7 | | | 58.555 | 5.656 | 1.49700 | 81.6 | |
| s8 | | | 199.317 | 1.509 | 1.80610 | 40.7 | |
| s9 | | | 35.408 | (d9) | | | |
| s10 | | | 63.174 | 7.892 | 1.49700 | 81.6 | |
| s11 | (3) | | -30.947 | 1.200 | 1.80610 | 33.3 | |
| s12 | | | 265.168 | (d12) | | | |
| s13 | (4) | | 642.663 | 4.000 | 1.48749 | 70.4 | |
| s14 | | | -90.668 | (d14) | | | |
| s15 | (5) | | -601.639 | 3.721 | 1.62004 | 36.3 | |
| s16 | | | -56.199 | (d16) | | | |
| s17 | | | inf | 0.000 | | | |
| s18 | | | inf | (d18) | | | APERTURE |
| s19 | | | 87.832 | 1.500 | 1.77250 | 49.6 | |
| s20 | | | 38.933 | 3.044 | | | |
| s21 | (6) | | 36.463 | 7.583 | 1.59551 | 39.2 | |
| s22 | | | -44.819 | 1.500 | 1.74400 | 44.8 | |
| s23 | | | 78.599 | (d23) | | | |
| s24 | | | inf | 68.000 | | | |
| s25 | | | inf | 2.929 | | | |
| s26 | | | 840.516 | 10.532 | 1.62004 | 36.3 | |
| s27 | | | -82.606 | 13.674 | | | |
| s28 | | | -53.098 | 2.000 | 1.67790 | 55.5 | |
| s29 | | | -533.206 | 0.200 | | | |
| s30 | | | 65.577 | 22.000 | 1.51680 | 64.2 | |
| s31 | | | -204.099 | 2.500 | 1.67790 | 55.5 | |
| s32 | | | 119.996 | 0.500 | | | |
| s33 | | | 69.029 | 20.000 | 1.51680 | 64.2 | |
| s34 | | | -395.748 | 2.544 | 1.74400 | 44.8 | |
| s35 | | | 82.119 | 28.124 | | | |
| s36 | * | | -23.361 | 8.500 | 1.53315 | 56.0 | |
| s37 | * | | -15.417 | 46.940 | | | |
| s38 | | | inf | 0.344 | | | |
| s39 | * | | -8.602 | 9.000 | 1.53315 | 56.0 | |
| s40 | * | | 16.048 | 1.000 | | | |
| s41 | | | inf | 175.735 | | | |
| s42 | * | | -41.666 | -477.601 | | | CURVED REFLECTIVE SURFACE |
| s43 | | | inf | | | | |
| SECONDARY IMAGE PLANE | | | | | | | |

* · · · ASPHERICAL SURFACE
○ · · · DUMMY SURFACE

[Fig. 31]

| NUMERICAL APERTURE NA ON PRIMARY IMAGE PLANE SIDE | 0.16000 |
|---|---|
| MAXIMUM HALF-VIEWING ANGLE W | 79.2deg. |
| MAXIMUM OBJECT HEIGHT y | 13.450 |

[Fig. 32]

| DOT SIZE (mu m) | 4.0500 |
|---|---|
| LATERAL LENGTH | 16.589 |
| LONGITUDINAL LENGTH | 8.7480 |
| DISTANCE BETWEEN OPTICAL AXIS AND ELEMENT CENTER | 6.2139 |

[Fig. 33]

| | S36 |
|---|---|
| C | -4.28063E-02 |
| K | -7.99137E+00 |
| A( 1) | |
| A( 2) | 1.75815E-02 |
| A( 3) | -2.57118E-04 |
| A( 4) | 1.78387E-06 |
| A( 5) | 1.67748E-07 |
| A( 6) | -4.21169E-09 |
| A( 7) | -6.15511E-11 |
| A( 8) | 2.95741E-12 |
| A( 9) | |
| A(10) | -1.41852E-15 |
| A(11) | |
| A(12) | 7.53211E-19 |
| A(13) | |
| A(14) | -2.20513E-22 |
| A(15) | |
| A(16) | 2.17856E-26 |

| | S37 |
|---|---|
| C | -6.48622E-02 |
| K | -3.36008E+00 |
| A( 1) | |
| A( 2) | 3.24796E-02 |
| A( 3) | -3.38634E-04 |
| A( 4) | -6.14044E-06 |
| A( 5) | 2.18674E-07 |
| A( 6) | 2.93450E-09 |
| A( 7) | -6.58272E-11 |
| A( 8) | -4.04530E-12 |
| A( 9) | |
| A(10) | 2.66881E-15 |
| A(11) | |
| A(12) | -6.01617E-19 |
| A(13) | |
| A(14) | -7.61222E-24 |
| A(15) | |
| A(16) | 1.47466E-26 |

| | S39 |
|---|---|
| C | -1.16248E-01 |
| K | -9.88345E-01 |
| A( 1) | |
| A( 2) | 5.52231E-02 |
| A( 3) | 3.12959E-04 |
| A( 4) | -3.18654E-05 |
| A( 5) | 1.08336E-06 |
| A( 6) | -1.26631E-08 |
| A( 7) | -1.97796E-10 |
| A( 8) | 1.24877E-12 |
| A( 9) | 4.68287E-14 |
| A(10) | 4.98705E-15 |
| A(11) | |
| A(12) | -3.82229E-18 |
| A(13) | |
| A(14) | 1.05915E-21 |
| A(15) | |
| A(16) | -1.07269E-25 |

| | S40 |
|---|---|
| C | 6.23134E-02 |
| K | -2.42125E+00 |
| A( 1) | |
| A( 2) | -3.58581E-02 |
| A( 3) | 6.92769E-04 |
| A( 4) | -1.15372E-05 |
| A( 5) | 1.22137E-07 |
| A( 6) | -5.28577E-09 |
| A( 7) | 4.44720E-11 |
| A( 8) | 7.71646E-13 |
| A( 9) | 3.26539E-14 |
| A(10) | -6.96774E-16 |
| A(11) | |
| A(12) | 4.90325E-20 |
| A(13) | |
| A(14) | -1.52424E-23 |
| A(15) | |
| A(16) | 2.63908E-27 |

| | S42 |
|---|---|
| C | -2.40005E-02 |
| K | -1.25020E+00 |
| A( 1) | -1.85335E-02 |
| A( 2) | 6.27162E-03 |
| A( 3) | -2.26161E-05 |
| A( 4) | 1.18531E-08 |
| A( 5) | -4.39561E-10 |
| A( 6) | -1.54388E-12 |
| A( 7) | 3.05212E-14 |
| A( 8) | 6.64462E-17 |
| A( 9) | |
| A(10) | -1.91456E-20 |
| A(11) | |
| A(12) | 8.36100E-25 |
| A(13) | |
| A(14) | -1.53210E-29 |
| A(15) | |
| A(16) | |

[Fig. 34]

|  |  | Wide | Tele |
|---|---|---|---|
| COMPOSITE FOCAL LENGTH FL (550nm) |  | 4.321 | 8.369 |
| SCREEN SHIFT FUNCTION SF | s3-s23 | 0.000 | -1.400 |
| MAGNIFICATION FUNCTION MF | d4 | 1.000 | 40.817 |
|  | d9 | 3.666 | 6.084 |
|  | d12 | 3.117 | 20.760 |
|  | d14 | 19.768 | 12.602 |
|  | d16 | 23.652 | 0.200 |
|  | d18 | 27.720 | 0.200 |
|  | d23 | 6.426 | 4.686 |

[Fig. 35]

|  |  | Wide | Tele |
|---|---|---|---|
| REFRACTIVE POWER P(1) | s3-s4 | 0.00656 | 0.00656 |
| REFRACTIVE POWER P(2) | s5-s9 | 0.00320 | 0.00320 |
| REFRACTIVE POWER P(3) | s10-s12 | -0.00474 | -0.00474 |
| REFRACTIVE POWER P(4) | s13-s14 | 0.00614 | 0.00614 |
| REFRACTIVE POWER P(5) | s15-s16 | 0.01009 | 0.01009 |
| REFRACTIVE POWER P(6) | s19-s23 | -0.00688 | -0.00688 |
| REFRACTIVE POWER P(1-s) | s3-s18 | 0.01495 | 0.01030 |
| REFRACTIVE POWER P11 | s3-s23 | 0.01900 | 0.01056 |
| REFRACTIVE POWER P12 | s26-s40 | -0.00208 | -0.00208 |
| REFRACTIVE POWER P1 | s3-s40 | 0.03108 | 0.01663 |
| REFRACTIVE POWER P2 | s42 | -0.02291 | -0.02291 |
| REFRACTIVE POWER P all | s3-s42 | 0.23142 | 0.11950 |

[Fig. 36]

|  | Wide | Tele |
|---|---|---|
| MOVEMENT AMOUNT (2) | 0.000 | 39.817 |
| MOVEMENT AMOUNT (3) | 0.000 | 42.235 |
| MOVEMENT AMOUNT (4) | 0.000 | 59.879 |
| MOVEMENT AMOUNT (5) | 0.000 | 52.713 |
| MOVEMENT AMOUNT (6) | 0.000 | 1.740 |

|  | Wide | Tele |
|---|---|---|
| Ps x FL | 0.08210 | 0.08834 |
| Ps / P1 | 0.61141 | 0.63492 |
| Pm / P1 | 0.19767 | 0.36948 |
| \|SF\| / FL | 0.00000 | 0.16729 |
| Pw / Pt | 1.937 | |

[Fig. 37]
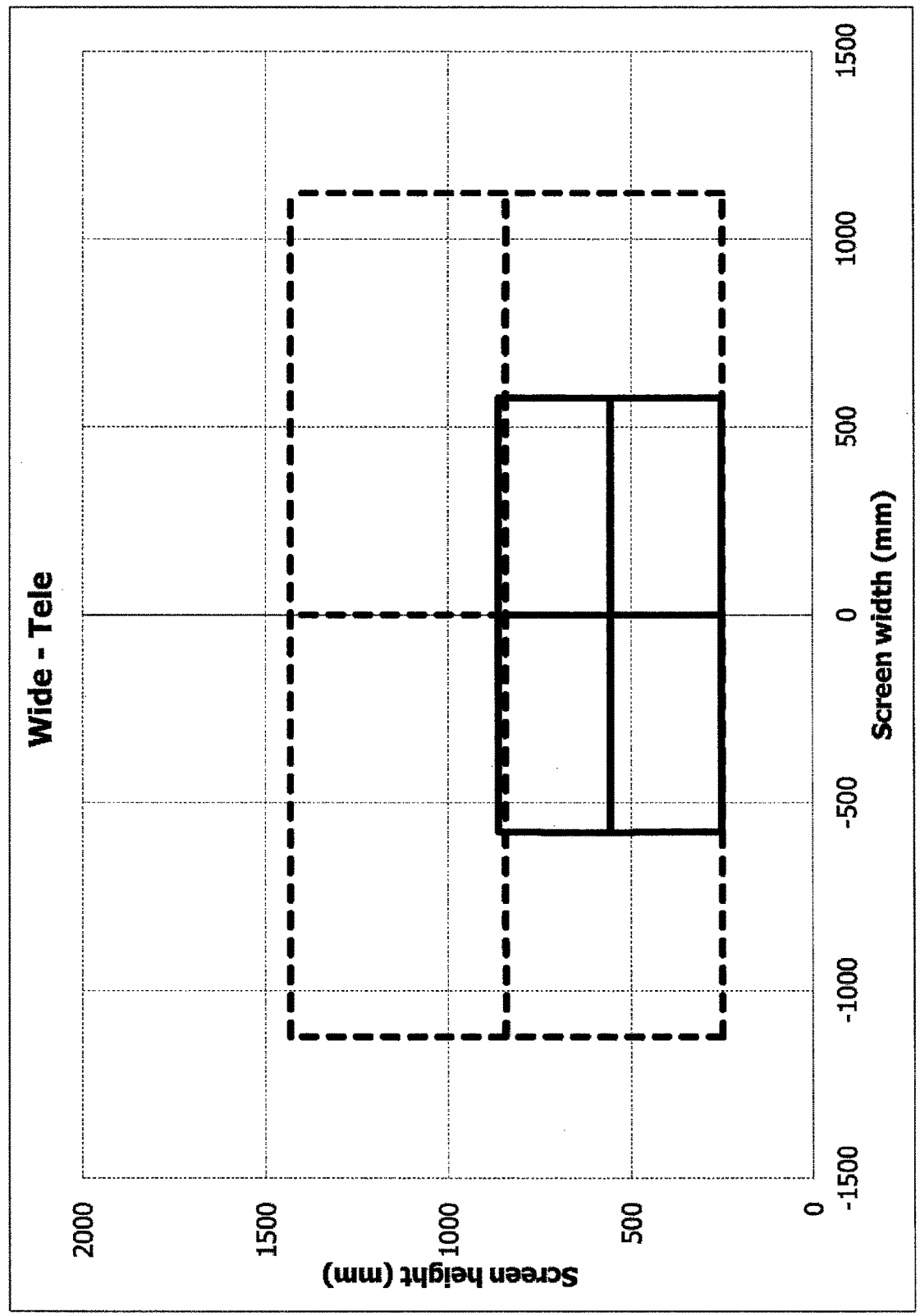

PROJECTION TYPE IMAGE DISPLAY DEVICE AND PROJECTION OPTICAL SYSTEM

CROSS REFERENCE TO RELATED APPLICATIONS

This application claims the benefit of Japanese Priority Patent Application JP 2013-273229 filed Dec. 27, 2013, the entire contents of which are incorporated herein by reference.

TECHNICAL FIELD

The present disclosure relates to a projection type image display device and a projection optical system.

BACKGROUND ART

Recently, as a projection type display device that displays a projection image on a screen, a projector device has been widely known. In particular, recently, there has been an increase in the demand for ultra-wide-angle front projection type projector device capable of displaying an image on a large screen while reducing a projection space. When using the ultra-wide-angle front projection type projector device, a beam can be projected diagonally to a screen at a wide angle, and thus, an image can be projected on a large screen in a limited space.

For example, an example of the projection type display device as described above is disclosed in PTL 1.

CITATION LIST

Patent Literature

PTL 1: JP 2010-122573A

SUMMARY

Technical Problem

On the other hand, it is necessary to configure an optical system having a large curved reflective surface so as to support an ultra-wide angle and obtain brightness similar to that of a conventional type supporting no ultra-wide angle and having a large numerical aperture (or a small F value) so as to achieve a bright screen. In other words, when attempting to obtain the same brightness as the case where the ultra-wide angle is not supported, the optical system supporting the ultra-wide angle has a strong tendency of cost increase as compared with the case where the ultra-wide angle is not supported. Therefore, for the realization of the above-described function, it is suitable to suppress cost increase as much as possible.

It is desirable to provide a projection type image display device and a projection optical system, which are capable of operating in an easy, small and inexpensive configuration even when an ultra-wide angle is supported.

Solution to Problem

According to an exemplary embodiment, the disclosure is directed to a system including a light source configured to illuminate light onto an image modulation element; a projection optical system including at least a first lens system and a second lens system configured to project the image modulated by the modulation element; and circuitry configured to shift a position of the first lens system in a direction perpendicular to an optical axis of the projection optical system based on an optical zoom factor, wherein a position of the image modulation element is unchanged when the circuitry shifts the position of the first lens system.

According to another exemplary embodiment, the disclosure is directed to a system including a first lens system; a second lens system; and circuitry configured to shift a position of the first lens system in a direction perpendicular to an optical axis of the first and second lens systems.

Advantageous Effects of Invention

According to the present disclosure as described above, there are provided the projection type image display device and the projection optical system, which are capable of operating in an easy, small and inexpensive configuration even when the ultra-wide angle is supported.

Incidentally, the above effects are not necessarily limited thereto. In addition to or alternative to the above effects, one effect that is set forth in the present specification or other effect that can be grasped from the present specification may be achieved.

BRIEF DESCRIPTION OF DRAWINGS

FIG. 1 is an explanatory diagram illustrating a projection example by a projector device of the related art.

FIG. 2 is an explanatory diagram illustrating a projection example of a projector device with an ultra-short focus.

FIG. 3 is an explanatory diagram illustrating a projection example of a projector device with an ultra-short focus.

FIG. 4A is an explanatory diagram for describing an example of an optical system of a projector device with an ultra-short focus.

FIG. 4B is an explanatory diagram for describing an example of an image position SCR (a) by an optical system in which an optical axis of a projection optical system is matched with a center position of an image display element, and an image position SCR in a case (b) where not matched.

FIG. 5 is an explanatory diagram illustrating a schematic configuration example of a liquid crystal projector device.

FIG. 6 is an explanatory diagram illustrating a schematic configuration example of a light source and an illumination optical system.

FIG. 7 is an optical path diagram illustrating a schematic configuration example of a projection optical system according to a first embodiment.

FIG. 8A is an explanatory diagram illustrating a substantial part configuration example of a projection optical system unit according to a first embodiment.

FIG. 8B is an explanatory diagram illustrating a substantial part configuration example of a projection optical system unit according to a first embodiment.

FIG. 8C is an explanatory diagram for describing a substantial part configuration example of a projection optical system unit according to a first embodiment.

FIG. 9A is a diagram for describing a screen position and a screen size.

FIG. 9B is a diagram for describing a screen position and a screen size.

FIG. 9C is a diagram for describing a screen position and a screen size.

FIG. 9D is a diagram for describing a screen position and a screen size.

FIG. 10 is a diagram for describing a screen position and a screen size.

FIG. 11A is a diagram for describing a screen position and a screen size.

FIG. 11B is a diagram for describing a screen position and a screen size.

FIG. 11C is a diagram for describing a screen position and a screen size.

FIG. 11D is a diagram for describing a screen position and a screen size.

FIG. 12 is a diagram for describing a positional relationship between a screen and a projection optical system.

FIG. 13 is a diagram for describing a screen position and a screen size.

FIG. 14 is a diagram illustrating an example of a positional relationship among a projection optical system, a screen, and an optical path.

FIG. 15 is a diagram illustrating an example of a positional relationship among a projection optical system, a screen, and an optical path.

FIG. 16 is a diagram illustrating an example of a positional relationship among a projection optical system, a screen, and an optical path.

FIG. 17A is a lateral aberration diagram of a projection optical system in the case of using a magnification function and a screen shift function.

FIG. 17B is a lateral aberration diagram of a projection optical system in the case of using a magnification function and a screen shift function.

FIG. 17C is a lateral aberration diagram of a projection optical system in the case of using a magnification function and a screen shift function.

FIG. 17D is a lateral aberration diagram of a projection optical system in the case of using a magnification function and a screen shift function.

FIG. 18A is a lateral aberration diagram of a projection optical system in the case of using a magnification function and a screen shift function.

FIG. 18B is a lateral aberration diagram of a projection optical system in the case of using a magnification function and a screen shift function.

FIG. 18C is a lateral aberration diagram of a projection optical system in the case of using a magnification function and a screen shift function.

FIG. 18D is a lateral aberration diagram of a projection optical system in the case of using a magnification function and a screen shift function.

FIG. 19A is a lateral aberration diagram of a projection optical system in the case of using a magnification function and a screen shift function.

FIG. 19B is a lateral aberration diagram of a projection optical system in the case of using a magnification function and a screen shift function.

FIG. 19C is a lateral aberration diagram of a projection optical system in the case of using a magnification function and a screen shift function.

FIG. 19D is a lateral aberration diagram of a projection optical system in the case of using a magnification function and a screen shift function.

FIG. 20 is an example of lens data of a projection optical system according to a first embodiment.

FIG. 21 is an explanatory diagram illustrating an example of a numerical aperture of a primary image plane side, a maximum half-viewing angle, and a maximum primary image plane height in a projection optical system according to a first embodiment.

FIG. 22 is an explanatory diagram illustrating a dot size, a lateral length, a longitudinal length, and a distance from an optical axis to an element center in an image display element used in a first embodiment.

FIG. 23 is an example of aspherical data.

FIG. 24 is an explanatory diagram illustrating a composite focal length, a screen shift function, a magnification function, and a second screen shift function at each magnification position used in a first embodiment.

FIG. 25 is an example of a movement amount of each moving group by a refractive power and a magnification function MF of each group at each magnification position.

FIG. 26 is a diagram illustrating a conditional expression.

FIG. 27 is a schematic configuration example of a projection optical system according to a second embodiment.

FIG. 28A is a schematic configuration example of a projection optical system according to a second embodiment.

FIG. 28B is a schematic configuration example of a projection optical system according to a second embodiment.

FIG. 28C is a schematic configuration example of a projection optical system according to a second embodiment.

FIG. 29A is a lateral aberration diagram of a projection optical system in the case of using a magnification function and a screen shift function.

FIG. 29B is a lateral aberration diagram of a projection optical system in the case of using a magnification function and a screen shift function.

FIG. 30 is an example of lens data of a projection optical system according to a second embodiment.

FIG. 31 is an explanatory diagram illustrating an example of a numerical aperture of a primary image plane side, a maximum half-viewing angle, and a maximum primary image plane height in a projection optical system unit according to a second embodiment.

FIG. 32 is an explanatory diagram illustrating a dot size, a lateral length, a longitudinal length, and a distance from an optical axis to an element center in an image display element used in a second embodiment.

FIG. 33 is an example of aspherical data.

FIG. 34 is an explanatory diagram illustrating a composite focal length, a screen shift function, a magnification function, and a second screen shift function at each magnification position used in a second embodiment.

FIG. 35 is an example of a movement amount of each moving group by a refractive power and a magnification function MF of each group at each magnification position.

FIG. 36 is a diagram illustrating a conditional expression.

FIG. 37 is a diagram illustrating an example of a screen position and a screen size.

DESCRIPTION OF EMBODIMENTS

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Incidentally, the description will be given in the following order.

1. Summary of Problem
2. Overview of Projection Type Display Device
3. Schematic Configuration Example of Projection Type Display Device
4. Configuration Example of Projection Optical System
4.1. First Embodiment
4.2. Second Embodiment
5. Conclusion

1. SUMMARY OF PROBLEM

An example of a projection type display device is first described, and a problem of the projection type display device according to the present embodiment is then summarized.

Recently, as a projection type display device that displays a projection image on a screen, a projector device is widely known. In particular, recently, there has been an increase in the demand for ultra-wide-angle front projection type projector device capable of displaying an image on a large screen while reducing a projection space. When using the ultra-wide-angle front projection type projector device, a beam can be projected diagonally to a screen at a wide angle, and thus, an image can be projected on a large screen in a limited space.

The advantages of an ultra-wide angle support are, for example, the matters described below.

FIG. 1 illustrates a projection example by a projector device of the related art. When a beam is projected on a screen A, positions of a person 1 and a person 2 are considered. The positions of the person 1 and the person 2 are kept away at a predetermined projection distance or less. For example, since a shadow S1 appears at the position of the person 2, the person 2 does not approach. Also, upon installation, a suspension fitting S2 is necessary, resulting in a large scale.

On the other hand, a case of an ultra-short focus is illustrated in FIG. 2. As illustrated, a projector is installed on a floor at a wall, and a beam from the projector is projected on the screen A. In this case, both of the persons 1 and 2 can view an image. Also, the suspension fitting S2 illustrated in FIG. 1 is not necessary. In the case of the ultra-short focus as described above, the viewing is possible at a closer position to the screen, without providing special devices.

Furthermore, if a screen size can be freely changed like screens A and B as illustrated in FIG. 3, for example, it is possible to freely distinguish the screens according to the screen size, just like the screen A in the case of the movie or the like for which the reality is necessary and the screen B in the case of content for which no reality is necessary, such as news.

At that time, instead of electrical cutting of the screen B from the screen A, an optical zooming mechanism is used, and therefore, a resolution can be maintained. Furthermore, an NA value upon zooming is made greater than or equal to an NA value of an illumination optical system. Thus, the brightness can also be maintained, and an image with excellent visibility can be viewed even under a bright viewing environment.

However, the realization of such an optical system has been difficult in the past. In principle, an optical system with an ultra-short focus has a configuration as illustrated in FIG. 4A. As indicated by reference symbol (b) of FIG. 4B, unlike reference symbol (a) of FIG. 4B in which a screen SCR is disposed around an optical axis, a screen is enlarged or reduced around an optical axis AXIS upon zooming.

Therefore, like the screens A and B of FIG. 4A, since an image circle is changed from a1 to b1, the screen is enlarged or reduced around the optical axis AXIS upon zooming. In this case, the screen viewing position of the person 1 is greatly moved from a1 to b1.

For example, in PTL 1, a screen shift function can be achieved by eccentrically providing an optical system of a part of a first optical system in a direction perpendicular to an optical axis.

However, in the configuration disclosed in PTL 1, since the screen position is shifted by eccentrically providing a part of the optical system in a direction perpendicular to the optical axis, it is likely that eccentric aberration will occur in principle and optical performance will be degraded. Therefore, in some cases, the shift amount of the screen position may not be very large.

That is, in the above-described related art, in order to greatly move the screen position or the screen size, the device configuration becomes large or complicated, resulting in cost increase.

On the other hand, it is necessary to configure an optical system having a large curved reflective surface so as to support an ultra-wide angle and obtain brightness similar to that of a conventional type supporting no ultra-wide angle and having a large numerical aperture (or a small F value) so as to achieve a bright screen. In other words, when attempting to obtain the same brightness as the case where the ultra-wide angle is not supported, the optical system supporting the ultra-wide angle has a strong tendency of cost increase as compared with the case where the ultra-wide angle is not supported. Therefore, for the realization of the above-described function, it is suitable to suppress cost increase as much as possible.

Therefore, in the present disclosure, a screen shift and a magnification function can be realized by a simple configuration, and it is desirable to provide a projection type image display device and a projection optical system, which are capable of operating in an easy, small and inexpensive configuration even when an ultra-wide angle is supported.

2. OVERVIEW OF PROJECTION TYPE DISPLAY DEVICE

First, the overview of the projection type display device will be described briefly by exemplifying a projector device.

The projector device is configured such that an optical image corresponding to a picture signal is formed by modulating light irradiated from a light source, such as a high-pressure mercury lamp, by using a liquid crystal display element or a digital micro mirror device (DMD), which is an image modulation element, and the optical image is enlarged and projected by an projection optical system and is displayed on a screen. As such a projector device, a so-called 3 charge coupled device (3CCD) is widely known which includes panel-shaped display elements corresponding to red (R), green (G), and blue (B) colors, respectively.

However, in the projector device described herein, it is assumed that the projection optical system supports an ultra-wide angle. For example, the projection optical system has a half-viewing angle of about 70 degrees.

3. SCHEMATIC CONFIGURATION EXAMPLE OF PROJECTION TYPE DISPLAY DEVICE

Subsequently, a schematic configuration of a liquid crystal projector device supporting an ultra-wide angle will be described. FIG. 5 is an explanatory diagram illustrating a schematic configuration example of a liquid crystal projector device. As illustrated in the example, the liquid crystal projector device includes a light source 1, an illumination optical system 2, and a projection optical system 3 within a housing thereof.

FIG. 6 is an explanatory diagram illustrating a schematic configuration example of the light source 1 and the illumination optical system 2.

The light source 1 is provided with, for example, a high-pressure mercury lamp or a laser diode (LD), and is configured to emit luminous flux to the illumination optical system 2.

The illumination optical system 2 is configured to uniformly illuminate the luminous flux, which are emitted from the light source 1, onto a surface of an image modulation element (liquid crystal panel) as a primary image plane. More specifically, in the illumination optical system 2, the luminous flux from the light source 1 pass through first and second fly-eye lenses FL, a polarized light conversion element PS, and a condensing lens L. Then, after passing through those, the luminous flux is separated into the respective RGB color component light beams by a dichroic mirror DM which reflects only light of a specific wavelength band. The respective RGB color component light beams are incident on a liquid crystal panel P provided to correspond to the respective RGB colors by using a total reflection mirror M or a lens L. Then, after the liquid crystal panel P performs the optical modulation based on a picture signal, the respective color component light beams, which are optically modulated, are synthesized by a dichroic prism PP and are emitted toward the projection optical system 3.

Incidentally, herein, the illumination optical system 2 configured using a transmissive liquid crystal panel is exemplified, but the illumination optical system 2 may also be configured using a reflective liquid crystal panel. Also, as the image modulation element, a digital micro mirror device (DMD) may be used. Furthermore, it can be considered that, instead of the dichroic prism PP, a polarized beam splitter (PBS), a color synthesis prism for synthesizing a picture signal of the respective RGB colors, a total internal reflection (TIR) prism, and the like may be used.

The projection optical system 3 receives the light emitted from the illumination optical system 2, and projects image information of the primary image plane, which is modulated by the liquid crystal panel P of the illumination optical system 2, on the screen as the secondary image plane in an enlarged manner.

4. CONFIGURATION EXAMPLE OF PROJECTION OPTICAL SYSTEM

The liquid crystal projector device described herein has a feature in the projection optical system 3. Hereinafter, the configurations of the projection optical systems 3 according to first and second embodiments will be described in sequence.

4.1. First Embodiment

FIG. 7 is an optical path diagram illustrating a schematic configuration example of a projection optical system according to a first embodiment, and (a), (b), (c), and (d) are Wide, Middle1, Middle2, and Tele, respectively. As illustrated in the example, the projection optical system 3 includes a first optical system L1 having a positive refractive power, and a second optical system L2 having a concave reflective surface. In the first optical system L1, all the optical components constituting the first optical system L1 have a common optical axis having a rotationally symmetrical surface.

Also, the second optical system L2 is configured by a curved reflective surface and has the common optical axis common to the first optical system L1.

Since the projection optical system 3 includes the first optical system L1 and the second optical system L2, the projection optical system 3 is configured to project an image in an enlarged manner from the primary image plane on the reduction side to the secondary image plane on the enlargement side. That is, the image information of the primary image plane, which is modulated by the liquid crystal panel P of the illumination optical system 2 and is synthesized by the dichroic prism PP, is projected on the screen as the secondary image plane in an enlarged manner.

In the projection optical system 3 having such a configuration, the first optical system L1 is configured to include, in order from the side of the primary image plane, an eleventh optical system L11 with a positive refractive power and a twelfth optical system L12 with a negative refractive power. The luminous flux emitted from the first optical system L1 temporarily form an intermediate image IM between the first optical system L1 and the second optical system L2 and is then incident into the second optical system L2.

Incidentally, a first flat reflective surface is disposed in M1 indicated in the drawing, but is illustrated in the drawing as a dummy for convenience.

FIGS. 8A to 8C are explanatory diagrams illustrating a substantial part configuration example of a projection optical system unit according to a first embodiment. The illustrated example shows a lens cross-section of the first optical system L1 upon short-distance projection.

In FIGS. 8A and 8B, the projection optical system 11 has screen shift functions 1 and 2, and a position shifted in a direction substantially perpendicular to the optical axis has one or more magnification positions as an initial position. In FIG. 8A, Wide indicates that the position is disposed at the position of the optical axis, Middle1 indicates that the position is shifted downward by 0.457 mm in a perpendicular direction from the optical axis, Middle2 indicates that the position is shifted downward by 0.975 mm, and Tele indicates that the position is shifted downward by 1.548 mm. Due to the screen shift function 1, each is at the initial position of each magnification position.

In FIG. 8B, four moving groups (2), (3), (4) and (5) are provided upon magnification to have movement amounts in Wide, Middle1, Middle2, and Tele as illustrated in FIG. 8C. In this drawing, four optical components are moved toward the secondary image plane side by the magnification from Wide to Tele. From the above, the illustration of the screen position and the screen size by the interworking of the two functions is Wide of FIG. 9A, Middle1 of FIG. 9B, Middle2 of FIG. 9C, and Tele of FIG. 9D. Herein, (0, 0) is an intersecting point between the optical axis and the plane including the secondary image plane. FIG. 10 is the overlap of Wide illustrated in FIG. 9A and Tele illustrated in FIG. 9D. A dashed line is Wide and a solid line is Tele.

By using the magnification function and the screen shift function 1 as described above, the screen A (herein, equivalent to Wide) and the screen B (herein, equivalent to Tele) can be achieved as illustrated in FIG. 3, without being mechanically complicated and large in size.

Also, at the same time, due to the screen shift function 2, the movement of the secondary image plane can be independently performed at an arbitrary magnification position. Wide+0.1 illustrated in FIG. 11A, Wide−0.1 illustrated in FIG. 11B, Tele+0.1 illustrated in FIG. 11C, and Tele−0.1 illustrated in FIG. 11D are movement examples of the secondary image plane at the respective magnification positions of Wide and Tele. A dashed line indicates the screen position by the screen shift function, and a solid line indicates the secondary screen plane position when the eleventh optical system is moved by +0.1 mm and −0.1 mm in a direction perpendicular to the optical axis by the screen shift function 2.

Therefore, the screen shift function 2 is provided in a form independent of the magnification function and the screen shift function 1 interworking with each other, and it is possible to increase the degree of freedom of installation as well as the degree of freedom of the screen size with respect to the content as illustrated in FIG. 3.

Since the optical system with the ultra-short focus as shown in the present disclosure has the incident angle of about 70 degrees, the installation is difficult in proportion to tan(theta) of the incident angle as illustrated in FIG. 12. Therefore, it is important to have the adjustment of the screen position.

The interworking of the magnification function and the screen shift function 1, or the screen shift function 2 can be easily achieved by performing a mechanism or electrical processing using known examples.

Therefore, by moving some optical components (specifically, the eleventh optical system L11) constituting the first optical system L1 in a direction substantially perpendicular to the optical axis, the screen shift function of moving the imaging position of the secondary image plane can be provided to the first optical system L1.

Upon movement in a substantially perpendicular direction, when the screen shift is possible and the generation of eccentric aberration is reduced, any one of the optical components may be moved. That is, the eleventh optical system L11 is not necessarily moved. The twelfth optical system L12 may be moved, or the entire first optical system may be moved, or one optical component constituting them may be moved. An optimum moving group may be selected in terms of desired movement amount or cost.

That is, the screen shift function is realized by moving only some components, except for the second optical system which may be mechanically complicated, instead of the entire projection optical system including the second optical system. Therefore, as compared with the case of moving all optical components constituting the projection optical system or the case of moving the image modulation element P, the number of components to be moved is small, the size is reduced, and the brightness is not degraded. As a result, the screen shift function can be realized by a simple configuration, while maintaining the high image quality.

Also, excellent optical performance can be obtained when the refractive power Ps of the optical component of the first optical system realizing the magnification function, the screen shift function, and the second screen shift function, the refractive power Pm of the lens group having the largest movement amount among the lens groups realizing the magnification function, and the refractive power P1w of the enlargement projection side of the first optical system satisfy the following relationships at the same time and thus suppress the eccentric aberration.

$$0.05 < |Ps|/P1w < 0.8 \quad (1)$$

$$0.05 < Pm/P1w < 0.2 \quad (2)$$

The conditional expression (1) is provided to appropriately define the refractive power of the moving group realizing the screen shift function 1 and the screen shift function 2. That is, in the case of not satisfying the lower limit defined in the conditional expression (1), the generation of eccentric aberration is reduced, but the screen shift amount is also reduced. Also, in the case of exceeding the upper limit defined in the conditional expression (1), the generation of eccentric aberration due to the movement is increased, and the degradation of the optical performance is caused.

The conditional expression (2) is provided to appropriately define the refractive power of the moving group realizing the magnification function. That is, in the case of not satisfying the lower limit defined in the conditional expression (2), the movement amount is increased, leading to an increase in the size of the optical system. It may be difficult to obtain a magnification function having a large magnification ratio. In the case of exceeding the upper limit, the movement amount is reduced and the high magnification is realized. On the other hand, the refractive power Pm is increased, and a variation in the field curvature is increased by the movement, leading to the degradation of the optical performance upon magnification.

Also, the screen position and the screen size as illustrated in FIG. 3 can be satisfied when the maximum shift amount SFmax from the enlargement side to the reduction side by the screen shift function, the focal length FL of the entire system at that time, the length Lw on the enlargement side with respect to the shortest distance from the intersecting point between the optical axis and the plane including the secondary image plane, to the secondary image plane, the length La at an arbitrary magnification position except for the enlargement side, the refractive power Pw of the entire system on the enlargement side, and the refractive power Pt of the entire system on the reduction side satisfy the following relationships at the same time.

$$0.1 < |SFmax|/FL < 0.6 \quad (3)$$

$$0.9 < La/Lw \quad (4)$$

$$1.2 < Pw/Pt < 3 \quad (5)$$

The conditional expression (3) is provided to define the realization of moving the movement amount of the screen shift to an appropriate position in the optical system with the ultra-short focus. That is, in the case of not satisfying the lower limit defined in the conditional expression (3), the movement amount of the screen is reduced and the screen position as illustrated in FIG. 3 is not satisfied. Also, in the case of exceeding the upper limit, the movement amount is increased too much and the screen position as illustrated in FIG. 3 is not satisfied as well.

The screen in the case of not satisfying the lower limit of the conditional expression (4) is illustrated in FIG. 13. This is a case where the screen shift function at the time of Tele is set to 0.000. A dashed line is Wide and a solid line is Tele. It can be seen that a lower end position of the screen close to the optical axis is moved downward upon the magnification from Wide to Tele.

The conditional expression (5) indicates an appropriate magnification range. That is, in the case of not satisfying the lower limit, the variation in the screen size is reduced and the viewing matched with the content is not possible as illustrated in FIG. 3. In the case of exceeding the upper limit, the magnification ratio is increased and the entire optical system becomes large in size.

In the case of satisfying the conditional expressions (3), (4) and (5), the viewing position is lowered as illustrated in the drawing. Also, as illustrated in FIG. 3, the viewing matched with the content at an appropriate viewing position may be difficult.

Also, the flat reflective surface, which changes the optical path by 90 degrees or more, is provided between the eleventh optical system and the twelfth optical system. The size of the entire optical system can be reduced, and it is possible to realize the device that does not intersect with the plane including the secondary image plane.

FIG. 14 is a schematic perspective view illustrating an example of a positional relationship among the projection optical system, the screen, and the optical path. A diagram when FIG. 14 is viewed from above is illustrated in FIG. 15. In this case, on the image display element side of the first optical system, the plane including the secondary image plane intersects with a circle portion. Therefore, by arranging the flat reflective surface that changes the optical path between the eleventh optical system and the twelfth optical system by 90 degrees or more, it is possible to realize the small-sized optical system that does not intersect with the secondary image plane as illustrated in FIG. 16.

Herein, the projection optical system 3 having the above configuration will be briefly described below by taking specific numerical value examples.

FIGS. 17A to 17D are lateral aberration diagrams by the projection optical system in Wide, Middle1, Middle2, and Tele in the case of using the magnification function and the screen shift function. In the drawings, one gradation (1.33 mm) is one dot size when one dot size at the time of Wide is projected on the screen in an enlarged manner. A solid line is 550 nm, a dashed line is 620 nm, and a dashed-dotted line is 460 nm. Incidentally, the lateral aberration diagrams illustrated herein are lateral aberration diagrams when moved in a y direction. However, the moving direction is not limited to the y direction, and the moving direction may be any direction as long as the direction is perpendicular to the optical axis.

Similarly, FIGS. 18A to 18D and FIGS. 19A to 19D are also lateral aberration diagrams by the second screen shift function 2. FIGS. 18 and 19 are lateral aberrations when moved by +0.1 mm and −0.1 mm, respectively, in a direction perpendicular to the optical axis. In general, in the case of a curve greatly exceeding a range of one gradation, the optical performance, in particular the resolution, is degraded. In this case, it is found that the resolution is hardly degraded even when the three functions are used.

FIG. 20 is an explanatory diagram of a specific example of lens data of the projection optical system according to the first embodiment. In the drawing, the mark * is a surface having an aspherical surface and complies with Formula (5). Also, the mark "circle" is a dummy surface, but the first flat reflective surface is disposed. r is a curvature radius, d is a spacing and a core thickness of a lens, nd is a refractive index of a d-line (587.56 nm), and similarly, Nd is Abbe number in the d-line. Also, the lens group organized by the mark { is a lens group associated with the magnification function MF and the screen shift function SF. Also, di is a lens spacing that is changed so as to realize the magnification function MF.

[Math. 1]

$$Z = \frac{ch^2}{1 + \{1 - (1+K)c^2h^2\}1/2} + \sum_{i=1} Aih^i \quad \text{Formula (5)}$$

FIG. 21 is an explanatory diagram illustrating a specific example of a numerical aperture NA of a primary image plane side, a maximum half-viewing angle W, and a maximum primary image plane height y in the projection optical system according to the first embodiment.

FIG. 22 is an explanatory diagram illustrating a dot size, a lateral length, a longitudinal length, and a distance from an optical axis to an element center in an image display element used in the first embodiment. A size of one gradation illustrated in A to D of FIGS. 17, 18, and 19 is a numerical value obtained by multiplying the magnification of projecting the dot size.

FIG. 23 is aspherical data of a portion attached with "*" in FIG. 20, which is used in the first embodiment. C is a curvature, K is a conic constant, and A(1) to A16 are aspherical coefficients and complies with Formula (5).

FIG. 24 illustrates the composite focal length, the screen shift function, the magnification function, and the second screen shift function at each magnification position used in the first embodiment. The composite focal length is a numerical value at a wavelength (550 nm), the screen shift function indicates the movement amount in a direction perpendicular to the optical axis and among surfaces S3 to S24, and the respective numerical values at the respective magnification positions are determined. The magnification function indicates spacings at the respective magnification values of d4, d13, d15, d18, and d23. The second screen shift function moves +/−0.1 in a direction perpendicular to the optical axis, regardless of the magnification position.

FIG. 25 illustrates a movement amount of each moving group by a refractive power and a magnification function MF of each group at each magnification position, based on Wide.

FIG. 26 shows the conditional expressions expressed in Formulas (1), (2), (3), (4), and (5).

According to the projection optical system 3 specified by the specific numerical values as described above, by moving the screen shift function SF and the magnification function MF as illustrated in FIG. 8A, the screen size and the screen position can be changed like in Wide illustrated in FIG. 9A, Middle1 illustrated in FIG. 9B, Middle2 illustrated in FIG. 9C, and Tele illustrated in FIG. 9D, and the projection form as illustrated in FIG. 3 is realized. Also, due to the second screen shift function, the screen position can be adjusted at an arbitrary position like in Wide+0.1 illustrated in FIG. 10A, Wide−0.1 illustrated in FIG. 10B, Tele+0.1 illustrated in FIG. 10C, and Tele−0.1 illustrated in FIG. 10D.

4.2. Second Embodiment

FIG. 27 is an explanatory diagram illustrating a schematic configuration example of a projection optical system according to a second embodiment. In the illustrated example, the optical paths of (a) Wide and (b) Tele are shown.

Also, FIGS. 28A to 28C are explanatory diagrams illustrating a substantial part configuration example of the projection optical system according to the second embodiment. The illustrated example shows a lens cross-section of a first optical system at the time of Wide.

Similarly to the first embodiment described above, the projection optical system 3 according to the second embodiment, as illustrated in the example, realizes the screen shift function 1 by moving in a direction perpendicular to the optical axis of the eleventh optical system, and realizes the magnification function by moving each group in a direction of the optical axis.

Herein, the projection optical system 3 according to the second embodiment will be briefly described below by taking specific numerical value examples.

FIGS. 29A and 29B are lateral aberration diagrams by the projection optical system in Wide and Tele in the case of using the magnification function and the screen shift function 1. In the drawings, one gradation is one dot size when one dot size at the time of Wide is projected on the screen in an enlarged manner. A solid line is 550 nm, a dashed line is 620 nm, and a dashed-dotted line is 460 nm. Incidentally, the lateral aberration diagrams illustrated herein are lateral aberration diagrams when moving in a y direction. However, the moving direction is not limited to the y direction, and the moving direction may be any direction as long as the direction is perpendicular to the optical axis.

FIG. 30 is an explanatory diagram of a specific example of lens data of the projection optical system according to the second embodiment. In the drawing, the mark * indicates a surface having an aspherical surface and complies with Formula (5). r is a curvature radius, d is a spacing and a core thickness of a lens, nd is a refractive index of a d-line (587.56 nm), and similarly, Nd is Abbe number in the d-line. Also, the lens group organized by the mark { is a lens group associated with the magnification function MF and the screen shift function. Also, di is a lens spacing that is changed so as to realize the magnification function MF.

FIG. 31 is an explanatory diagram illustrating a specific example of a numerical aperture NA of a primary image plane side, a maximum half-viewing angle W, and the maximum primary image plane height in a projection optical system unit according to the second embodiment.

FIG. 32 is an explanatory diagram illustrating a dot size, a lateral length, a longitudinal length, and a distance from an optical axis to an element center in an image display element used in the second embodiment. A size of one gradation illustrated in FIGS. 29A and B is a numerical value obtained by multiplying the magnification of projecting the dot size.

FIG. 33 is aspherical data of a portion attached with "*" in FIG. 30, which is used in the second embodiment. C is a curvature, K is a conic constant, and A(1) to A16 are aspherical coefficients and complies with Formula (5).

FIG. 34 illustrates the composite focal length, the screen shift function 1, and the magnification function at each magnification position used in the second embodiment. The composite focal length is a numerical value at a wavelength (550 nm), the screen shift function 1 indicates the movement amount in a direction perpendicular to the optical axis and among surfaces S3 to S24, and the respective numerical values at the respective magnification positions are determined. The magnification function indicates spacings at the respective magnification values of d4, d13, d15, d18, and d23.

FIG. 35 illustrates a movement amount of each moving group by a refractive power and a magnification function MF of each group at each magnification position, based on Wide.

FIG. 36 shows the conditional expressions expressed in Formulas (1), (2), (3), (4), and (5).

According to the projection optical system 3 specified by the specific numerical values as described above, by moving the screen shift function 1 and the magnification function as illustrated in FIGS. 28A and 28B, the screen size and the screen position can be changed as illustrated in FIG. 37, and the projection form as illustrated in FIG. 3 is realized.

Incidentally, in the respective embodiments described above, specific preferred embodiments of the present disclosure have been described, but the present disclosure is not limited those contents.

In particular, the specific shapes and numerical values of the respective components exemplified in the first and second embodiments are only illustrative examples of the embodiments for carrying out the present disclosure, and they should not be interpreted as limiting the technical scope of the present disclosure.

Furthermore, for example, in the respective embodiments described above, the liquid crystal projector is exemplified as the projection type image display device. However, the embodiments of the present disclosure are applicable in the same manner even when other projection type image display device, that is, a device other than the liquid crystal panel, is used as the image display element.

Furthermore, for example, in the respective embodiments described above, the preferred projection optical system as the optical system of the projection type image display device has been described, but it is apparent that an optical system for an image pickup device (for example, a digital camera, a surveillance camera, and a painting camera) may also be used.

As described above, the present disclosure is not limited to the contents described in the present embodiments, and various modifications and variations may be made without departing from the technical scope of the present disclosure.

5. CONCLUSION

The preferred embodiments of the present disclosure have been described in detail with reference to the appended drawings, but the technical scope of the present disclosure is not limited to such examples. It should be understood by those skilled in the art that various modifications, combinations, sub-combinations and alterations may occur depending on design requirements and other factors insofar as they are within the scope of the appended claims or the equivalents thereof.

Also, the effects described herein are only for illustrative or explanatory purposes, not limiting purposes. That is, it is apparent to those skilled in the art that other effects can be provided from the description of the present disclosure, in addition to or alternative to the above effect.

Additionally, the present technology may also be configured as below.

(1)
A system including:
 a light source configured to illuminate light onto an image modulation element;
 a projection optical system including at least a first lens system and a second lens
system configured to project the image modulated by the modulation element; and
 circuitry configured to shift a position of the first lens system in a direction perpendicular to an optical axis of the projection optical system based on an optical zoom factor, wherein
 a position of the image modulation element is unchanged when the circuitry shifts the position of the first lens system.
(2)
The system of (1), wherein
 the first lens system has a positive refractive power.

(3)
The system of (1) or (2), wherein
the second lens system has a negative refractive power.
(4)
The system of one of (1) to (3), wherein
the first lens system includes a plurality of lenses that are each configured to be shifted in in a direction parallel to the optical axis of the projection optical system.
(5)
The system of (4), wherein
the circuitry is configured to control the optical zoom factor by shifting one or more of the plurality of lenses in the direction parallel to the optical axis of the projection optical system.
(6)
The system of any of (1) to (5), wherein
a diameter of each of a plurality of lenses included in the first optical system is smaller than a diameter of each of a plurality of lenses included in the second optical system.
(7)
The system of any of (1) to (6), wherein
the projection optical system includes a third lens system including a lens having a curved reflective surface and an optical axis common to the first and second lens systems.
(8)
The system of any of (1) to (7), wherein
a position of the second lens system is unchanged when the circuitry shifts the first lens system.
(9)
The system of (7), wherein
the positions of the second and third lens systems are unchanged when the circuitry shifts the first lens system.
(10)
The system of (1), wherein
the first lens system has a negative refractive power.
(11)
The system of any of (1) and (10), wherein
the second lens system has a positive refractive power.
(12)
The system of any of (1), (10) and (11), wherein
the second lens system includes a plurality of lenses that are each configured to be shifted in in a direction parallel to the optical axis of the projection optical system.
(13)
The system of (12), wherein
the circuitry is configured to control the optical zoom factor by shifting one or more of the plurality of lenses in the direction parallel to the optical axis of the projection optical system.
(14)
The system of any of (1), (10) to (13), wherein
a diameter of each of a plurality of lenses included in the first optical system is greater than a diameter of each of a plurality of lenses included in the second optical system.
(15)
The system of any of (1), (10) to (14), wherein
the projection optical system includes a third lens system including a lens having a curved reflective surface and an optical axis common to the first and second lens systems.
(16)
The system of any of (1), (10) to (15), wherein
a position of the second lens system is unchanged when the circuitry shifts the first lens system.
(17)
The system of (15), wherein
the positions of the second and third lens systems are unchanged when the circuitry shifts the first lens system.
(18)
A method including:
projecting an image modulated by a modulation element by a projection optical system including at least a first lens system and a second lens system; and
shifting, by circuitry, a position of the first lens system in a direction perpendicular to an optical axis of the projection optical system based on an optical zoom factor,
wherein
a position of the image modulation element is unchanged when the circuitry shifts the position of the first lens system
(19)
A system including:
means for illuminating light onto an image modulation element;
means for projecting the image modulated by the modulation element; and
means for automatically setting a shift amount of the projected image based on an optical zoom factor by shifting a position of the means for projecting in a direction perpendicular to an optical axis of the projection optical system.
(20)
A system including:
a first lens system;
a second lens system; and
circuitry configured to shift a position of the first lens system in a direction perpendicular to an optical axis of the first and second lens systems.
(21)
A projection type image display device including:
a light source;
an illumination optical system configured to uniformly radiate luminous flux, which are emitted from the light source, on a surface of an image modulation element as a primary image plane; and
a projection optical system configured to project image information of the primary image plane, which is modulated by the image modulation element, on a screen as a secondary image plane in an enlarged manner,
wherein the projection optical system includes
a first optical system configured to have a positive refractive power, and
a second optical system configured to have a curved reflective surface,
wherein all optical components of the first optical system have a common optical axis having a rotationally symmetrical surface,
wherein a plurality of optical components constituting the first optical system have a magnification function that performs magnification by moving along in a direction substantially parallel to the optical axis, and
a screen shift function 1 that moves the secondary image plane by moving in a direction substantially perpendicular to the optical axis of a single group provided with at least one optical component or a plurality of optical components constituting the first optical system, and wherein, at an arbitrary magnification position from an enlargement side to a reduction side by the magnification function, the screen shift function 1 has one or more magnification positions where a position, which does not exist on an optical axis moved from the optical axis in the substantially perpendicular direction, is an initial position.

(22)

The projection type image display device according to (21), wherein the magnification function and the screen shift function 1 interwork with each other at the time of magnification from the enlargement side to the reduction side.

(23)

The projection type image display device according to (21) or (22), wherein the first optical system includes an eleventh optical system with a positive refractive power as a whole, and a twelfth optical system with a negative refractive power as a whole, and the eleventh optical system has the magnification function and the screen shift function 1.

(24)

The projection type image display device according to any one of (21) to (23), wherein, at the arbitrary magnification position, a screen shift function 2 is provided to enable the movement of one or more secondary image planes different from the initial position.

(25)

The projection type image display device according to (24), wherein a refractive power (Ps) of the optical component of the first optical system realizing the screen shift function 1 and the screen shift function 2, a refractive power (Pm) of a lens group having largest movement amount among lens groups realizing the magnification function, and a refractive power (P1w) of an enlargement projection side of the first optical system satisfy the following relationships at a same time:

$$0.05 < |Ps|/P1w < 0.8 \quad (1)$$

$$0.05 < Pm/P1w < 0.3 \quad (2)$$

(26)

The projection type image display device according to any one of (21) to (25), wherein a maximum shift amount (SFmax) from the enlargement side to the reduction side by the screen shift function 1, a focal length (FL) of an entire system at that time, a shortest length (Lw) in a direction perpendicular to an optical axis of the first optical system and an optical axis of the secondary image plane at the time of enlargement projection, a length (La) at an arbitrary magnification position of the reduction side in the magnification function, a refractive power (Pw) of an entire system on the enlargement side, and a refractive power (Pt) of the reduction side satisfy the following relationships at a same time:

$$0.1 < |SFmax|/FL < 0.6 \quad (3)$$

$$0.9 < La/Lw < 5 \quad (4)$$

$$1.2 < Pw/Pt < 3 \quad (5)$$

(27)

The projection type image display device according to (23), wherein a flat reflective surface, which changes a direction of an optical path by 90 degrees or more, is provided between the eleventh optical system and the twelfth optical system.

(28)

A projection optical system including:

a first optical system configured to have a positive refractive power; and a second optical system configured to have a curved reflective surface, wherein all optical components of the first optical system have a common optical axis having a rotationally symmetrical surface, wherein a plurality of optical components constituting the first optical system have a magnification function that performs magnification by moving along in a direction substantially parallel to the optical axis, and a screen shift function 1 that moves the secondary image plane by moving in a direction substantially perpendicular to the optical axis of a single group provided with at least one optical component or a plurality of optical components constituting the first optical system, and wherein, at an arbitrary magnification position from an enlargement side to a reduction side by the magnification function, the screen shift function 1 has one or more magnification positions where a position, which does not exist on an optical axis moved from the optical axis in the substantially perpendicular direction, is an initial position.

REFERENCE SIGNS LIST 1 light source
2 illumination optical system
3 projection optical system
P image modulation element
L1 first optical system
L2 second optical system
L11 eleventh optical system
L12 twelfth optical system
P liquid crystal panel
PP dichroic prism

The invention claimed is:

1. A system comprising:

a light source configured to illuminate light onto an image modulation element;

a projection optical system including at least a first lens system, including a plurality of lens groups, and having a net positive refractive power, and a second lens system, including a plurality of lens groups, and having a net negative refractive power, and being configured to project the image modulated by the modulation element, the first lens system being different from the second lens system; and circuitry configured to control a shift of a position of a first lens group of the first lens system in a direction perpendicular to an optical axis of the projection optical system based on an optical zoom factor and control a shift of a position of a second lens group of the first lens system in a direction parallel to the optical axis of the projection optical system based on a screen shift factor, wherein a position of the image modulation element is unchanged when the circuitry controls shifting of positions of the first lens group and the second lens group of the first lens system, and the shifting of the first lens group includes a shifting between an enlargement side and a reduction side, the enlargement side being closer to the second lens system.

2. The system of claim 1, wherein each lens group of the first lens system includes a plurality of lenses that are each configured to be shifted in a direction parallel to the optical axis of the projection optical system.

3. The system of claim 2, wherein the circuitry is configured to control the optical zoom factor by controlling the shifting of one or more of the plurality of lenses of each one of the lens groups of the first lens system in the direction parallel to the optical axis of the projection optical system.

4. The system of claim 1, wherein each lens included in the first optical system is smaller than each lens included in the second optical system.

5. The system of claim 1, wherein the projection optical system includes a third lens system including a lens having a curved reflective surface and an optical axis common to the first and second lens systems.

6. The system of claim 1, wherein a position of the second lens system is unchanged when the circuitry controls shifting of positions of the first lens group and the second lens group of the first lens system.

7. The system of claim 5, wherein the positions of the second and third lens systems are unchanged when the circuitry controls shifting of positions of the first lens group and the second lens group of the first lens system.

8. The system of claim 1, wherein the circuitry is further configured to control the optical zoom factor by shifting the first lens group of the first optical system in the direction parallel to the optical axis of the projection optical system.

9. The system of claim 1, wherein each lens included in the first optical system is larger than each lens included in the second optical system.

10. The system of claim 1, wherein the circuitry is further configured to receive a screen shift function associated with a screen size, correlate a predetermined shift position with a plurality of screen sizes based on the received screen shift function, and output a display having a new shifted position based on the received screen shift function.

11. The system of claim 1, wherein the refractive power of the first group of the first lens system is less than the refractive power of the first lens system at the enlargement side.

12. A method comprising:

projecting an image modulated by a modulation element by a projection optical system including at least a first lens system, including a plurality of lens groups, and having a net positive refractive power, and a second lens system, including a plurality of lens groups, and having a net negative refractive power, the first lens system being different from the second lens system; and control shifting, by circuitry, a position of a first lens group of the first lens system in a direction perpendicular to an optical axis of the projection optical system based on an optical zoom factor and control shifting position of a second lens group of the first lens system in a direction parallel to the optical axis of the projection optical system based on a screen shift factor, wherein a position of the image modulation element is unchanged when shifting positions of the first lens group and the second lens group of the first lens system, and the shifting of the first lens group includes shifting between an enlargement side and a reduction side, the enlargement side being closer to the second lens system.

13. A system comprising:

means for illuminating light onto an image modulation element;

means for projecting the image modulated by the modulation element, the means for projecting include first lens means, including a plurality of lens groups, and having a net positive refractive power, and second lens means, including a plurality of lens groups, and having a net negative refractive power, the first lens means being different than the second lens means; and means for automatically setting a shift amount of the projected image based on an optical zoom factor by shifting a position of the first lens group of the first lens means in a direction perpendicular to an optical axis of the projection optical system and shifting a position of the second lens group of the first lens means in a direction parallel to the optical axis of the projection optical system based on a screen shift factor, the shifting of the first lens group including shifting between an enlargement side and a reduction side, the enlargement side being closer to the second lens means.

14. A system comprising:

a first lens system including a plurality of lens groups and having a net positive refractive power;

a second lens system including a plurality of lens groups and having a net negative refractive power, the second lens system being different from the first lens system; and circuitry configured to control shifting of a position of the first lens system in a direction perpendicular to an optical axis of the first and second lens systems based on an optical zoom factor and control a shift of a position of a second lens group of the first lens system in a direction parallel to the optical axis of the projection optical system based on a screen shift factor, the shifting of the first lens group including shifting between an enlargement side and a reduction side, the enlargement side being closer to the second lens system.

* * * * *